US011353751B2

United States Patent
Sargent et al.

(10) Patent No.: US 11,353,751 B2
(45) Date of Patent: Jun. 7, 2022

(54) DOUBLE LAYER LIQUID CRYSTAL DEVICE AND PROCESS OF MANUFACTURE

(71) Applicant: Merck Patent GmbH, Darmstadt (DE)

(72) Inventors: Joseph Sargent, Southampton (GB); Sarabjot Kaur, Southampton (GB); Simon Siemianowski, Rossdorf (DE); Izumi Saito, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/032,367

(22) Filed: Sep. 25, 2020

(65) Prior Publication Data

US 2021/0096431 A1 Apr. 1, 2021

(30) Foreign Application Priority Data

Sep. 26, 2019 (EP) .................... 19199801

(51) Int. Cl.
*C09K 19/04* (2006.01)
*G02F 1/1337* (2006.01)
*C09K 19/56* (2006.01)
*C09K 19/58* (2006.01)
*C09K 19/54* (2006.01)

(52) U.S. Cl.
CPC ........ *G02F 1/133711* (2013.01); *C09K 19/56* (2013.01); *C09K 19/58* (2013.01); *G02F 1/133788* (2013.01); *C09K 19/04* (2013.01); *C09K 2019/546* (2013.01); *C09K 2019/548* (2013.01); *C09K 2323/02* (2020.08); *G02F 1/133726* (2021.01)

(58) Field of Classification Search
CPC ......... G02F 1/133711; G02F 1/133788; G02F 1/133726; C09K 19/58; C09K 19/56; C09K 19/04; C09K 2019/546; C09K 2019/548; C09K 2323/00; C09K 2323/02; C09K 2323/03
USPC ...... 428/1.1, 1.2; 349/77, 88, 119, 123, 128, 349/191
See application file for complete search history.

(56) References Cited

U.S. PATENT DOCUMENTS

| 5,296,952 | A | 3/1994 | Takatsu et al. |
| 9,321,962 | B2 | 4/2016 | Schadt et al. |
| 2020/0255740 | A1 | 8/2020 | Adlem et al. |

FOREIGN PATENT DOCUMENTS

| EP | 0516076 B1 | 4/1999 |
| WO | 9949360 A1 | 9/1999 |

(Continued)

OTHER PUBLICATIONS

Y.-H. Lin et al., Polarisation-independent liquid crystal devices; Liquid Crystals Today, 2008, vol. 17, Nos. 1-2, pp. 1-8.

(Continued)

*Primary Examiner* — Ruiyun Zhang
(74) *Attorney, Agent, or Firm* — Millen White Zelano & Branigan, PC; Brion P. Heaney

(57) ABSTRACT

A double layer liquid crystal device comprises a first and a second layer with orthogonal or crossed alignment of the liquid crystal phase of the two layers, in which the first and second layer have first and second alignment aids comprised of a polymerized or polymerizable molecular compound. The layers are aligned by UV photoalignment and vertical self-alignment by the aid of suitable additives.

20 Claims, 1 Drawing Sheet

(56) References Cited

FOREIGN PATENT DOCUMENTS

WO            17102068 A1     6/2017
WO     WO-2017102068 A1 *   6/2017  ....... G02F 1/133305

OTHER PUBLICATIONS

Y.-H. Lin et al., Polarization-independent liquid crystal phase modulator using a thin polymer-separated double-layered structure, Optics Express, 2005, vol. 13, No. 22, pp. 8746-8752.
H. Ren et al., Polarization-independent and fast-response phase modulators using double-layered liquid crystal gels, Appl. Phys. Lett., 2006, 88, pp. 061123-1-061123-3.

* cited by examiner

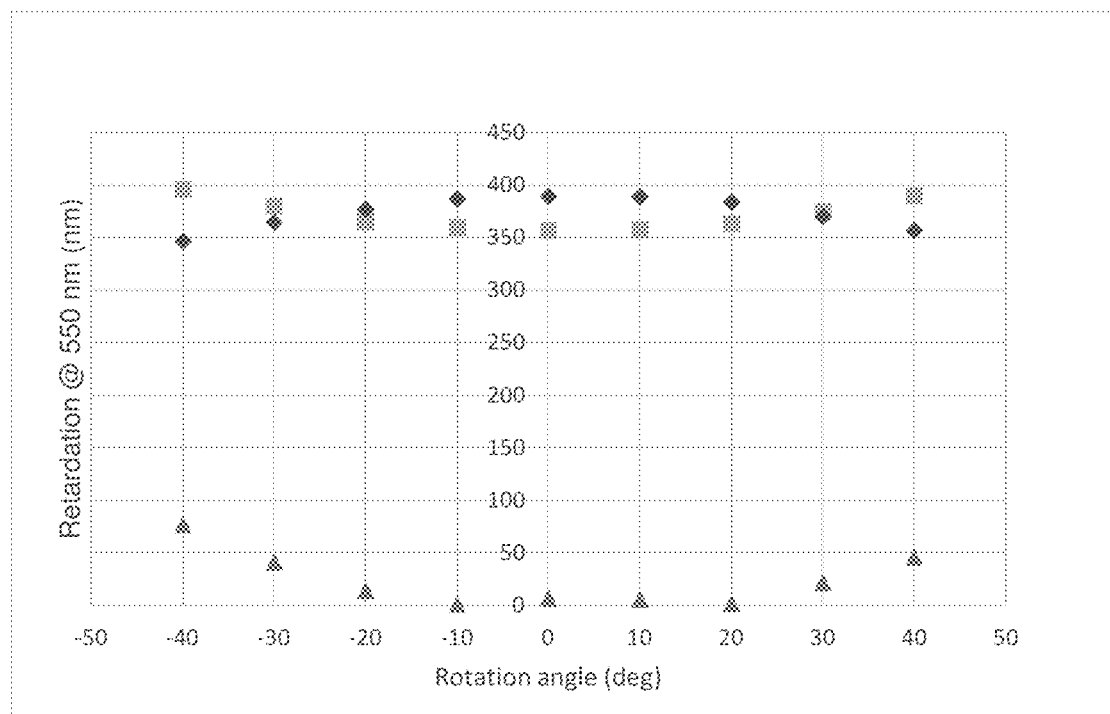

DOUBLE LAYER LIQUID CRYSTAL DEVICE AND PROCESS OF MANUFACTURE

The invention relates to a double layer liquid crystal device comprising a first and a second layer with orthogonal or crossed alignment of the liquid crystal phase of the two layers, in which the first and second layer have first and second alignment aids comprised of a polymerized or polymerizable molecular compound, wherein the first and the second layer have planar alignment at different angles with respect to each other (by the aid of an alignment aid), or the first layer has planar alignment, and the second layer has vertical alignment. The layers are aligned by UV photoalignment and optionally vertical self-alignment by the aid of suitable additives.

BACKGROUND AND PRIOR ART

Liquid crystal (LC) devices can be used as amplitude modulators and phase modulators. Applications in LC displays are widely used. Most LC devices are polarization-dependent and require at least one polarizer. For some applications like optical lenses, phase modulators, beam steering or windows the polarization-dependent behavior is not desirable.

A common principle to avoid polarization-dependency is to employ a double-cell geometry with orthogonally aligned LC layers. Some liquid crystal devices require a double layer to create the desired effect.

For example, in a liquid crystal lens, a single layer alone makes a polarization-dependent lens (focuses only one polarization) where as a double cell can focus both polarization states.

Another application example could be for dye doped liquid crystal windows where a single cell device can absorb only one polarization state of light and a double cell is used to increase contrast ratio by absorbing both polarization states of light.

Another application example is the classic double STN (DSTN) display which comprises two cells of 180° twisted nematic to give perfect optical compensation. This requires that the top and bottom cell have orthogonal alignment.

In all of the above examples it is necessary to align the optic axis of both layers of liquid crystal orthogonal to each other for maximum efficiency. Production of an orthogonally aligned double layer alignment naturally imposes significantly more technical effort than a single layer. A double cell can be made with 3 or 4 layers of glass. Conventionally each layer has to be furnished with alignment layers, which usually consist of polyimide. For example, the middle substrate with double-sided and orthogonally adjusted alignment layers in a stack of three glass substrates imposes considerable technical efforts.

One task of this invention is therefore to provide convenient access to double layered LC devices with two different alignment directors.

The effort for the production of a polyimide layer, treatment of the layer and improvement with bumps or polymer layers is relatively great. A simplifying technology which on the one hand reduces production costs and on the other hand helps to optimize the image quality (viewing-angle dependence, contrast, response times) is therefore desirable.

Rubbed polyimide has been used for a long time to align liquid crystals. The rubbing process causes a number of problems: mura, contamination, problems with static discharge, debris, etc.

The current invention proposes as one element of the invention to use certain LC media with self-aligning properties.

Photoalignment is a technology for achieving liquid crystal (LC) alignment that avoids rubbing by replacing it with a light-induced orientational ordering of the alignment surface. This can be achieved through the mechanisms of photodecomposition, photodimerization, and photoisomerization (N. A. Clark et al. Langmuir 2010, 26(22), 17482-17488, and literature cited therein) by means of polarized light. N. A. Clark et al. Langmuir 2010, 26(22), 17482-17488 have shown that it is possible to self-assemble a compound of the following structure

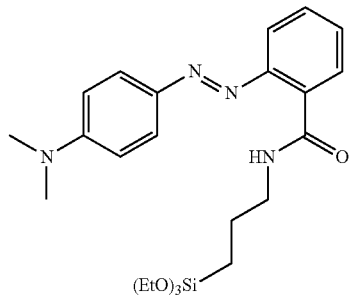

onto a substrate to give a monolayer that is able to be photoaligned to induce homogeneous alignment of a liquid crystal. However, a separate step of self-assembly before manufacture of the LC cell is required. The nature of the azo-group causes reversibility of the alignment when exposed to light.

Another functional group known to enable photoalignment is the phenylethenylcarbonyloxy group (cinnamate). Photocrosslinkable cinnamates are known from the prior art, e.g. of the following structure

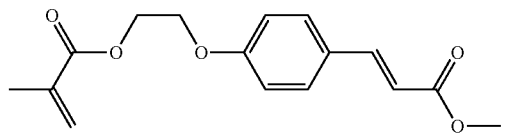 [SMILES: C=C(C)C(=O)OCCOc1ccc(/C=C/C(=O)OC)cc1]

as disclosed in EP0763552. From such compounds, polymers can be obtained, for example the following

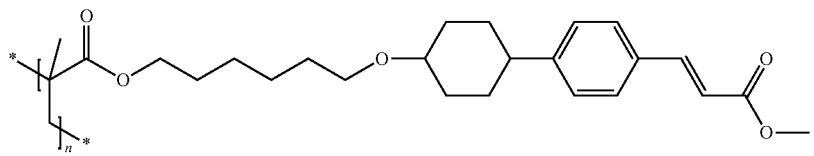

This material was used in a photoalignment process, as disclosed in WO 99/49360, to give an orientation layer for liquid crystals.

In WO 2000/05189 polymerizable direactive mesogenic cinnamates are disclosed for the use in polymerizable LC mixtures as, e.g. optical retarders.

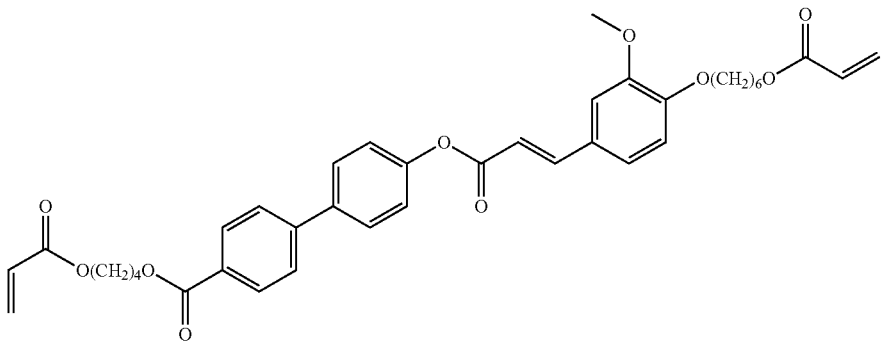

A structurally related compound of the following formula

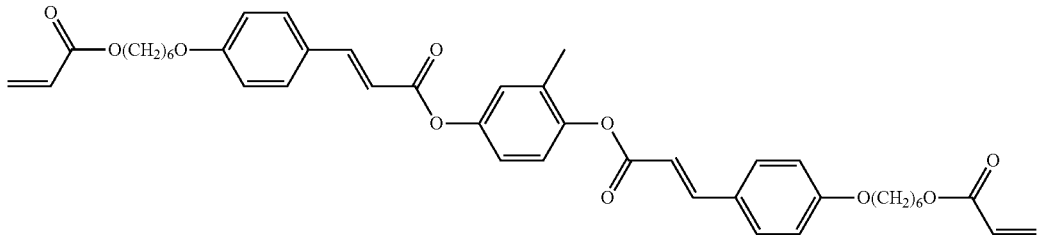

comprising two cinnamic acid moieties is disclosed in GB 2 306 470 A for the use as component in liquid crystalline polymer films. This type of compound has not been used or proposed for the use as photoalignment agent.

A very similar compound is published in B. M. I. van der Zande et al., Liquid Crystals, Vol. 33, No. 6, June 2006, 723-737, in the field of liquid crystalline polymers for patterned retarders, and has the following structure:

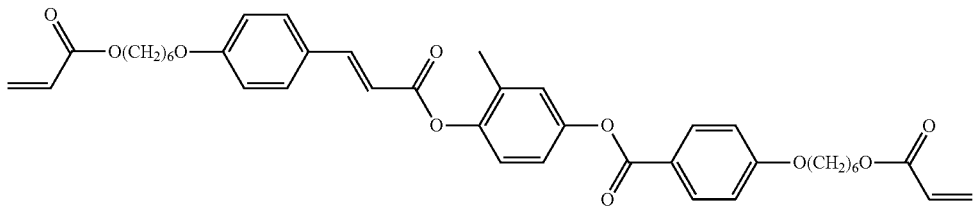

WO 2017/102068 A1 discloses the same structure for the purpose of a polyimide-free homogeneous photoalignment method.

Further, M. H. Lee et al. published in Liquid Crystals (https://doi.org/10.1080/02678292.2018.1441459) a polyimide-free homogeneous photoalignment method induced by polymerizable liquid crystal containing cinnamate moiety of the following formula:

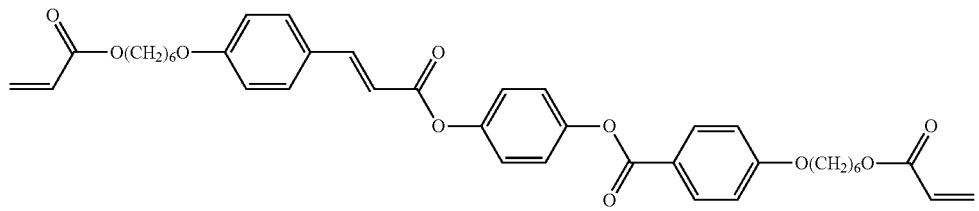

The orientation of alignment can be either parallel or orthogonal to the direction of the polarized light. The authors of J. Mater. Chem. (2012) 22, 286-300 have disclosed various structures of cinnamates and their orientation of the optic axis relative to the polarized UV orientation for several materials.

For example, three ring cinnamates and biscinnamates of the structures shown above will usually induce a planar alignment perpendicular to the direction of polarized UV. Other two ring cinnamates with a lateral anchor similar to the structure

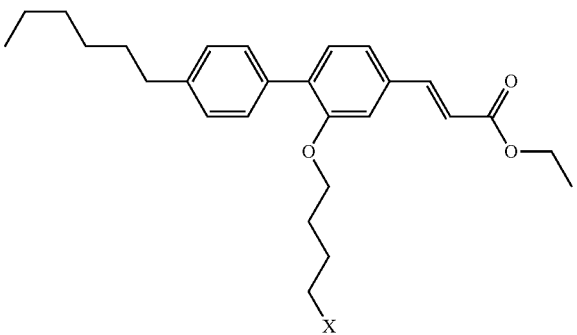

wherein X is OH or $Si(OCH_3)_3$, will usually induce a planar alignment parallel to the direction of polarized UV.

A further improvement is to avoid the use of polyimide and other alignment layers at all. For different kinds of nematic LC media this was achieved by adding a self-alignment agent for vertical alignment to the medium that induces homeotropic alignment in situ by a self-assembling mechanism as disclosed in US 2015/0252265 and WO 2012/038026.

However, all these methods are only suitable for achieving one alignment direction at a time. Manufacture of a double layer LC device still requires a considerable effort. A more economic access to such useful devices would be desirable. Other aims of the present invention are immediately evident to the person skilled in the art from the following detailed description.

Surprisingly, the inventors have found out that one or more of the above-mentioned aims can be achieved by providing a double layer LC device comprising a first and a second layer with orthogonal alignment or crossed alignment of the liquid crystal phase of the two layers, in which the first layer comprises a first alignment aid, and the second layer comprises a second alignment aid, which alignment aids are polymerized or polymerizable molecular compounds, wherein the first and the second layer have planar alignment at different angles with respect to each other (by the aid of an alignment aid), or the first layer has planar alignment, and the second layer has vertical alignment.

A further aspect of the invention is a process for making a double layer liquid crystal device according to the invention. The invention concerns a process for making a double layer liquid crystal device as described above, wherein the first and second layer have first and second alignment aids, and the alignment aids are selected to align the liquid crystal in a first and a second direction of alignment which are orthogonal or crossed at an angle between 45° and 90° to each other, whereby, in alternative, a) the orthogonal direction is made by the two different alignment aids, which differ in the induced direction of alignment, under the same polarized UV light, or b) the two different alignment aids differ in at least the reaction speed or absorption spectrum, the process comprises a first and a second polarized UV irradiation step, and the orthogonal direction is made by two times polarized UV light at orthogonal or rotated orientation, in order to effect sequential reaction of the first and second alignment aid into orthogonal or crossed alignment directions, or c) the process comprises a first and a second polarized UV irradiation step, the first or second alignment aid is a rewritable one and the orthogonal or crossed direction is made by two times polarized UV light at orthogonal or otherwise rotated orientation, whereby the first wavelength is selected to effect alignment and/or polymerization of the alignment aid of the first and second layer, and the second shorter wavelength is selected to effect (photo)alignment by polarized UV irradiation of the alignment of only the second layer.

In the process according to a) above, the first and second layers comprise in one layer an alignment aid inducing parallel orientation and in the other layer an alignment aid inducing vertical orientation, where said orientation is relative to the direction of incident polarized UV light. The orthogonal alignment states can be achieved in a single process step.

In the process according to b) above, the alignment of the first and second layers are induced one after another or at different reaction speed. This embodiment comprises two process steps with orthogonal or rotated polarized UV light. The timewise separation allows to rotate the incident UV light in between for each layer. The separated reaction of the two layers is aided by the kind of alignment aids, which may differ in the absorption spectrum or in absorption strength.

In this case, the second rotated irradiation step is made at a shorter wavelength or at a stronger intensity than the first step.

In the process according to c) above, one of the layers comprises a rewritable alignment aid, while the other one comprises a permanent type alignment aid. The process, which uses two steps of orthogonal or rotated polarized UV light, leads to different alignment after the second step.

Further details according to each embodiment of the invention are disclosed in the dependent claims, in combinations of two or more of the claims, and in this specification including the examples.

Terms and Definitions

A photoreactive group according to the present invention is a functional group of a molecule that causes a change of the geometry of the molecule either by bond rotation, skeletal rearrangement or atom- or group-transfer, or by dimerization, upon irradiation with light of a suitable wavelength that can be absorbed by the molecule.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behavior only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

A photoreactive mesogen according to the present invention is a mesogenic compound comprising one or more photoreactive groups.

Examples of photoreactive groups are —C=C— double bonds, especially —CH=CH—(CO)O—, and azo groups (—N=N—).

Examples of molecular structures and sub-structures comprising such photoreactive groups are stilbene, (1,2-difluoro-2-phenyl-vinyl)-benzene, cinnamate, 4-phenylbut-3-en-2-one, chalcone, coumarin, chromone, pentalenone and azobenzene.

According to the present application, the term "linearly polarized light" means light which is at least partially linearly polarized. Preferably, the aligning light is linearly polarized with a degree of polarization of more than 5:1. Wavelengths, intensity and energy of the linearly polarized light are chosen depending on the photosensitivity of the photoalignable material. Typically, the wavelengths are in the UV-A, UV-B and/or UV-C range or in the visible range. Preferably, the linearly polarized light comprises light of wavelengths less than 450 nm, more preferably less than 420 nm at the same time the linearly polarized light preferably comprises light of wavelengths longer than 280 nm, preferably more than 320 nm, more preferably over 350 nm.

"Halogen" denotes F, Cl, Br or I.

The term "aryl" denotes an aromatic carbon group or a group derived therefrom. The term "heteroaryl" denotes "aryl" as defined above, containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, trifluoromethyl, perfluoro-n-butyl, 2,2,2-trifluoroethyl, perfluorooctyl and perfluorohexyl.

Preferred alkenyl groups are, for example, ethenyl, propenyl, butenyl, pentenyl, cyclopentenyl, hexenyl, cyclohexenyl, heptenyl, cycloheptenyl, octenyl and cyclooctenyl.

Preferred alkynyl groups are, for example, ethynyl, propynyl, butynyl, pentynyl, hexynyl and octynyl.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy and n-dodecoxy.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se. A ring system of this type may also contain individual non-conjugated units, as is the case, for example, in the fluorene basic structure.

Particularly preferred substituents L are, for example, F, Cl, CN, $CH_3$, $C_2H_5$, —$CH(CH_3)_2$, $OCH_3$, $OC_2H_5$, $CF_3$, $OCF_3$, $OCHF_2$, $OC_2F_5$, furthermore phenyl.

The term "director" is known in prior art and means the preferred orientation direction of the long molecular axes (in case of calamitic compounds) or short molecular axes (in case of discotic compounds) of the liquid-crystalline molecules. In case of uniaxial ordering of such anisotropic molecules, the director is the axis of anisotropy.

The term "alignment" or "orientation" relates to alignment (orientation ordering) of anisotropic units of material such as small molecules or fragments of big molecules in a common direction named "alignment direction". In an aligned layer of liquid-crystalline material, the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a proportion of the liquid-crystalline molecules are oriented at an angle θ ("tilt angle") between about 80° to 90° relative to the plane of the layer.

The terms "uniform orientation" or "uniform alignment" of an liquid-crystalline material, for example in a layer of the material, mean that the long molecular axes (in case of calamitic compounds) or the short molecular axes (in case of discotic compounds) of the liquid-crystalline molecules are oriented substantially in the same direction. In other words, the lines of liquid-crystalline director are parallel.

The wavelength of light generally referred to in this application is 550 nm, unless explicitly specified otherwise.

The birefringence Δn herein is defined by the following equation $$\Delta n = n_e - n_o$$

wherein $n_e$ is the extraordinary refractive index and $n_o$ is the ordinary refractive index and the effective average refractive index $n_{av.}$ is given by the following equation $$n_{av.} = [(2n_o^2 + n_e^2)/3]^{1/2}$$

The extraordinary refractive index $n_e$ and the ordinary refractive index $n_o$ can be measured using an Abbe refractometer.

In the present application the term "dielectrically positive" is used for compounds or components with Δε>3.0, "dielectrically neutral" with −1.5≤Δε≤3.0 and "dielectrically negative" with Δε<−1.5. Δε is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10% its concentration is reduced by a factor of 2 until the resultant medium is stable enough at least to allow the determination of its properties. Preferably, the concentration is kept at least at 5%, however, to keep the significance of the results as high as possible. The capacitance of the test mixtures is determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V; however, it is always selected to be below the capacitive threshold of the respective test mixture.

Δε is defined as (ε∥−ε⊥), whereas $\varepsilon_{av.}$ is (ε∥+2 ε⊥)/3. The dielectric permittivity of the compounds is determined from the change of the respective values of a host medium upon addition of the compounds of interest. The values are extrapolated to a concentration of the compounds of interest of 100%. A typical host medium is ZLI-4792 or ZLI-2857, both commercially available from Merck, Darmstadt.

For the present invention, the groups

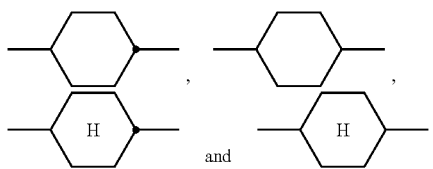

denote trans-1,4-cyclohexylene, and the groups

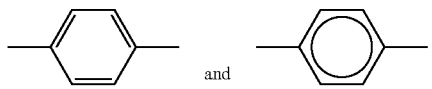

denote 1,4-phenylene.

For the present invention the groups —CO—O—, —COO— —C(=O)O— or —CO₂-denote an ester group of formula

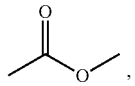

and the groups —O—CO—, —OCO—, —OC(=O)—, —O₂C— or —OOC— denote an ester group of formula

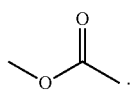

Furthermore, the definitions as given in C. Tschierske, G. Pelzl and S. Diele, Angew. Chem. 2004, 116, 6340-6368 shall apply to non-defined terms related to liquid crystal materials in the instant application.

BRIEF DESCRIPTION OF THE FIGURES

FIG. 1 shows the retardation (550 nm) as a function of angle of the incident light for each of the cells of a double layer according to Example 1 and for the double layer stack. The square-shaped data points represent the curves for both of the single layers. The triangle-shaped data points represent the curve for the measurement of the combined stack of two layers.

DETAILED DESCRIPTION

In a first aspect the invention pertains to a double layer liquid crystal device comprising a first and a second liquid crystal layer with orthogonal alignment or crossed alignment at an angle between 45 and 90° to each other of the liquid crystal phase of the two layers, in which the first and second layer have first and second alignment aids comprised of a polymerized or polymerizable molecular compound,
wherein
the first and the second layer have planar alignment at different angles with respect to each other, preferably by the aid of an alignment aid,
or
the first layer has planar alignment, and the second layer has vertical alignment.

The alignment of the first and second liquid crystal layer is preferably prescribed by the first and second alignment aid. Preferably the double layer liquid crystal device comprises a first layer comprising an alignment aid comprising a polymerizable or polymerized compound of the structural formula I,

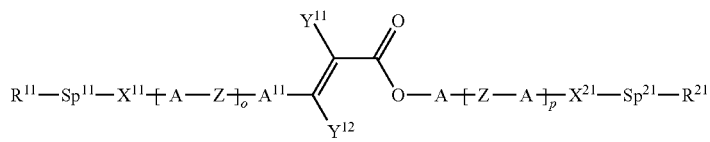

wherein
A¹¹ denotes a radical selected from the following groups:
a) a group consisting of 1,4-phenylene and 1,3-phenylene, wherein, in addition, one or two CH groups may each be replaced by N and wherein, in addition, one or more H atoms may each be replaced by L,
b) a group selected from the group consisting of

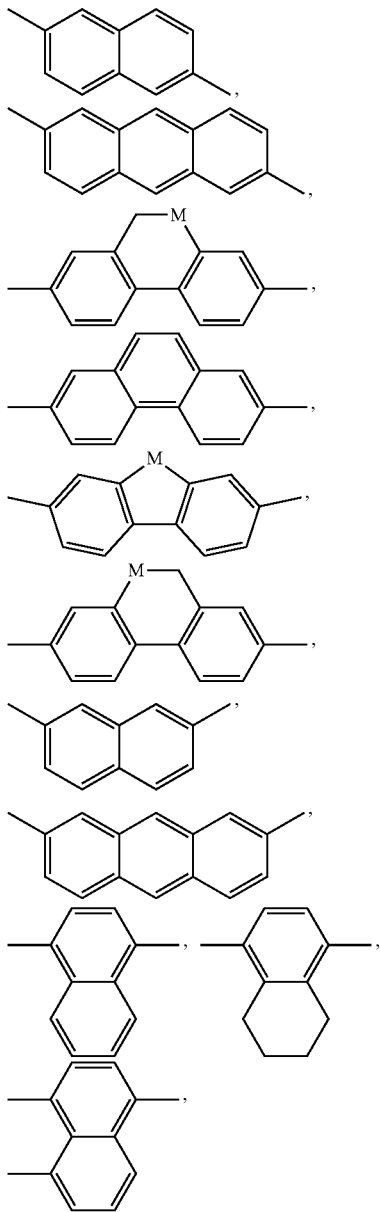

where, in addition, one or more H atoms in these radicals may each be replaced by L, and/or one or more double bonds may each be replaced by single bonds, and/or one or more CH groups may each be replaced by N, M denotes —O—, —S—, —CH$_2$—, —CHR$^z$— or —CRYR$^z$—, and R$^y$ and R$^z$ each, independently of one another, denote H, CN, F or alkyl having 1-12 C atoms, wherein one or more H atoms may each be replaced by F,
preferably H, methyl, ethyl, propyl, butyl,
more preferably H or methyl,
in particular H, A have each, independently of one another, in each occurrence one of the meanings for A¹¹ or
a) group consisting of trans-1,4-cyclohexylene, 1,4-cyclohexenylene, wherein, in addition, one or more non-adjacent CH$_2$ groups may each be replaced by —O— or —S— and wherein, in addition, one or more H atoms may each be replaced by F, or
b) a group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl,
each of which may also be mono- or polysubstituted by L, L on each occurrence, identically or differently, denotes —OH, —F, —Cl, —Br, —I, —CN, —NO$_2$, SF$_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched or cyclic alkyl, alkoxy, alkylcarbonyl, alkoxycarbonyl, alkylcarbonyloxy or alkoxycarbonyloxy having 1 to 25 C atoms, preferably 1 to 12 C atoms, more preferably 1 to 6 C atoms, in which, in addition, one or more H atoms may each be replaced by F or Cl, or X$^{21}$—Sp$^{21}$-R$^{21}$, Y$^{11}$ and Y$^{12}$ each, independently of one another, denote H, F, phenyl or optionally fluorinated alkyl having 1-12 C atoms, preferably H, methyl, ethyl, propyl, butyl,
more preferably H or methyl,
in particular H, Z denotes, independently of each other, in each occurrence, a single bond, —COO—, —OCO—, —O—CO—O—, —OCH$_2$—, —CH$_2$O—, —OCF$_2$—, —CF$_2$O—, —(CH$_2$)$_n$—, —CF$_2$CF$_2$—, —CH=CH—, —CF=CF—, —CH=CH—COO—, —OCO—CH=CH—, —CO—S—, —S—CO—, —CS—S—, —S—CS—, —S—CSS— or —C≡C—,
preferably a single bond, —COO—, —OCO—, —OCF$_2$—, —CF$_{20}$—, or —(CH$_2$)$_n$—,
more preferably a single bond, —COO—, or —OCO—, n denotes an integer between 2 and 8, preferably 2,
o and p denote each and independently 0, 1 or 2, preferably 1, X$^{11}$ and X$^{21}$ denote independently from one another, in each occurrence a single bond, —CO—O—, —O—CO—, —O—COO—, —O—, —CH=CH—, —C≡C—, —CF$_2$—O—, —O—CF$_2$—, —CF$_2$—CF$_2$—, —CH$_2$—O—, —O—CH$_2$—, —CO—S—, —S—CO—, —CS—S—, —S—CS—, —S—CSS— or —S—,
preferably, a single bond, —CO—O—, —O—CO—, —O—COO—, or —O—,
more preferably a single bond or —O—, Sp$^{11}$ and Sp$^{21}$ denote each and independently, in each occurrence a single bond or a spacer group comprising 1 to 20 C atoms, wherein one or more non-adjacent and non-terminal CH$_2$ groups may also each be replaced by —O—, —S—, —NH—, —N(CH$_3$)—, —CO—, —O—CO—, —S—CO—, —O—COO—, —CO—S—, —CO—O—, —CF$_2$—, —CF$_2$O—, —OCF$_2$—, —C(OH)—, —CH(alkyl)-, —CH(alkenyl)-, —CH(alkoxyl)-, —CH(oxaalkyl)-, —CH=CH— or —C≡C—, however in such a way that no two O-atoms are adjacent to one another and no two groups selected from —O—CO—, —S—CO—, —O—COO—, —CO—S—, —CO—O— and —CH=CH— are adjacent to each other, preferably alkylene having 1 to 20, preferably 1 to 12, C atoms, which is optionally mono- or polysubstituted by F, Cl, Br, I or CN, more preferably straight-chain ethylene, propylene, butylene, pentylene, hexylene, heptylene, octylene, nonylene, decylene, undecylene, dodecylene, $R^{11}$ denotes P, $R^{21}$ denotes P, halogen, CN, optionally fluorinated alkyl or alkenyl with up to 15 C atoms in which one or more non-adjacent $CH_2$-groups may each be replaced by —O—, —S—, —CO—, —C(O)O—, —O—C(O)—, or O—C(O)—O—, preferably P, and P each and independently from another in each occurrence a polymerizable group.

In the instant application, polymerizable groups (P) are groups that are suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C-triple bond, and groups which are suitable for polymerization with ring opening, such as, for example, oxetane or epoxide groups.

Preferred groups P are selected from the group consisting of $CH_2$=$CW^1$—CO—O—, $CH_2$=$CW^1$—CO—,

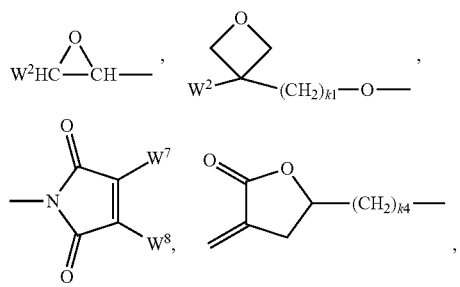

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, HW$^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, wherein $W^1$ denotes H, F, Cl, CN, $CF_3$, phenyl or alkyl having 1 to 5 C atoms, in particular H, F, C or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, $k_1$, $k_2$ and $k_3$ each, independently of one another, denote 0 or 1, $k_3$ preferably denotes 1, and $k_4$ denotes an integer from 1 to 10.

Further preferred, P denotes a group

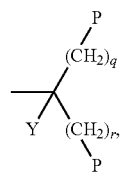

preferably a group

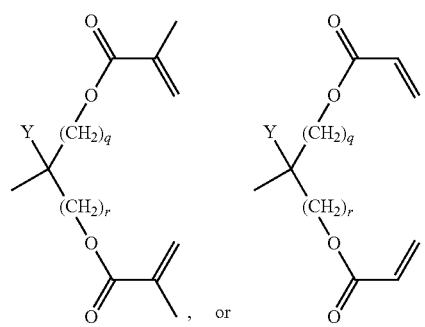

Y denotes H, F, phenyl or optionally fluorinated alkyl having 1-12 C atoms, preferably H, methyl, ethyl, propyl, butyl, more preferably H or methyl, in particular H.

Particularly preferred groups P are selected from the group consisting of $CH_2$=$CW^1$—CO—O—, in particular $CH_2$=CH—CO—O—, $CH_2$=C($CH_3$)—CO—O— and $CH_2$=CF—CO—O—, furthermore $CH_2$=CH—O—, ($CH_2$=CH)$_2$CH—O—CO—, ($CH_2$=CH)$_2$CH—O—,

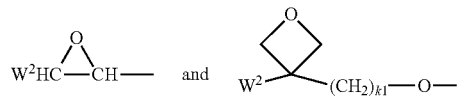

or a group

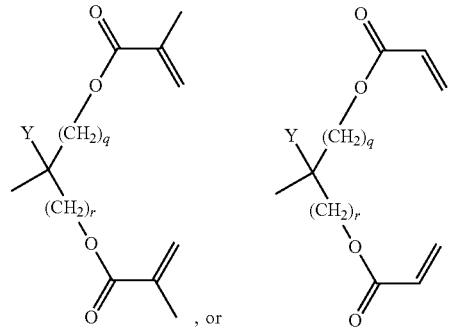

Y denotes H or methyl, in particular H, and
q and r are each, independently, 1, 2 or 3.

Very particularly preferred groups P, especially for formula I, are selected from the group consisting of acrylate, methacrylate, fluoroacrylate, furthermore vinyloxy, chloroacrylate, oxetane, epoxide groups and a group,

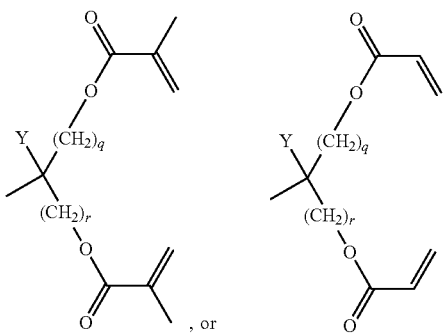
Y denotes H or methyl, in particular H, and q and r are each, independently, 1, 2 or 3.
and of these preferably an acrylate or methacrylate group or a group,
wherein Y denotes H or methyl, and q and r are each, independently, 1, 2 or 3.
The compounds of formula I are preferably selected from compounds of the sub-formulae I-1 to I-9,
I-1
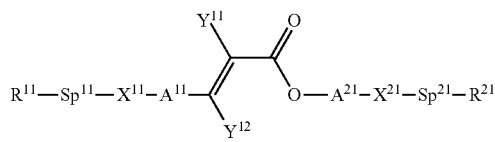
I-2
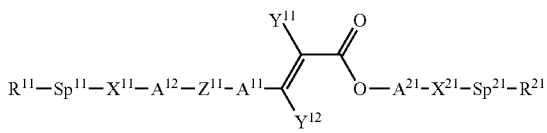
I-3
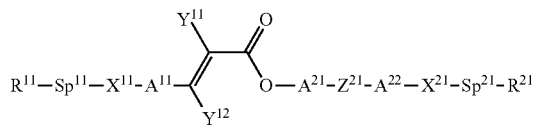
I-4
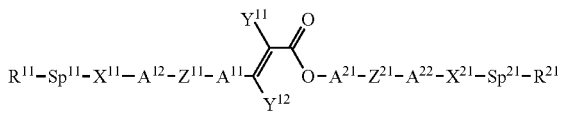
I-5
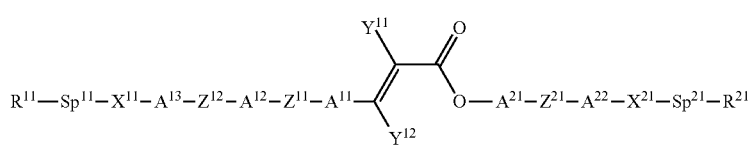
I-6
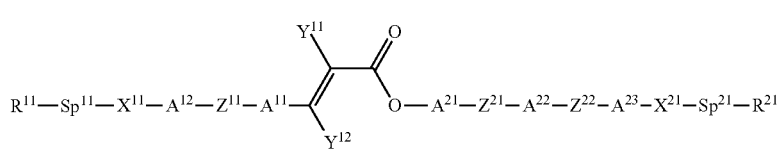
I-7
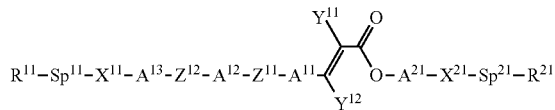
I-8
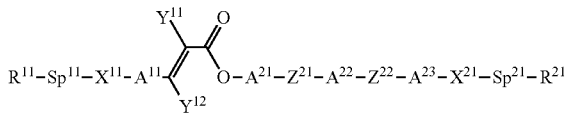
I-9
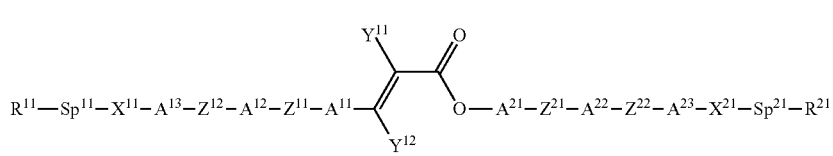

wherein $R^{11}$, $R^{21}$, $A^{11}$, $X^{11}$, $X^{21}$, $Y^{11}$, $Y^{12}$, $Sp^{11}$, and $Sp^{21}$ have one of the meanings as given above in formula I, $A^{12}$ to $A^{23}$ have one of the meanings for A in formula I, and $Z^{11}$ to $Z^{22}$ have one of the meanings for Z as given above under formula I.

Further preferred compounds of formula I-1 are selected from the compounds of formulae I-1-1 to I-1-3,

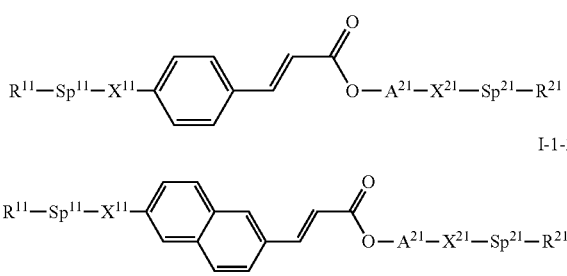

I-1-1

I-1-2

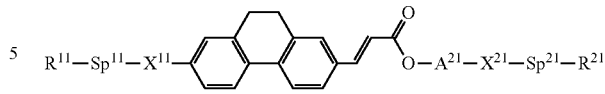

I-1-3 wherein $R^{11}$, $R^{21}$, $A^{11}$, $X^{11}$, $X^{21}$, $Sp^{11}$, and $Sp^{21}$ have one of the meanings as given above in formula I, $A^{21}$ has one of the meanings for A in formula I, preferably $A^{21}$ denotes a group consisting of 1,4-phenylene, wherein, in addition, one or two CH groups may each be replaced by N and wherein, in addition, one or more H atoms may each be replaced by L as given above under formula I, or a group consisting of trans-1,4-cyclohexylene, 1,4-cyclohexenylene, wherein, in addition, one or more non-adjacent $CH_2$ groups may each be replaced by —O— or —S— and wherein, in addition, one or more H atoms may each be replaced by F.

Preferred compounds of formula I-2 are selected from the following sub formula I-2-1 to I-2-3:

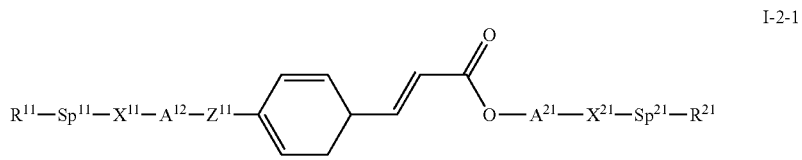

I-2-1

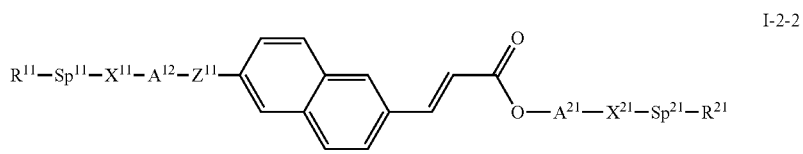

I-2-2

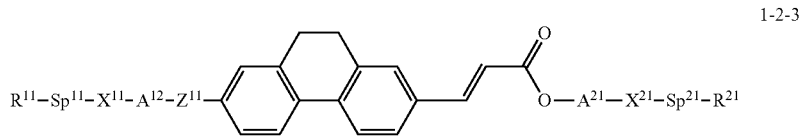

I-2-3 wherein $R^{11}$, $R^{21}$, $X^{11}$, $X^{21}$, $Sp^{11}$ and $Sp^{21}$ have one of the meanings as given above in formula I, and $Z^{11}$ has one of the meanings for Z as given above under formula I, $A^{12}$, $A^{21}$ have one of the meanings for A given above under formula I, preferably $A^{12}$, $A^{21}$ denote each and independently a group consisting of 1,4-phenylene, wherein, in addition, one or two CH groups may each be replaced by N and wherein, in addition, one or more H atoms may each be replaced by L as given above under formula I, or a group consisting of trans-1,4-cyclohexylene, 1,4-cyclohexenylene, wherein, in addition, one or more non-adjacent $CH_2$ groups may each be replaced by —O— or —S— and wherein, in addition, one or more H atoms may each be replaced by F.

Preferred compounds of formula I-3 are selected from the following subformulae I-3-1 to I-3-3,

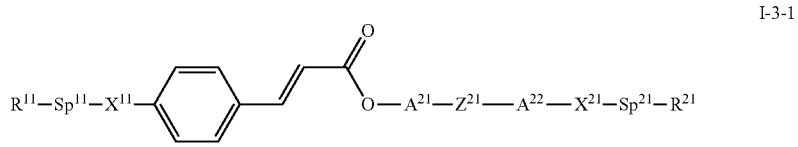

I-3-1

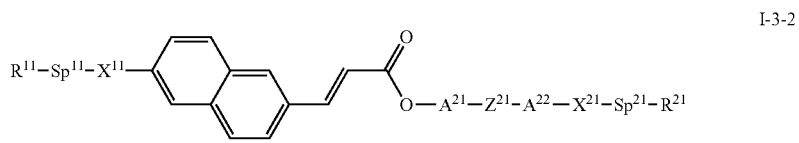

I-3-2

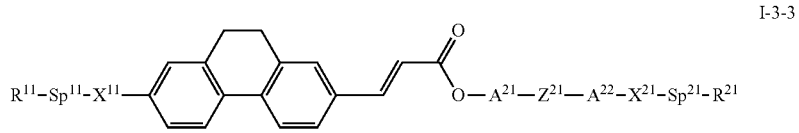

I-3-3

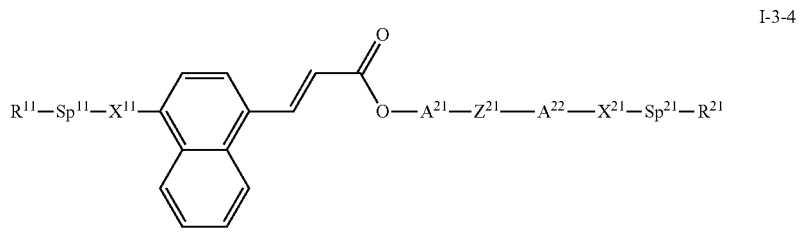

I-3-4 wherein $R^{11}$, $R^{21}$, $X^{11}$, $X^{21}$, $Sp^{11}$ and $Sp^{21}$ have one of the meanings as given above in formula I, $Z^{21}$ has one of the meanings for Z as given above under formula I, $A^{21}$ and $A^{22}$ have one of the meanings for A as given above under formula I. Preferably $A^{21}$ and $A^{22}$ denote each and independently a group consisting of 1,4-phenylene, wherein, in addition, one or two CH groups may each be replaced by N and wherein, in addition, one or more H atoms may each be replaced by L as given above under formula I, or a group consisting of trans-1,4-cyclohexylene, 1,4-cyclohexenylene, wherein, in addition, one or more non-adjacent $CH_2$ groups may each be replaced by —O— or —S— and wherein, in addition, one or more H atoms may each be replaced by F.

Preferred compounds of formula I-4 are selected from the following subformulae,

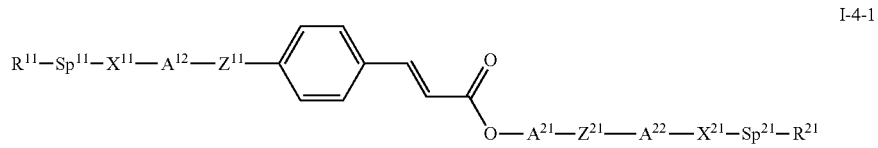

I-4-1 wherein $R^{11}$, $R^{21}$, $X^{11}$, $X^{21}$, $Sp^{11}$ and $Sp^{21}$ have one of the meanings as given above in formula I, $A^{12}$, $A^{21}$ and $A^{22}$ have one of the meanings for A as given above under formula I, and $Z^{11}$, and $Z^{21}$ have one of the meanings for Z as given above under formula I. Preferably $A^{12}$, $A^{21}$ and $A^{22}$ denote each and independently a group consisting of 1,4-phenylene, wherein one or two CH groups may each be replaced by N and wherein, in addition, one or more H atoms may each be replaced by L as given above under formula I, or a group consisting of trans-1,4-cyclohexylene, 1,4-cyclohexenylene, wherein, in addition, one or more non-adjacent $CH_2$ groups may each be replaced by —O— or —S— and wherein, in addition, one or more H atoms may each be replaced by F.

Preferred compounds of formula I-5 are selected from the following sub formula,

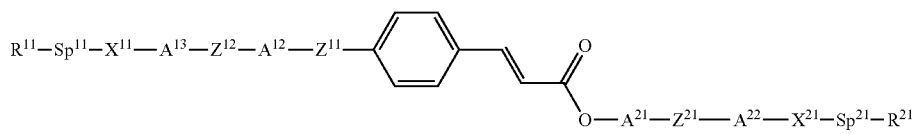

I-5-1 wherein $R^{11}$, $R^{21}$, $X^{11}$, $X^{21}$, $Sp^{11}$ and $Sp^{21}$ have one of the meanings as given above in formula I, $Z^1$, $Z^{12}$ and $Z^{21}$ have one of the meanings for Z as given above under formula I, and $A^{12}$, $A^{13}$, $A^{21}$ and $A^{22}$ have one of the meanings for A as given above under formula I. Preferably, $A^{12}$, $A^{13}$, $A^{21}$ and $A^{22}$ denote each and independently a group consisting of 1,4-phenylene, wherein one or two CH groups may each be replaced by N and wherein, in addition, one or more H atoms may each be replaced by L as given above under formula I, or a group consisting of trans-1,4-cyclohexylene, 1,4-cyclohexenylene, wherein, in addition, one or more non-adjacent $CH_2$ groups may each be replaced by —O— or —S— and wherein, in addition, one or more H atoms may each be replaced by F.

The compounds of formula I and subformulae thereof are preferably synthesized according to or in analogy to the procedures described in WO 2017/102068 and JP 2006-6232809.

The media according to the invention preferably comprise from 0.01 to 10%, particularly preferably from 0.05 to 5% and most preferably from 0.1 to 3% of compounds of formula I according to the invention.

The media preferably comprise one, two or three, more preferably one or two and most preferably one compound of the formula I according to the invention.

In a preferred embodiment of the invention the double layer liquid crystal device comprises a first and second layer both independently comprising an alignment aid comprising a compound of formula I as described above and below.

In another preferred embodiment the alignment aid of the first and second layer are selected to have a different induced direction of alignment under a given polarized UV light, where the first alignment aid has an alignment vertical to the used polarized UV light, and the second alignment aid has an alignment parallel to the used polarized UV light.

In a preferred embodiment the alignment aids of the first and second layer are selected to have a wavelength of maximum absorption differing by 30 nm or more. This way it is possible to address the alignment aids and their respective layers separately with a suitable wavelength of the UV light used for isomerization or polymerization.

In another preferred embodiment the double layer liquid crystal device comprises a first layer comprising an alignment aid comprising a compound of formula I as described above and below, and a second layer comprising a vertical self-alignment additive of formula (2), MES-$R^a$ (2)

in which

MES is a calamitic mesogenic group comprising two or more rings, which are connected directly or indirectly to each other or which are condensed to each other, which are optionally substituted and which mesogenic group is optionally substituted additionally by one or more polymerizable groups P, which are connected to MES directly or via a spacer, and $R^a$ is a polar anchor group, residing in a terminal position of the calamitic mesogenic group MES which comprises at least one carbon atom and at least one group selected from —OH, —SH, —COOH, —CHO or primary or secondary amine function and which optionally comprises one or two polymerizable groups P, and P a polymerizable group.

The resulting two layers have orthogonal directors of the alignment, one is planar in any chosen direction and the other one is vertical.

The term "polymerized molecular compound" refers to a polymer made by polymerizing the polymerizable groups P in the current formulae. The group P typically is a methacrylate or an acrylate group.

Self-alignment additives with polymerizable groups can be polymerized in the LC medium under the same or similar conditions as applied for the reactive mesogens (RMs) in the PSA process. Preferably they are polymerized simultaneously.

In formula (2) the group MES preferably contains rings, which are selected from aromatic, alicyclic and heterocyclic groups, as defined above, including their preferred meanings. Most preferred rings are 1,4-phenylene, which may be substituted by $L^1$ and -Sp-P as defined below, or 1,4-cyclohexylene.

In formula (2) the group MES preferably is a group selected from the following structures, which may be mono- or polysubstituted by any of the substituents $L^1$ and -Sp-P:

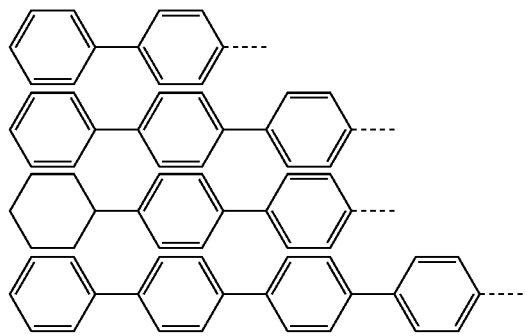

wherein

L¹ in each case, independently of one another, denotes F, Cl, Br, I, —CN, —NO₂, —NCO, —NCS, —OCN, —SCN, —C(=O)N(R⁰)₂, —C(=O)R⁰, optionally substituted silyl, optionally substituted aryl or cycloalkyl having 3 to 20 C atoms, or straight-chain or branched alkyl, alkenyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denotes a polymerizable group, and Sp denotes a spacer group or a single bond, and the dotted line indicates the attachment point of the polar anchor group $R^a$.

Preferably the self-alignment additive for vertical alignment of formula (2) is selected from formula (2a)

$$R^1\text{-}[A^2\text{-}Z^2]_m\text{-}A^1\text{-}R^a \quad (2a)$$

in which

A¹, A² each, independently of one another, denote an aromatic, heteroaromatic, alicyclic or heterocyclic group, which may also contain fused rings, and which may also be mono- or polysubstituted by a group L¹ or -Sp-P, preferably an aromatic group, more preferably 1,4-phenylene or 1,4-cyclexanediyl, both optionally substituted, L¹ in each case, independently of one another, denotes F, Cl, Br, I, —CN, —NO₂, —NCO, —NCS, —OCN, —SCN, —C(=O)N(R⁰)₂, —C(=O)R⁰, optionally substituted silyl, optionally substituted aryl or cycloalkyl having 3 to 20 C atoms, or straight-chain or branched alkyl, alkenyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denotes a polymerizable group, Sp denotes a spacer group or a single bond, Z² in each case, independently of one another, denotes a single bond,
—O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n1}$—, —CF₂CH₂—, —CH₂CF₂—, —(CF₂)$_{n1}$—, —CH=CH—, —CF=CF—, —C≡C—, —CH=CH—COO—, —OCO—CH=CH—, —(CR⁰R⁰⁰)$_n$—, —CH(-Sp-P)—, —CH₂CH(-Sp-P)—, or —CH(-Sp-P)CH(-Sp-P)—, preferably a single bond, —CH=CH—, —CF=CF— or —C≡C—, n1 denotes 1, 2, 3 or 4, m denotes 1, 2, 3, 4, 5 or 6, preferably 1, 2, 3 or 4, R⁰ in each case, independently of one another, denotes alkyl having 1 to 12 C atoms, R⁰⁰ in each case, independently of one another, denotes H or alkyl having 1 to 12 C atoms, R¹ independently of one another, denotes H, halogen, straight-chain, branched or cyclic alkyl having 1 to 25 C atoms, in which, in addition, one or more non-adjacent CH₂ groups may each be replaced by —O—, —S—, —CH=CH—, —C≡C—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, and $R^a$ is defined as above, preferably denotes a polar anchor group which comprises at least one carbon atom and further defined by having at least one additional group selected from —OH, —NH₂, NHR¹¹, —PO(OR¹¹)₂ or —SO₂R¹¹, where R¹¹ denotes alkyl having 1 to 12 C atoms.

The anchor group $R^a$ of the self-alignment additive is more preferably defined as $R^a$ an anchor group of the formula $$-Sp^a-\left[Sp^b-Sp^c\atop\left[Sp^c-X^1\right]_p\right]_o-X^1 \qquad -Sp^a-O-C(=O)-Sp^c-X^1$$

$$-Sp^a-O-C(=O)-Sp^a-\left[Sp^b-Sp^c\atop\left[Sp^c-X^1\right]_p\right]_o-X^1$$

wherein p denotes 1 or 2, q denotes 2, 3 or 4,

B denotes a substituted or unsubstituted ring system or condensed ring system, preferably a ring system selected from benzene, pyridine, cyclohexane, dioxane or tetrahydropyran, Y, independently of one another, denotes —O—, —S—, —C(O)—, —C(O)O—, —OC(O)—, —NR¹¹— or a single bond, o denotes 0 or 1, X¹ independently of one another, denotes H, alkyl, fluoroalkyl, OH, NH₂, NHR¹¹, NR¹¹₂, —PO(OR¹¹)₂, —SO₂R¹¹, OR¹¹, C(O)OH, or —CHO, where at least one group X¹ denotes a radical selected from —OH, —NH₂, NHR¹¹, —PO(OR¹¹)₂, —SO₂R¹¹, C(O)OH and —CHO, Z¹ independently —(CO)—CH₂(CO)OCH₃, —(CO)—CH₂(CO)—(C=CH₂)—OCH₃, —(CO)—CH₂(CO)—(CH=CH)—OCH₃, —(CO)—(CO)OCH₃, —CH₂—(CO)—(CO)OCH₃, —(CO)—CH₃, or —(CO)—CH₂(CO)—(CH₂CH₂)—OCH₃, P a polymerizable group, R¹¹ denotes alkyl having 1 to 12 C atoms, R¹² H, alkyl having 1 to 12 C atoms, P or X¹, $Sp^a$, $Sp^c$, $Sp^d$ each, independently of one another, denote a spacer group or a single bond, $Sp^b$ denotes a tri- or tetravalent group, preferably CR²², N or C (for p=2), and $R^{22}$ is H, methyl, ethyl, n-propyl, i-propyl, n-butyl, tert-butyl, n-pentyl, or —CH$_2$CH$_2$-tert-butyl.
$R^a$ denotes preferably
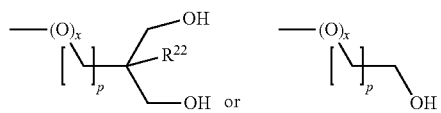
wherein p=1, 2, 3, 4, 5 or 6,
x=1 or 0, preferably 1, and
$R^{22}$ is H, methyl, ethyl, n-propyl, i-propyl, n-butyl, tert-butyl, n-pentyl, or —CH$_2$CH$_2$-tert-butyl,
in particular selected from
—O(CH$_2$)$_2$—OH,
—O(CH$_2$)$_3$—OH,
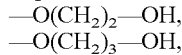
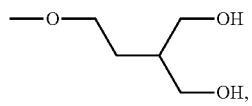
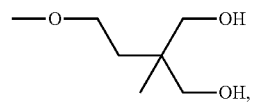
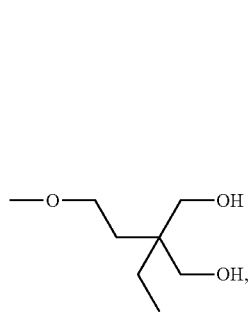
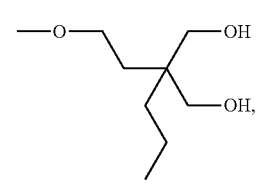
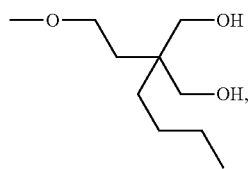
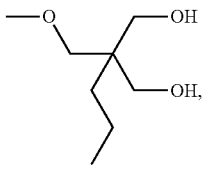
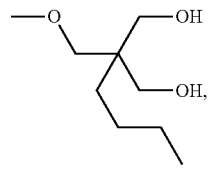
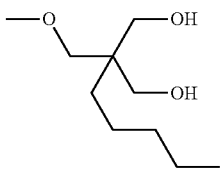
Most preferably the self-alignment additive is of formula (2b)
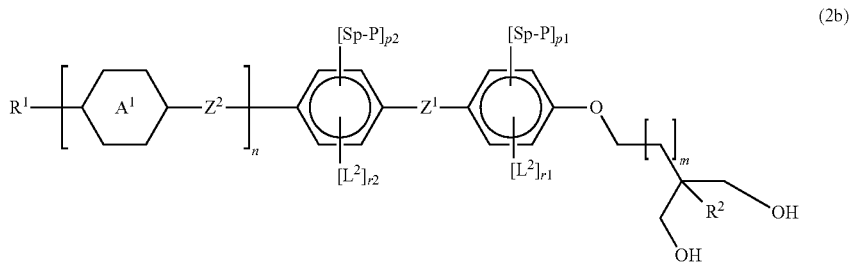
(2b)

in which

R¹ denotes H, an alkyl or alkoxy radical having 1 to 15 C atoms, where, in addition, one or more CH₂ groups in these radicals may each be replaced, independently of one another, by —CH=CH—, —C≡C—, —CF₂O—, —CH=CH—,

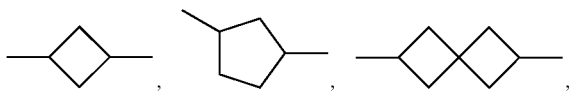

—O—, —CO—O—, —O—CO— in such a way that O atoms are not linked directly to one another, and in which, in addition, one or more H atoms may each be replaced by halogen, R² denotes H or an alkyl radical having 1 to 8 C atoms, in particular H, CH₃, C₂H₅, C₃H₇, C₄H₉ or C₅H₁₁,

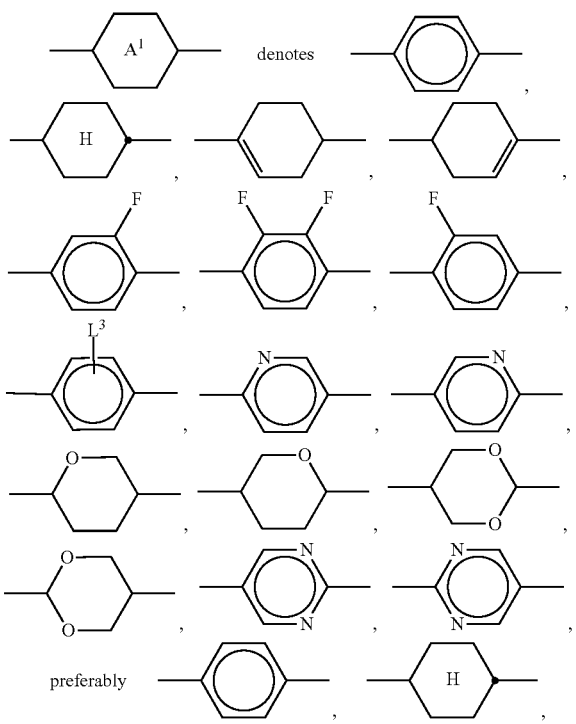

L¹ and L² in each case, independently of one another, denotes F, Cl, Br, I, —CN, —NO₂, —SCN, straight-chain or branched alkyl, alkoxy, alkylcarbonyl, alkoxycarbonyl, alkylcarbonyloxy or alkoxycarbonyloxy having 1 to 5 C atoms, in which, in addition, one or more H atoms may each be replaced by F or Cl, preferably ethyl, methyl or F, L³ in each case, independently of one another, denotes H, F, Cl, Br, I, —CN, —NO₂, —NCO, —NCS, —OCN, —SCN, straight-chain or branched alkyl, alkoxy, alkylcarbonyl, alkoxycarbonyl, alkylcarbonyloxy or alkoxycarbonyloxy having 1 to 5 C atoms, in which, in addition, one or more H atoms may each be replaced by F or Cl, m denotes 0, 1 or 2, preferably 1,
n denotes 0, 1 or 2, preferably 2,
P denotes a polymerizable group, preferably methacrylate,
Sp denotes a spacer group (also called spacer) or a single bond, preferably —CH₂CH₂— or —CH₂CH₂CH₂—, Z¹ and Z² in each case, independently of one another, denotes a single bond, —O—, —S—, —CO—, —CO—O—, —OCO—, —O—CO—O—, —OCH₂—, —CH₂—, —CH₂O—, —CF₂O—, —OCF₂—, —CH₂CH₂—, —(CH₂)₄—, —CF₂CH₂—, —CH₂CF₂—, —CF₂CF₂—, —CH=CH—, —CF=CF—, —C≡C—, —CH=CH— COO— or —OCO—CH=CH—, preferably a single bond or —CH₂CH₂—, more preferably a single bond, p1 denotes 1, 2 or 3, preferably 2,
r1, 0, 1, 2 or 3, wherein p1+r1<4,
p2 denotes 0, 1, 2 or 3, preferably 0,
r2 denotes 0, 1, 2 or 3, preferably 1 or 2, whereas p2+r2≤4.

In a preferred embodiment, the LC-host mixture (component B) according to the present invention comprises one or more, preferably two or more, low-molecular-weight (i.e. monomeric or unpolymerized) compounds. The latter are stable or unreactive with respect to a polymerization reaction or photoalignment under the conditions used for the polymerization of the polymerizable compounds or photoalignment of the photoreactive mesogen of formula I.

In principle, a suitable host mixture is any dielectrically negative or positive LC mixture. Typical examples include mixtures, which are suitable for use in conventional VA, IPS or FFS displays. Mixtures suitable for other uses may be equally employed.

Suitable LC mixtures are known to the person skilled in the art and are described in the literature. LC media for VA displays having negative dielectric anisotropy are described in for example EP 1378557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851, WO 96/28 521 and WO2012/079676.

Preferred embodiments of the liquid-crystalline medium having negative or positive dielectric anisotropy according to the invention are indicated below and explained in more detail by means of the working examples.

The LC host mixture is preferably a nematic LC mixture, and preferably does not have a chiral LC phase.

In a preferred embodiment of the present invention the LC medium contains an LC host mixture with negative dielectric anisotropy. Preferred embodiments of such an LC medium, and the corresponding LC host mixture, are those of sections a)-z) below:

a) LC medium which comprises one or more compounds of the formulae CY and/or PY:

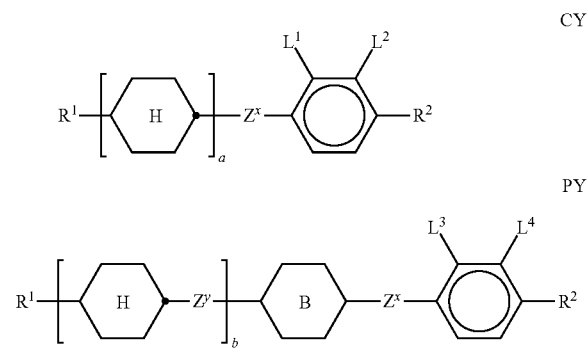

wherein
a denotes 1 or 2,
b denotes 0 or 1,

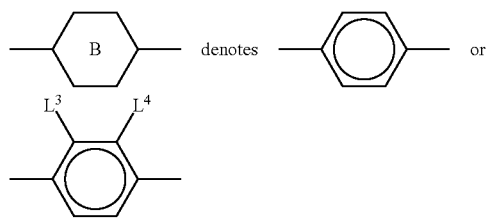

R$^1$ and R$^2$ each, independently of one another, denote alkyl having 1 to 12 C atoms, where, in addition, one or two non-adjacent CH$_2$ groups may each be replaced by —O—, —CH=CH—, —CO—, —OCO— or —COO— in such a way that O atoms are not linked directly to one another, preferably alkyl or alkoxy having 1 to 6 C atoms, Z$^x$ and Z$^y$ each, independently of one another, denote —CH$_2$CH$_2$—, —CH=CH—, —CF$_{20}$—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, and L$^{1-4}$ each, independently of one another, denote F, Cl, OCF$_3$, CF$_3$, CH$_3$, CH$_2$F, or CHF$_2$.

Preferably, both L$^1$ and L$^2$ denote F or one of L$^1$ and L$^2$ denotes F and the other denotes C$_1$, or both L$^3$ and L$^4$ denote F or one of L$^3$ and L$^4$ denotes F and the other denotes C$_1$.

The compounds of the formula CY are preferably selected from the group consisting of the following sub-formulae:

CY1
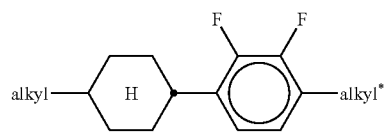

CY2
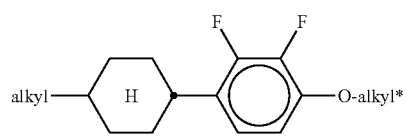

CY3
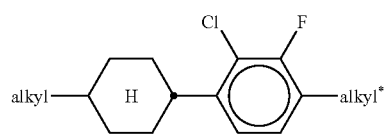

CY4
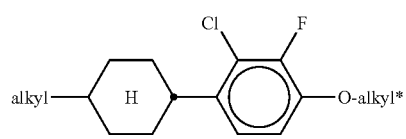

CY5
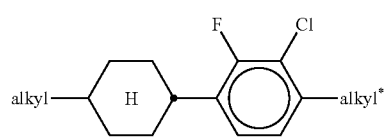

CY6
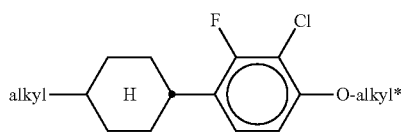

CY7
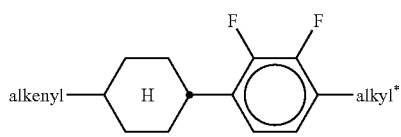

CY8
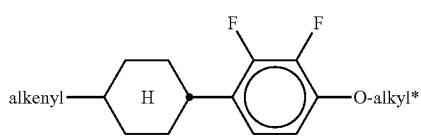

CY9

CY10

CY11
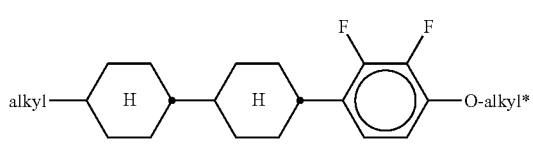

CY12
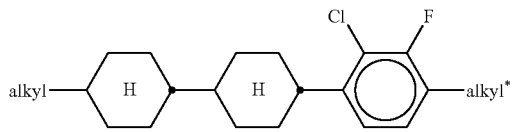

CY13
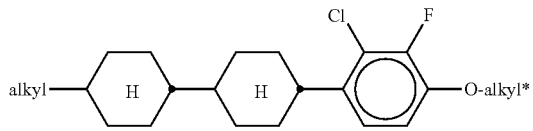

CY14
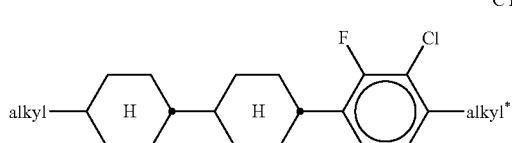

CY15
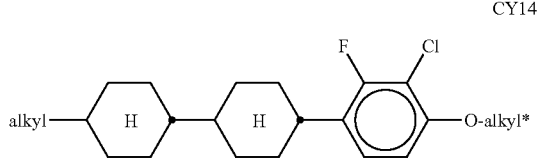

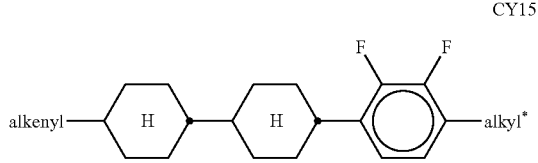

CY16
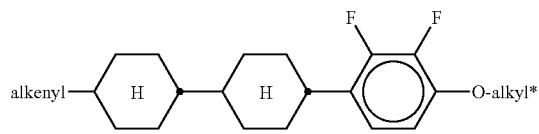

CY17
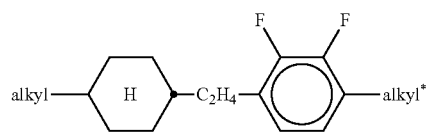

CY18
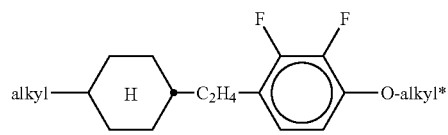

CY19
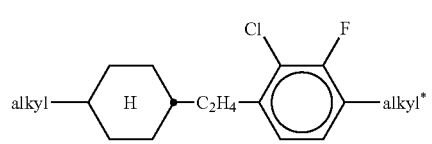

CY20
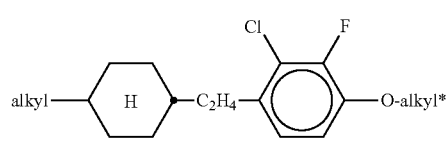

CY21
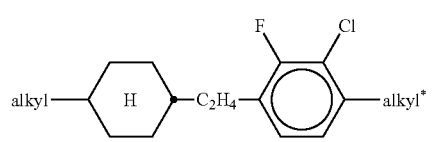

CY22
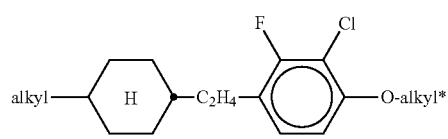

CY23
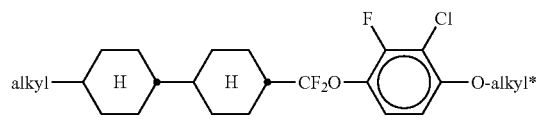

CY24
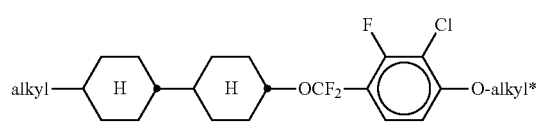

CY25
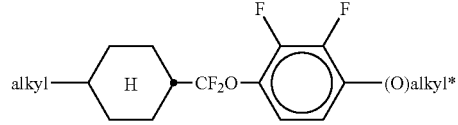

CY26
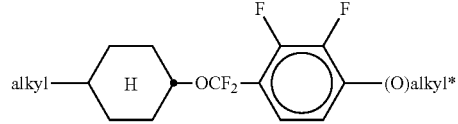

CY27
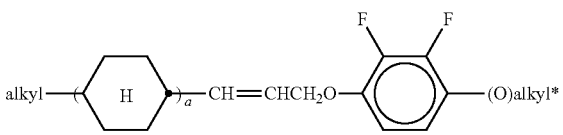

CY28
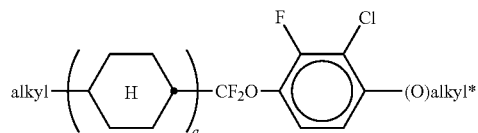

CY29
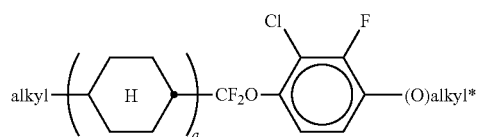

CY30
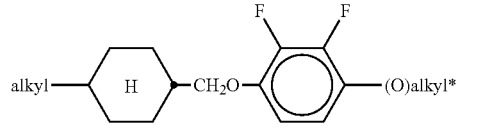

CY31
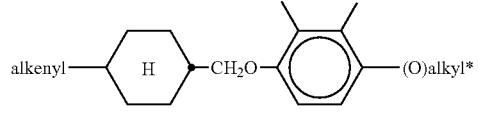

CY32
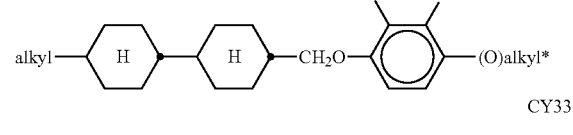

CY33
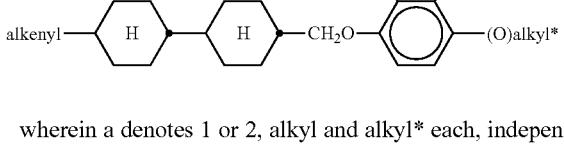

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula PY are preferably selected from the group consisting of the following sub-formulae:

PY1
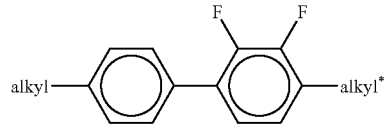

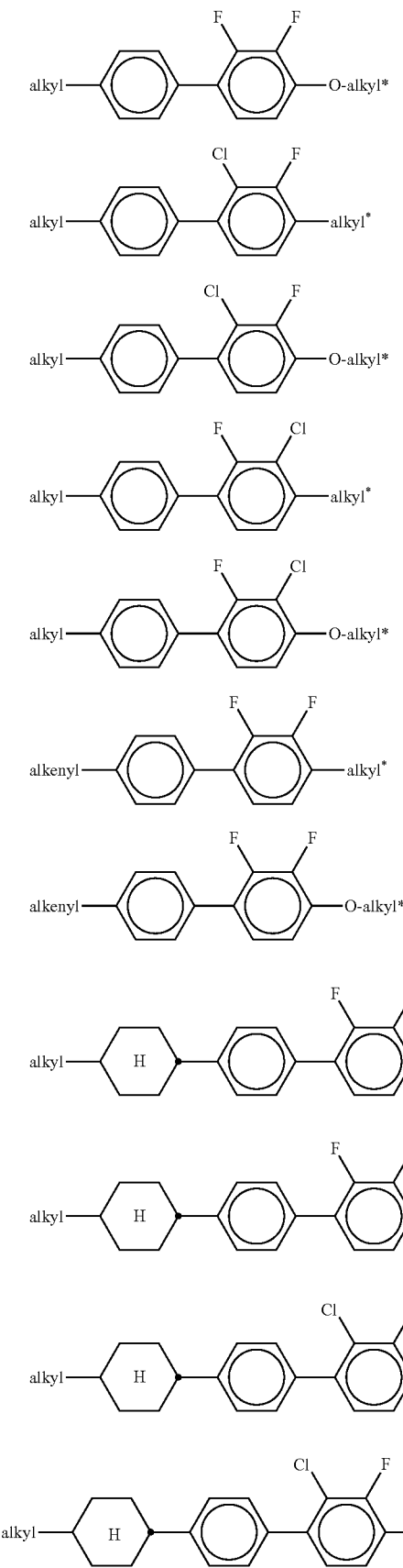
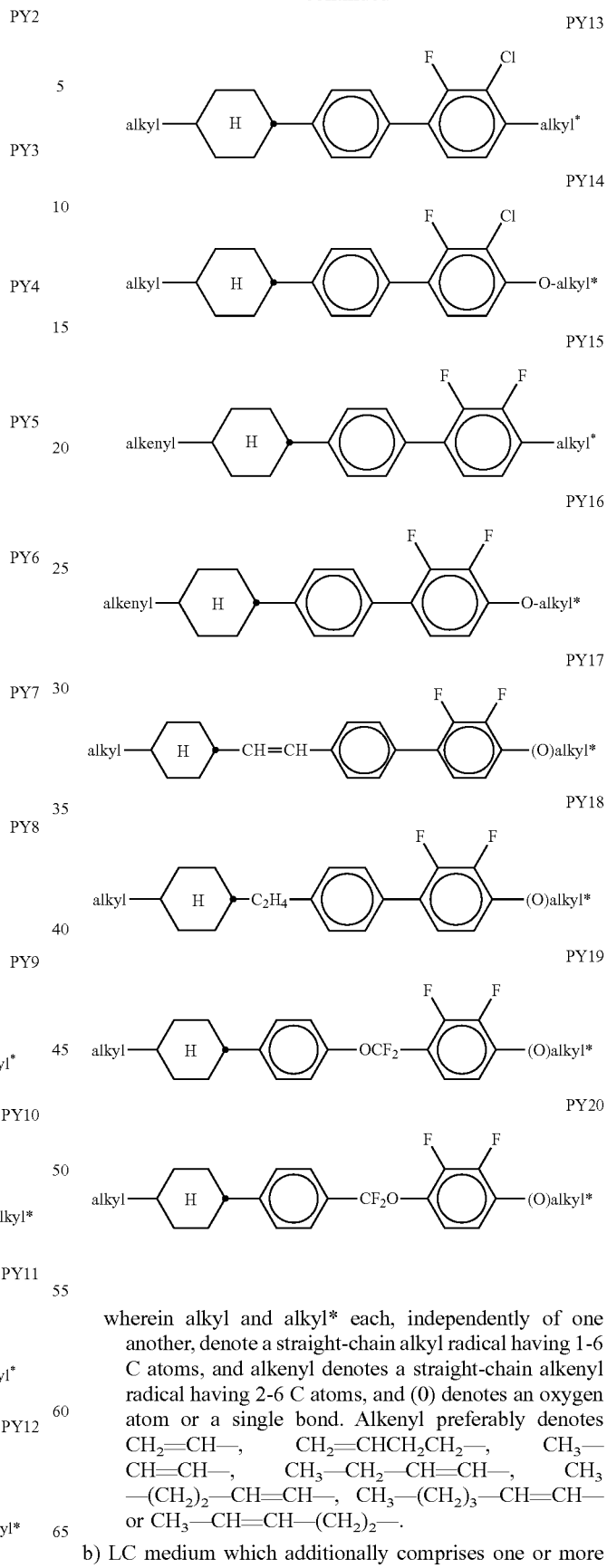

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

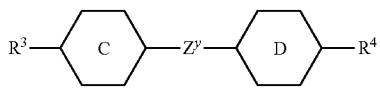

in which the individual radicals have the following meanings:

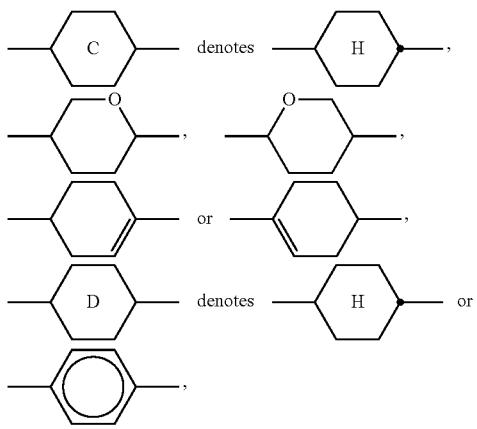

$R^3$ and $R^4$ each, independently of one another, denote alkyl having 1 to 12 C atoms, in which, in addition, one or two non-adjacent $CH_2$ groups may each be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_{20}$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula ZK are preferably selected from the group consisting of the following sub-formulae:

ZK1

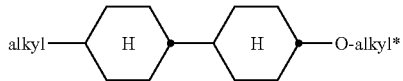
ZK2

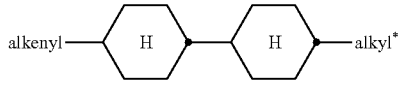
ZK3

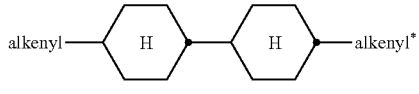
ZK4

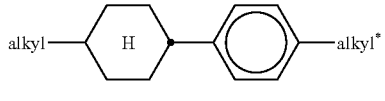
ZK5

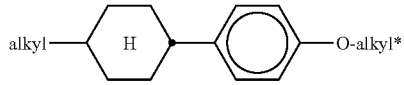
ZK6

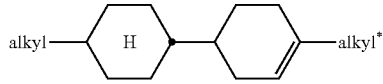
ZK7

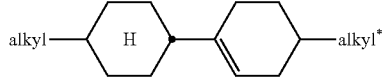
ZK8

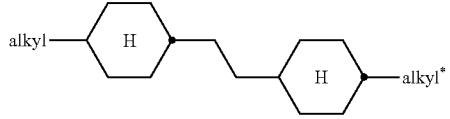
ZK9

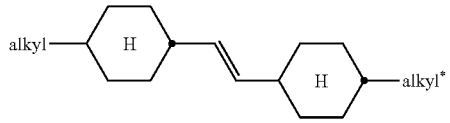
ZK10 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Especially preferred are compounds of formula ZK1 and ZK3.

Particularly preferred compounds of formula ZK are selected from the following sub-formulae:

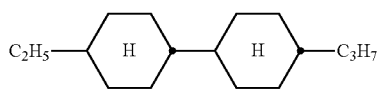
ZK1a

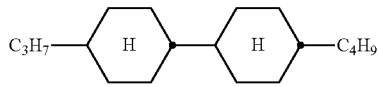
ZK1b

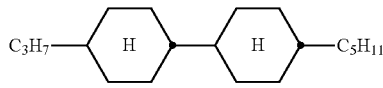
ZK1c

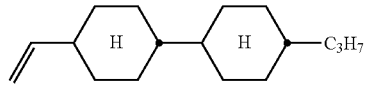
ZK3a

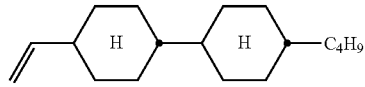
ZK3b

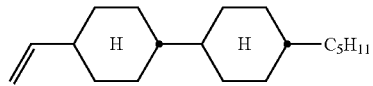
ZK3c

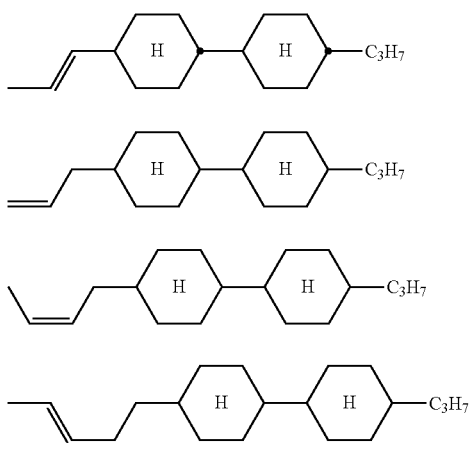

ZK3d, ZK3e, ZK3f, ZK3g wherein the propyl, butyl and pentyl groups are straight-chain groups.

Most preferred are compounds of formula ZK1a and ZK3a.

c) LC medium which additionally comprises one or more compounds of the following formula:

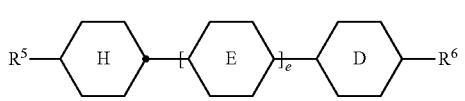

DK in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may each be replaced by —O—, —CH=CH—, —CO—, —OCO— or —COO— in such a way that O atoms are not linked directly to one another, preferably alkyl or alkoxy having 1 to 6 C atoms,

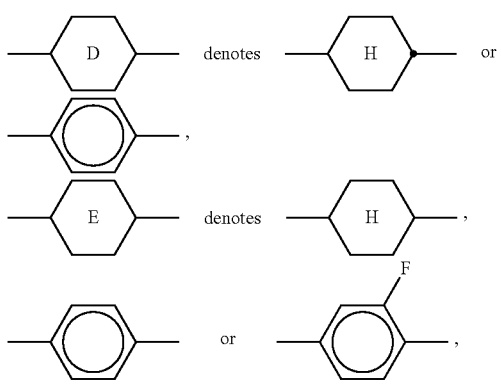

e denotes 1 or 2.

The compounds of the formula DK are preferably selected from the group consisting of the following sub-formulae:

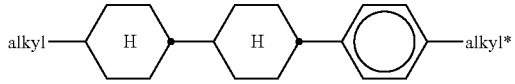
DK1

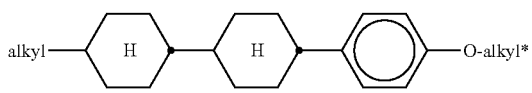
DK2

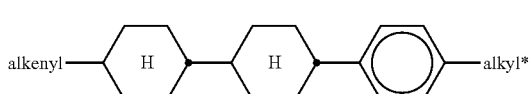
DK3

DK4

DK5

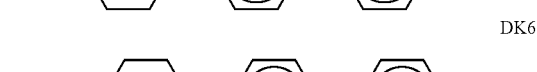
DK6

DK7

DK8

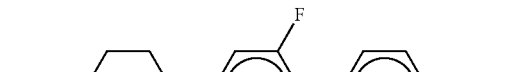
DK9

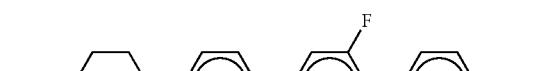
DK10

DK11

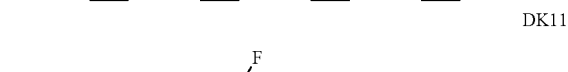
DK12 in which alkyl and alkyl* each, independently of one another, denote a straight-chain alkyl radical having 1-6

C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

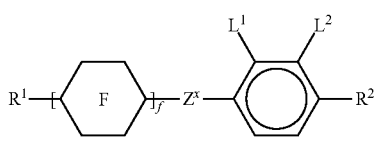

LY in which the individual radicals have the following meanings:

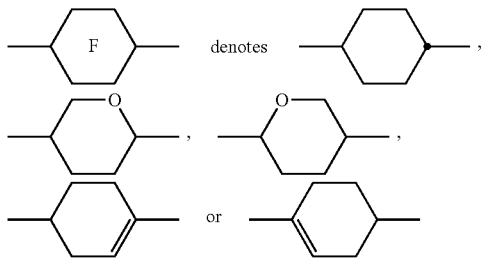

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may each be replaced by $-O-$, $-CH=CH-$, $-CO-$, $-OCO-$ or $-COO-$ in such a way that O atoms are not linked directly to one another, $Z^x$ denotes $-CH_2CH_2-$, $-CH=CH-$, $-CF_{2O}-$, $-OCF_2-$, $-CH_2O-$, $-O CH_2-$, $-CO-O-$, $-O-CO-$, $-C_2F_4-$, $-CF=CF-$, $-CH=CH-CH_2O-$ or a single bond, preferably a single bond, and $L^1$ and $L^2$ each, independently of one another, denote F, Cl, $OCF_3$, $CF_3$, $CH_3$, $CH_2F$, or $CHF_2$.

Preferably, both radicals $L^1$ and $L^2$ denote F or one of the radicals $L^1$ and $L^2$ denotes F and the other denotes $C_1$.

The compounds of the formula LY are preferably selected from the group consisting of the following sub-formulae:

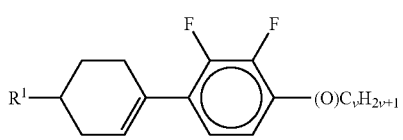

LY1

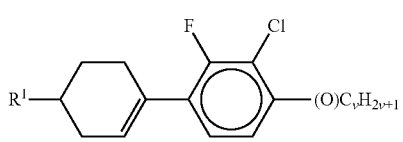

LY2

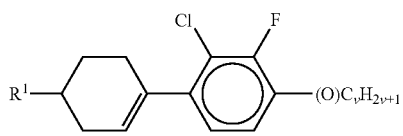

LY3

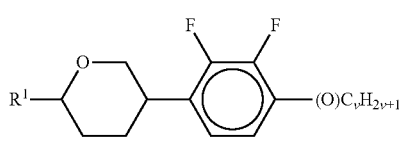

LY4

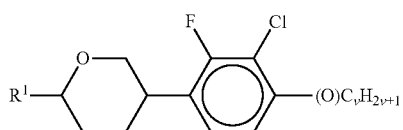

LY5

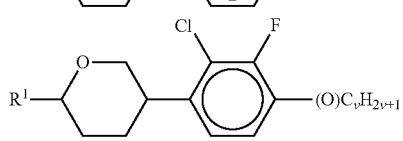

LY6

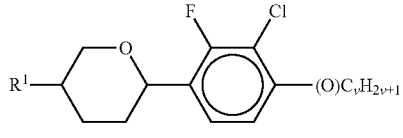

LY7

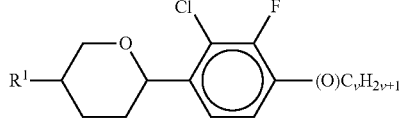

LY8

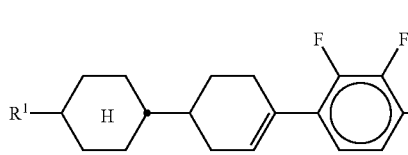

LY9

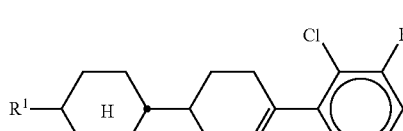

LY10

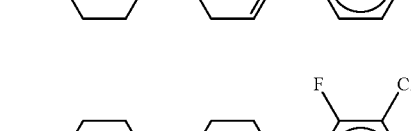

LY11

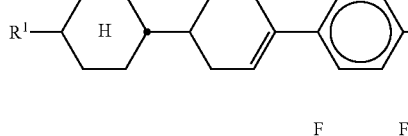

LY12

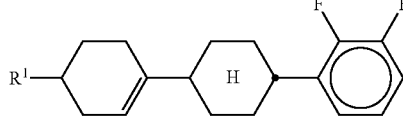

LY13

-continued

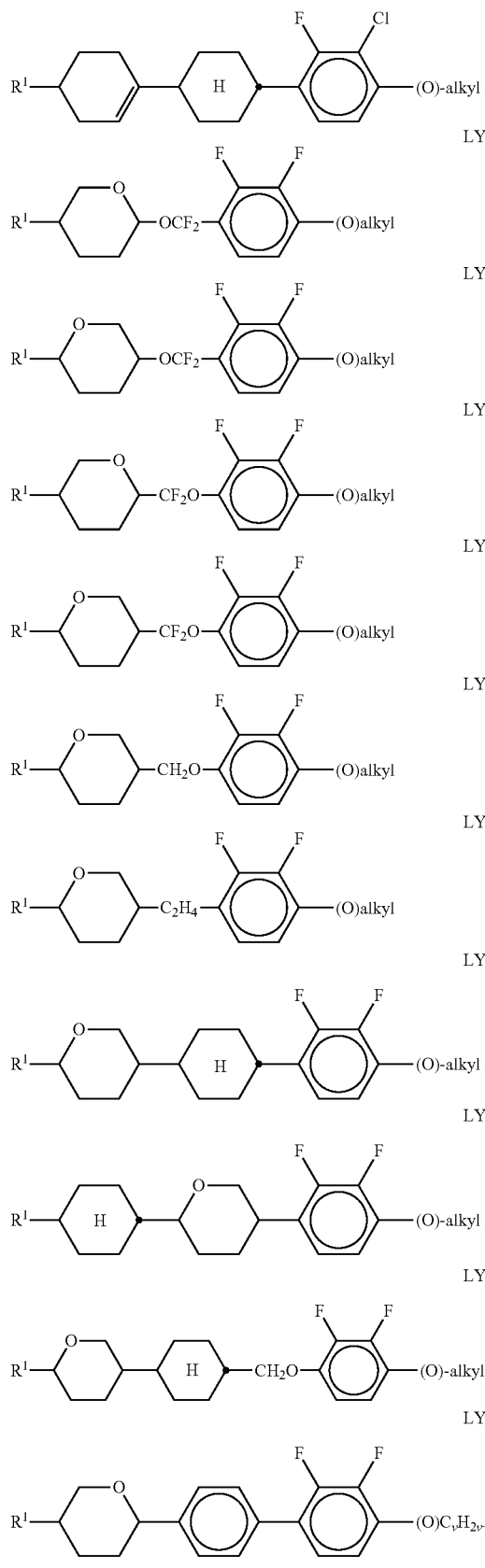

in which $R^1$ has the meaning indicated above under formula LY, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium which additionally comprises one or more compounds selected from the group consisting of the following formulae:

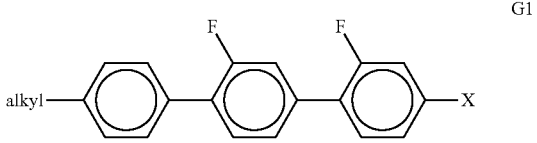
G1

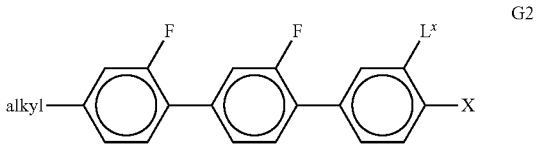
G2

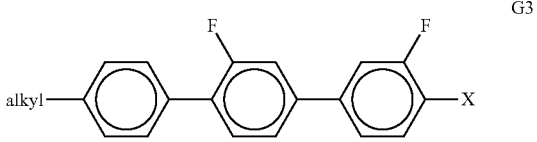
G3

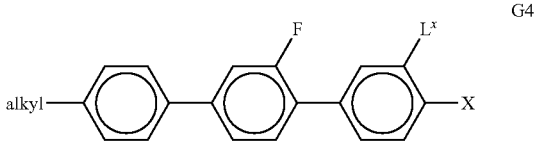
G4 in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

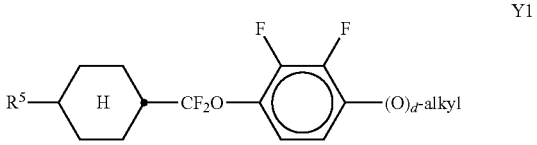
Y1

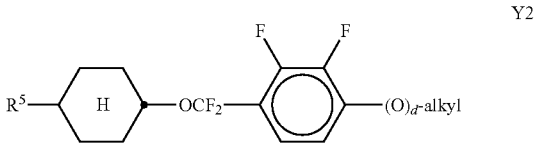
Y2

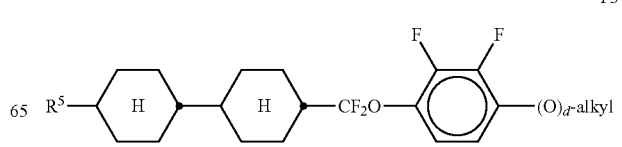
Y3

Y4
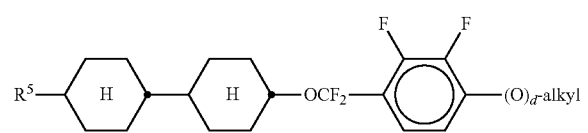

Y5
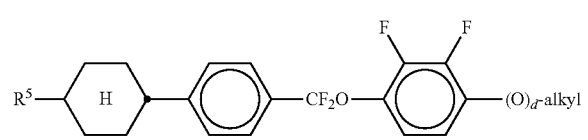

Y6
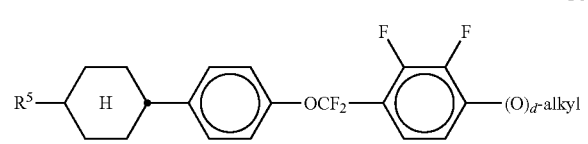

Y7
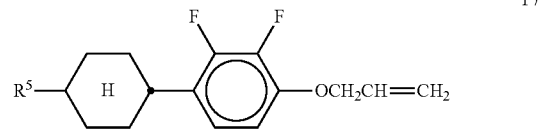

Y8
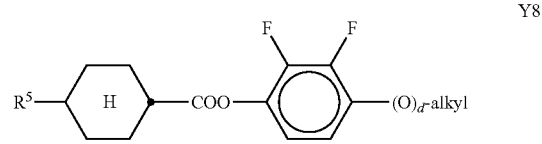

Y9
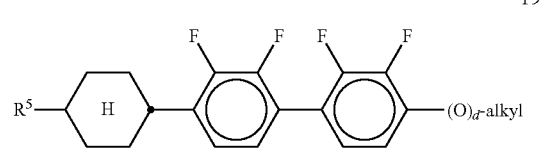

Y10
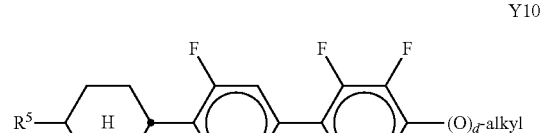

Y11
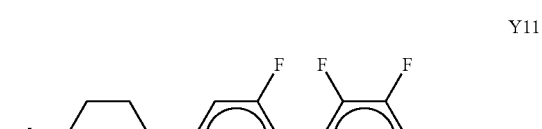

Y12
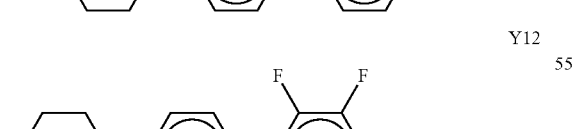

Y13
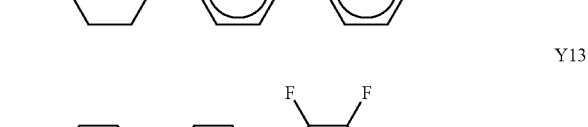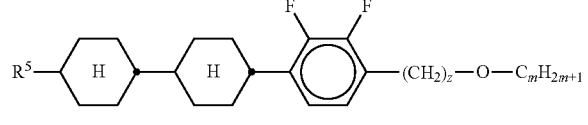

Y14
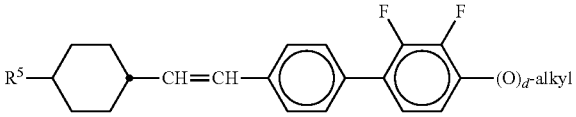

Y15
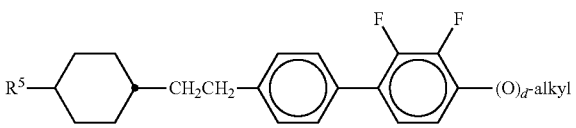

Y16
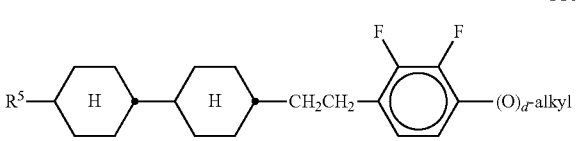

in which $R^5$ has one of the meanings indicated above under formulae CY and PY for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, and d is preferably 1. The LC medium according to the invention preferably comprises one or more compounds of the above-mentioned formulae in amounts of 5% by weight.

g) LC medium which additionally comprises one or more biphenyl compounds selected from the group consisting of the following formulae:

B1
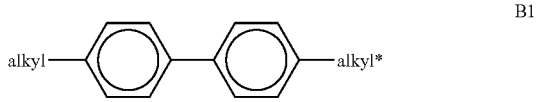

B2
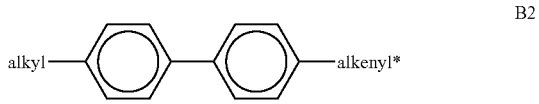

B3
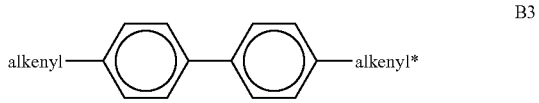

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular 5% by weight.

The compounds of the formula B2 are particularly preferred.

The compounds of the formulae B1 to B3 are preferably selected from the group consisting of the following sub-formulae:

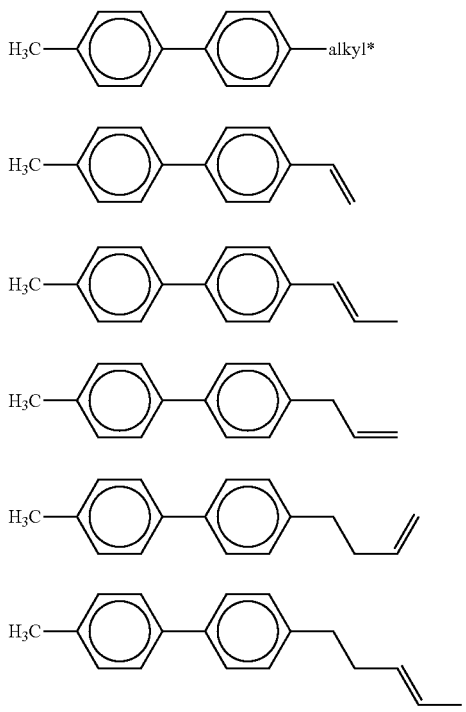

in which alkyl* denotes an alkyl radical having 1-6 C atoms. The medium according to the invention particularly preferably comprises one or more compounds of the formulae B1a and/or B2e.

h) LC medium which additionally comprises one or more terphenyl compounds of the following formula:

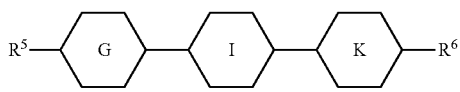

in which $R^5$ and $R^6$ each, independently of one another, have one of the meanings indicated under formula DK, and

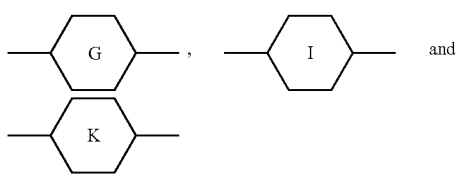

each, independently of one another, denote

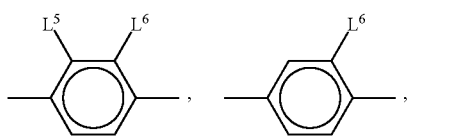

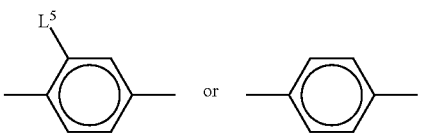

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

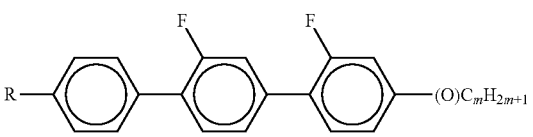

T1

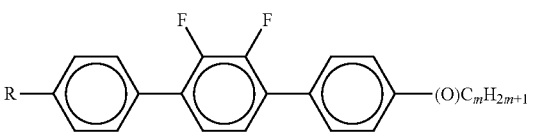

T2

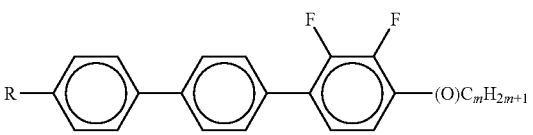

T3

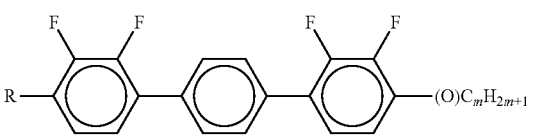

T4

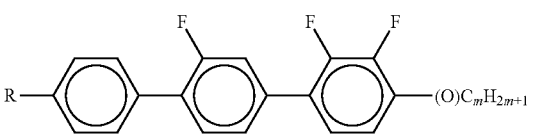

T5

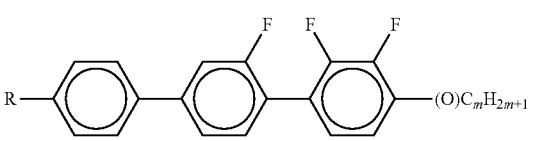

T6

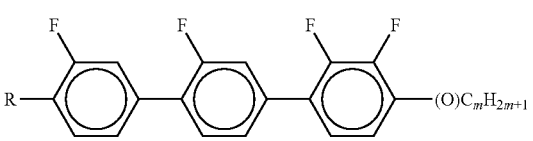

T7

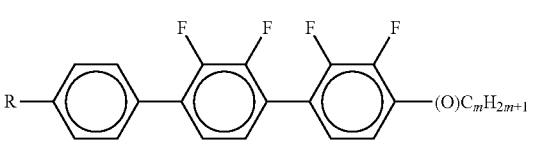

T8

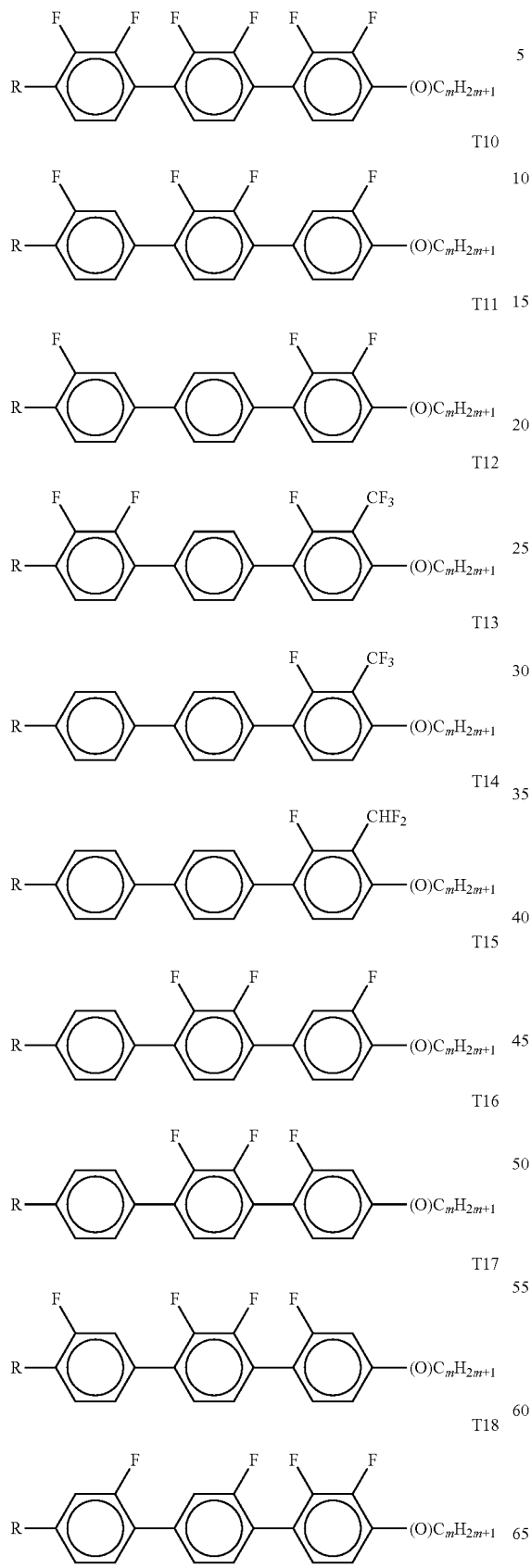
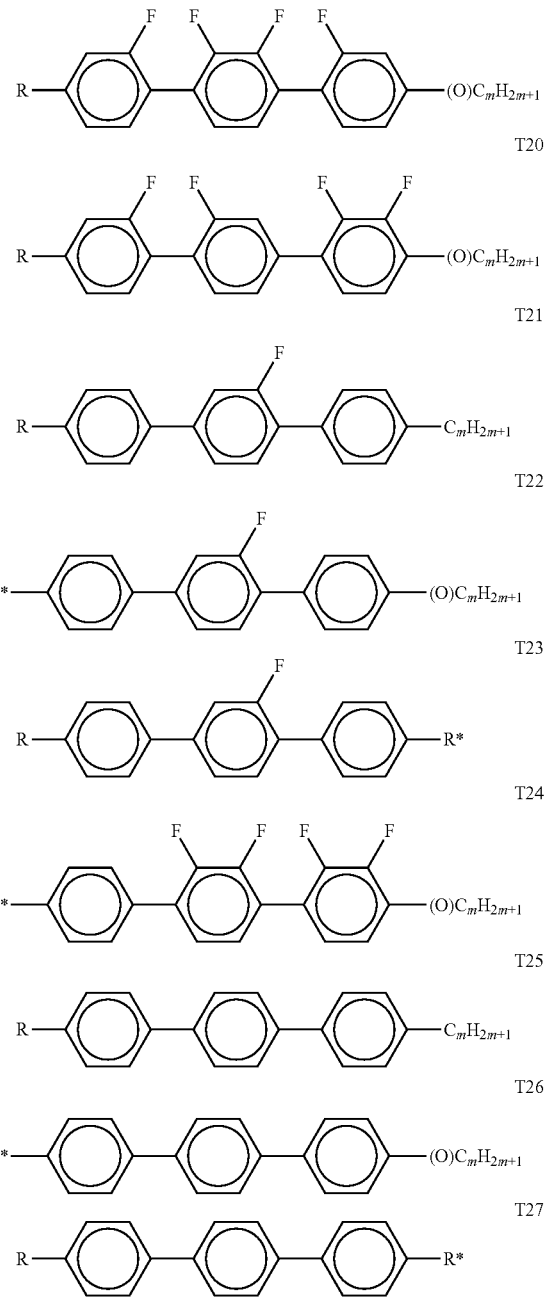

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

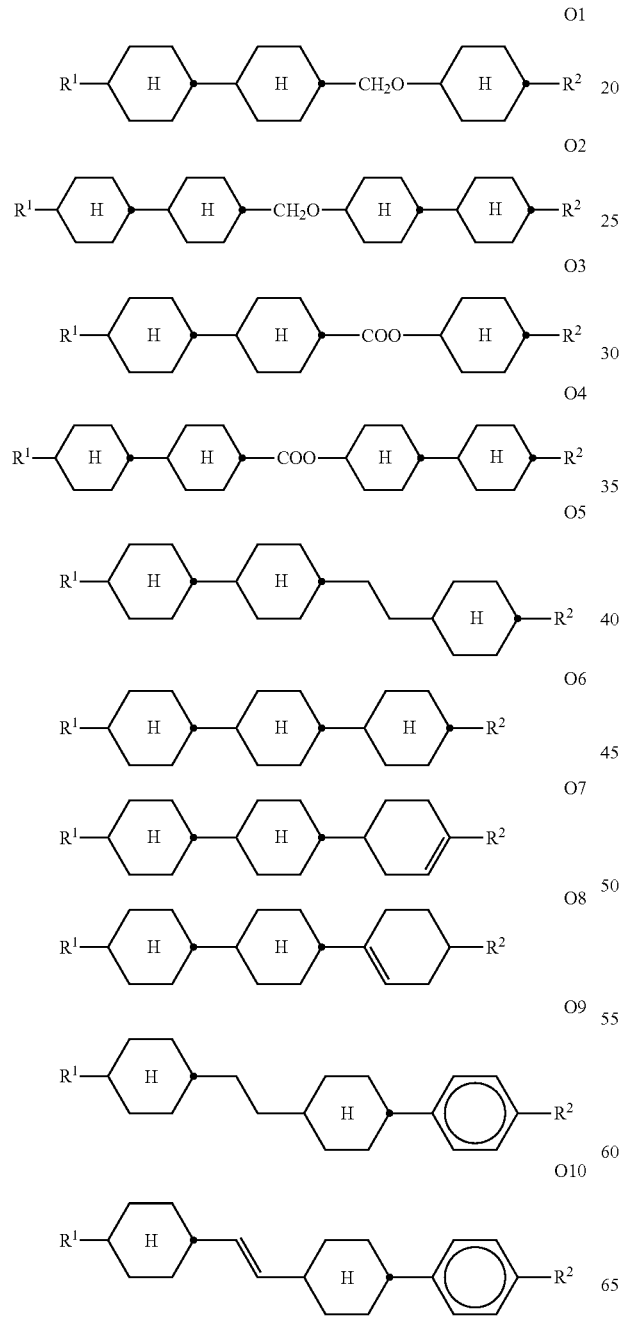

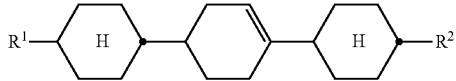

in which $R^1$ and $R^2$ have the meanings indicated above under formulas CY and PY and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

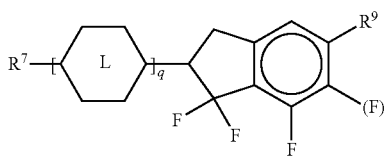

in which

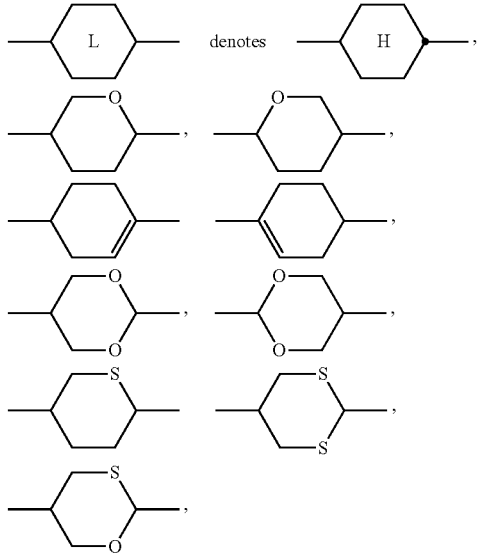

$R^9$ denotes H, $CH_3$, $C_2H_5$ or n-$C_3H_7$, (F) denotes an optional fluorine substituent, and q denotes 1, 2 or 3, and $R^7$ has one of the meanings indicated above under formulae CY and PY for $R^1$, preferably in amounts of >3% by weight, in particular >5% by weight and very particularly preferably 5-30% by weight.

Particularly preferred compounds of the formula F1 are selected from the group consisting of the following sub-formulae:

Fl1
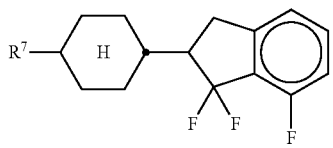

Fl2
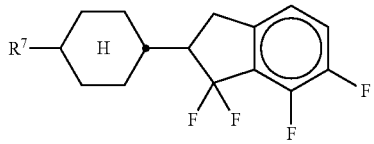

Fl3
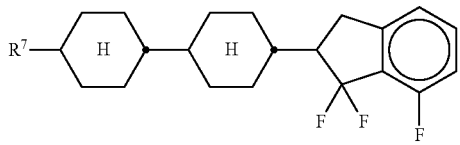

Fl4
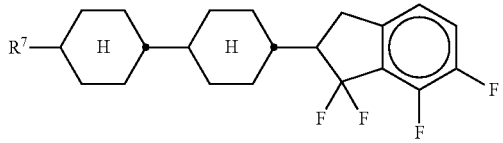

Fl5
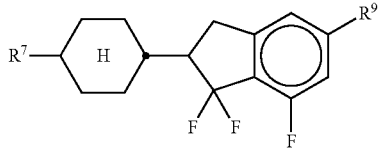

Fl6
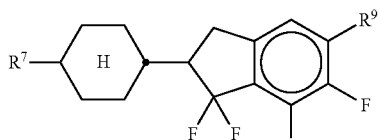

Fl7
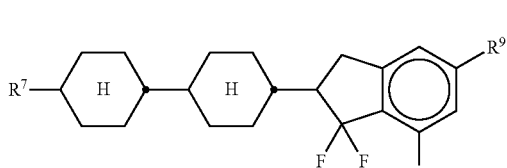

Fl8
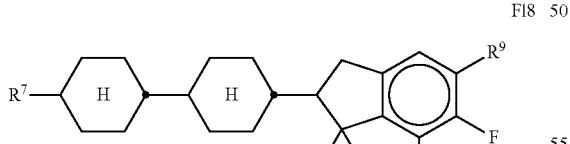

in which $R^7$ preferably denotes straight-chain alkyl, and $R^9$ denotes $CH_3$, $C_2H_5$ or n-$C_3H_7$. Particular preference is given to the compounds of the formulae $F_{11}$, $F_{12}$ and $F_{13}$.

l) LC medium which additionally comprises one or more compounds selected from the group consisting of the following formulae:

VK1
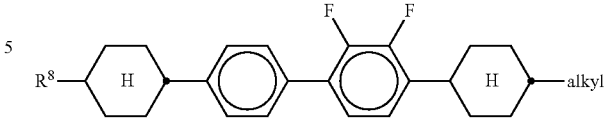

VK2
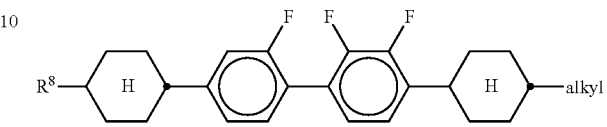

VK3
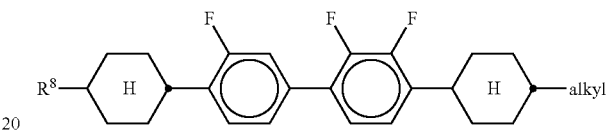

VK4

in which $R^8$ has the meaning indicated above under formulae CY and PY for $R^1$, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

N1
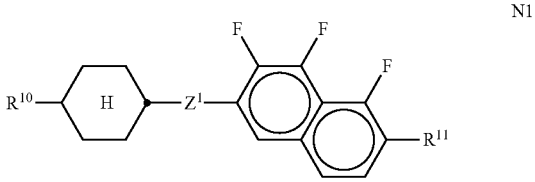

N2
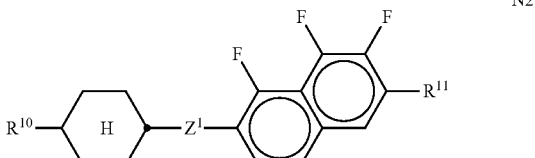

N3
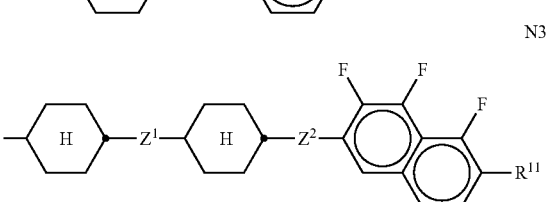

N4
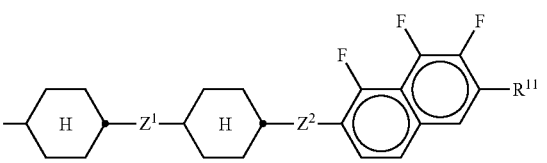

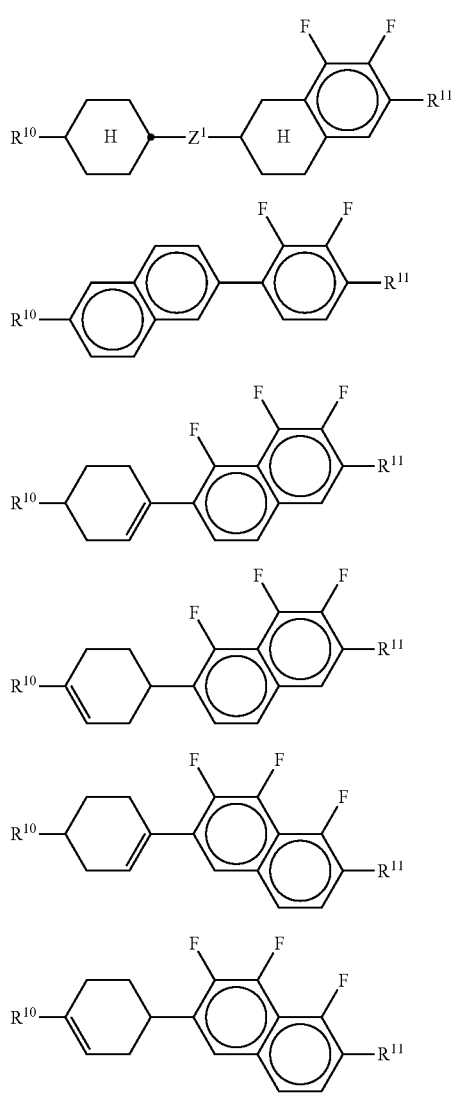

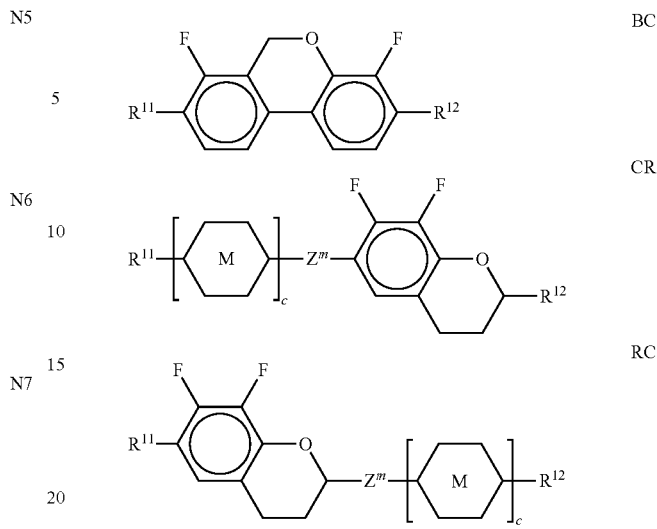

in which
R¹⁰ and R¹¹ each, independently of one another, denote alkyl having 1 to 12 C atoms, where, in addition, one or two non-adjacent CH₂ groups may each be replaced by —O—, —CH=CH—, —CO—, —OCO—, cyclopent-1,3-diyl or —COO— in such a way that O atoms are not linked directly to one another, preferably alkyl or alkoxy having 1 to 6 C atoms, and R¹⁰ and R¹¹ preferably denote straight-chain alkyl or alkoxy having 1 to 6 C atoms or straight-chain alkenyl having 2 to 6 C atoms, and $Z^1$ and $Z^2$ each, independently of one another, denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

n) LC medium which additionally comprises one or more difluoro-dibenzochromans and/or chromans of the following formulae:

in which
R¹¹ and R¹² each, independently of one another, have one of the meanings indicated above for R¹¹ under formula N1
ring M is trans-1,4-cyclohexylene or 1,4-phenylene,
$Z^m$ —C₂H₄—, —CH₂O—, —OCH₂—, —CO—O— or —O—CO—,
c is 0, 1 or 2,
preferably in amounts of 3 to 20% by weight, in particular in amounts of 3 to 15% by weight.
Particularly preferred compounds of the formulae BC, CR and RC are selected from the group consisting of the following sub-formulae:

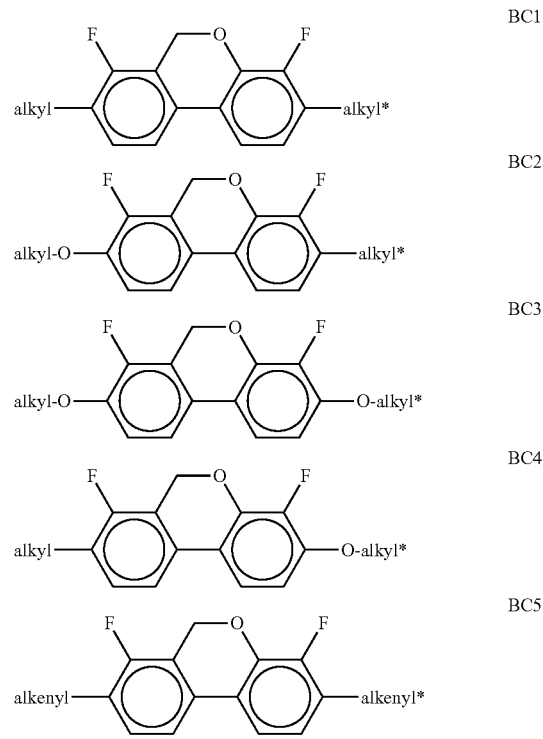

BC6
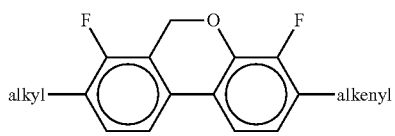

BC7
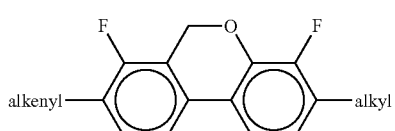

CR1
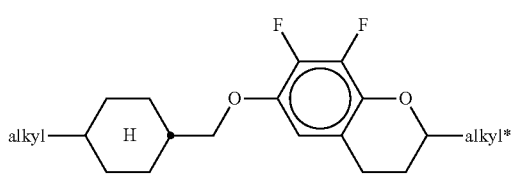

CR2
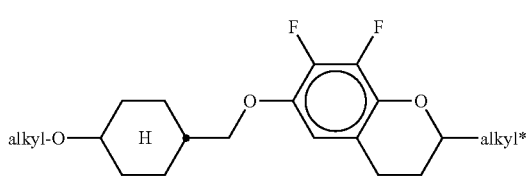

CR3
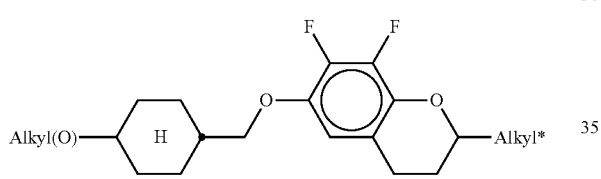

CR4
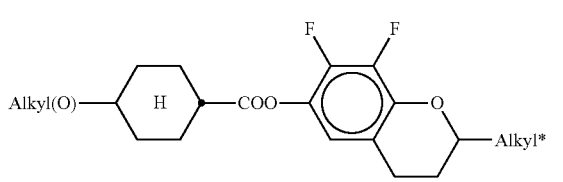

CR5
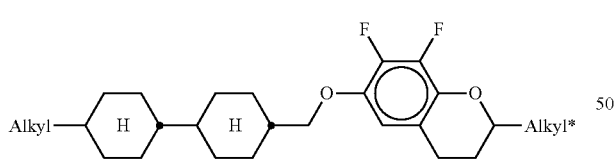

CR6
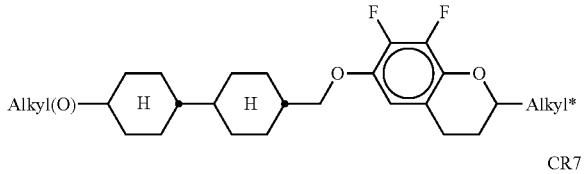

CR7
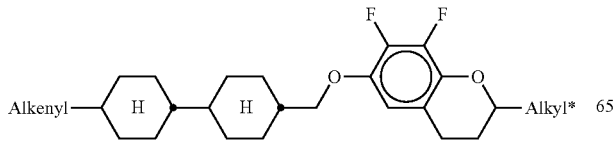

CR8
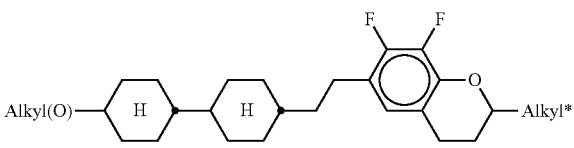

CR9
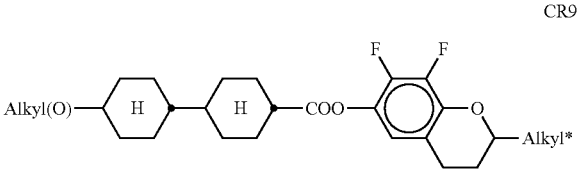

RC1
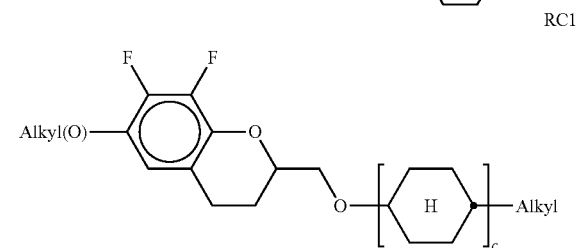

RC2
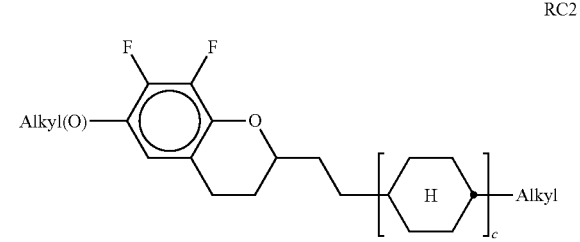

RC3
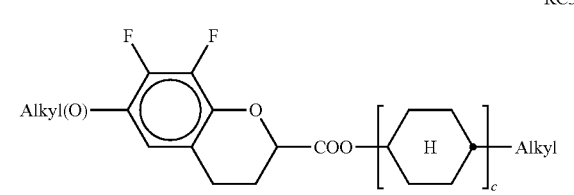

in which alkyl, alkyl*, Alkyl and Alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particular preference is given to mixtures comprising one, two or three compounds of the formula BC-2.

o) LC medium which additionally comprises one or more fluorinated phenanthrenes and/or dibenzofurans of the following formulae:

PH
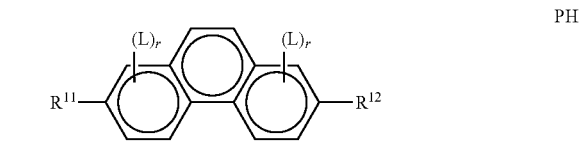

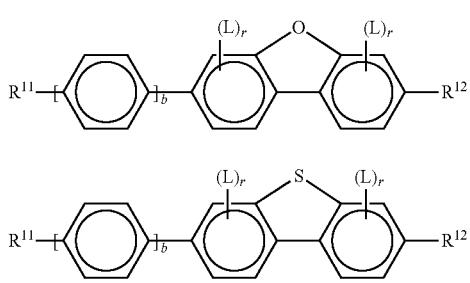

BF

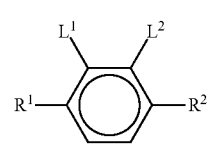

Y

BS wherein

R¹ and R² each, independently of one another, denote alkyl having 1 to 12 C atoms, where, in addition, one or two non-adjacent $CH_2$ groups may each be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, or $CHF_2$.

Preferably, both $L^1$ and $L^2$ denote F or one of $L^1$ and $L^2$ denotes F and the other denotes $C_1$, The compounds of the formula Y are preferably selected from the group consisting of the following sub-formulae:

in which $R^{11}$ and $R^{12}$ each, independently of one another, have one of the meanings indicated above for $R^{11}$ under formula N1, b denotes 0 or 1, L denotes F, and r denotes 1, 2 or 3.

Particularly preferred compounds of the formulae PH and BF are selected from the group consisting of the following sub-formulae:

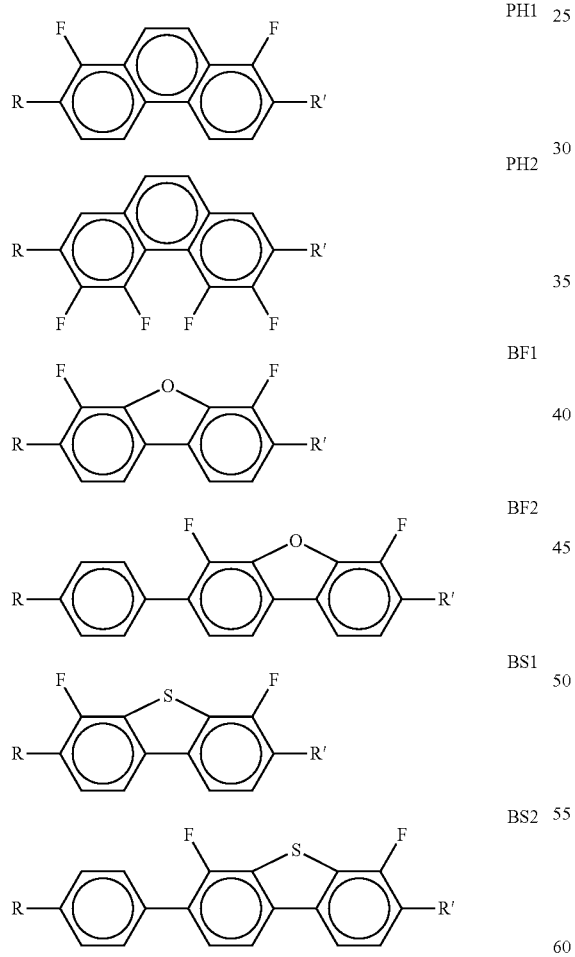

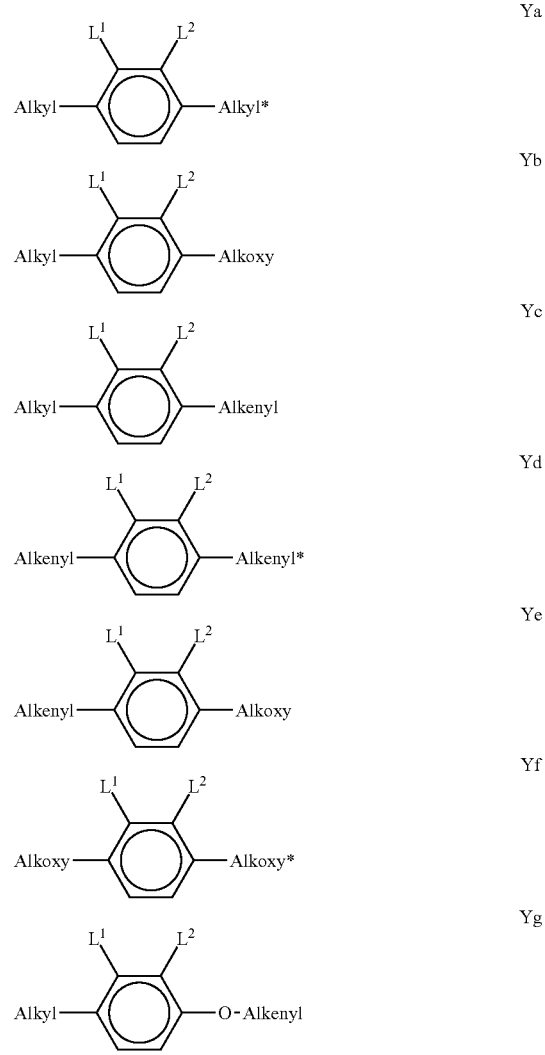

in which R and R' each, independently of one another, denote a straight-chain alkyl or alkoxy radical having 1-7 C atoms.

p) LC medium which additionally comprises one or more monocyclic compounds of the following formula

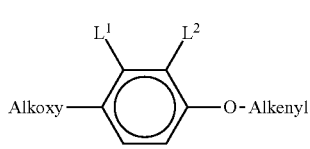
Yh

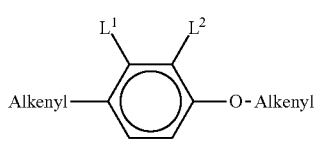
Yi

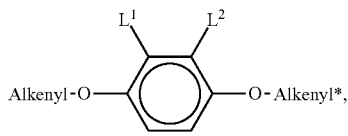
Yj in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following sub-formulae:

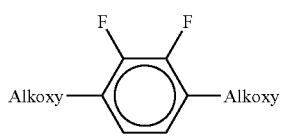
YfA

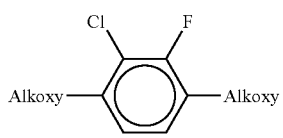
YfB wherein Alkoxy preferably denotes straight-chain alkoxy with 3, 4, or 5 C atoms.

q) LC medium, preferably of the first layer, in which the total concentration of compounds of formula I is in the range of from 0.01 to 10% by weight.

r) LC medium which comprises 1 to 5, preferably 1, 2 or 3, stabilizers.

s) LC medium in which the proportion of stabilizers in the mixture as a whole is 1 to 1500 ppm, preferably 100 to 1000 ppm.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium which contains one or more, preferably 1, 2 or 3, compounds of formula T2. The content of these compounds in the mixture as a whole is preferably 1 to 20%.

In another preferred embodiment of the present invention the LC medium contains an LC host mixture with positive dielectric anisotropy. Preferred embodiments of such an LC medium, and the corresponding LC host mixture, are those of sections aa) to mmm) below:

aa) LC-medium, characterized in that it comprises one or more compounds selected from the group of compounds of the formulae II and III

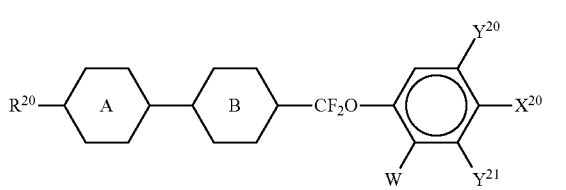
II

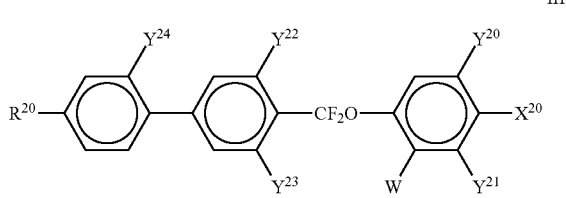
III wherein

R²⁰ each, identically or differently, denote a halogenated or unsubstituted alkyl or alkoxy radical having 1 to 15 C atoms, where, in addition, one or more CH₂ groups in these radicals may each be replaced, independently of one another, by —C≡C—, —CF₂O—, —CH=CH—,

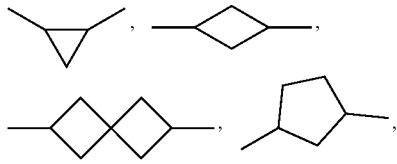

—O—, —CO—O— or —O—CO— in such a way that O atoms are not linked directly to one another, X²⁰ each, identically or differently, denote F, Cl, CN, SF₅, SCN, NCS, a halogenated alkyl radical, a halogenated alkenyl radical, a halogenated alkoxy radical or a halogenated alkenyloxy radical, each having up to 6 C atoms, and Y²⁰⁻²⁴ each, identically or differently, denote H or F;

W denotes H or methyl, and

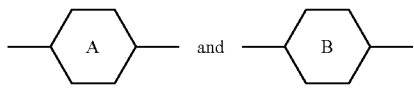

each, independently of one another, denote

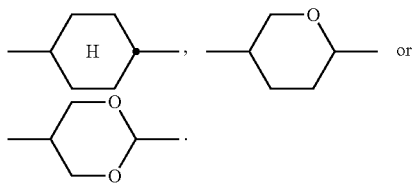

The compounds of the formula II are preferably selected from the following formulae:

IIa

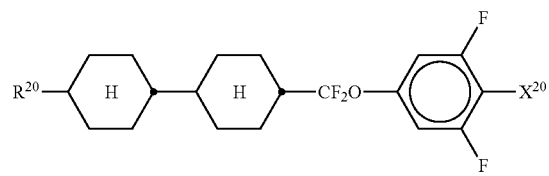

IIb

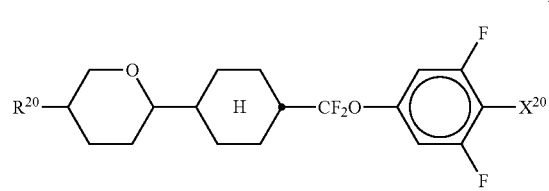

IIc

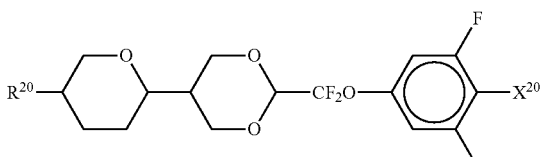

IId

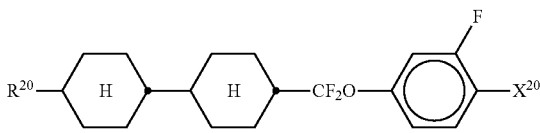

IIe

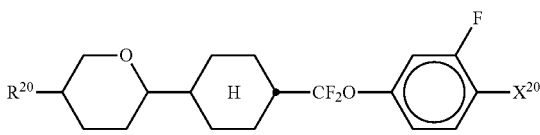

IIf

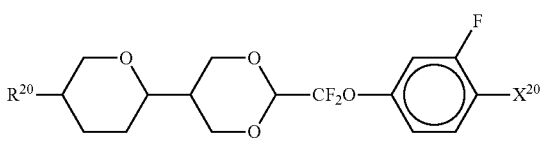

wherein R²⁰ and X²⁰ have the meanings indicated above.

R²⁰ preferably denotes alkyl having 1 to 6 C atoms. X²⁰ preferably denotes F. Particular preference is given to compounds of the formulae IIa and IIb, in particular compounds of the formulae IIa and IIb wherein X denotes F.

The compounds of the formula III are preferably selected from the following formulae:

IIIa

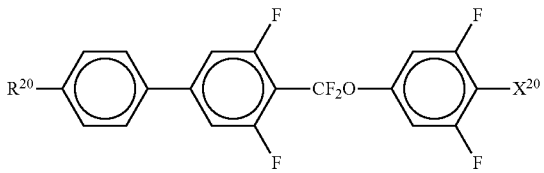

IIIb

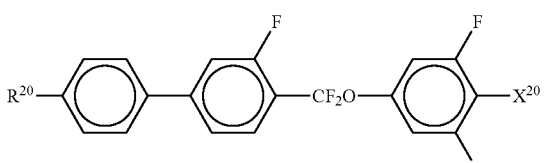

IIIc

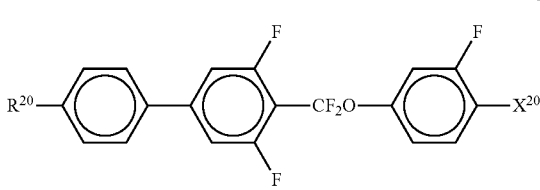

-continued

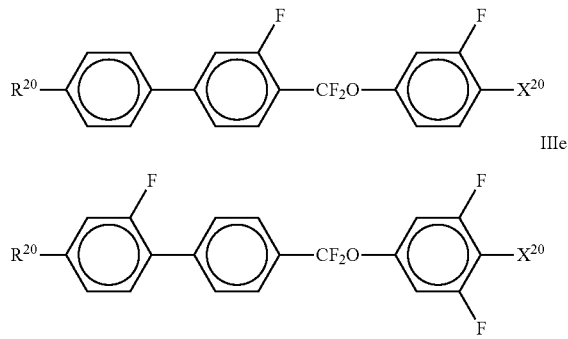

IIId

IIIe wherein $R^{20}$ and $X^{20}$ have the meanings indicated above. $R^{20}$ preferably denotes alkyl having 1 to 6 C atoms. $X^{20}$ preferably denotes F. Particular preference is given to compounds of the formulae IIIa and IIIe, in particular compounds of the formula IIIa;

bb) LC-medium additionally comprising one or more compounds selected from the following formulae:

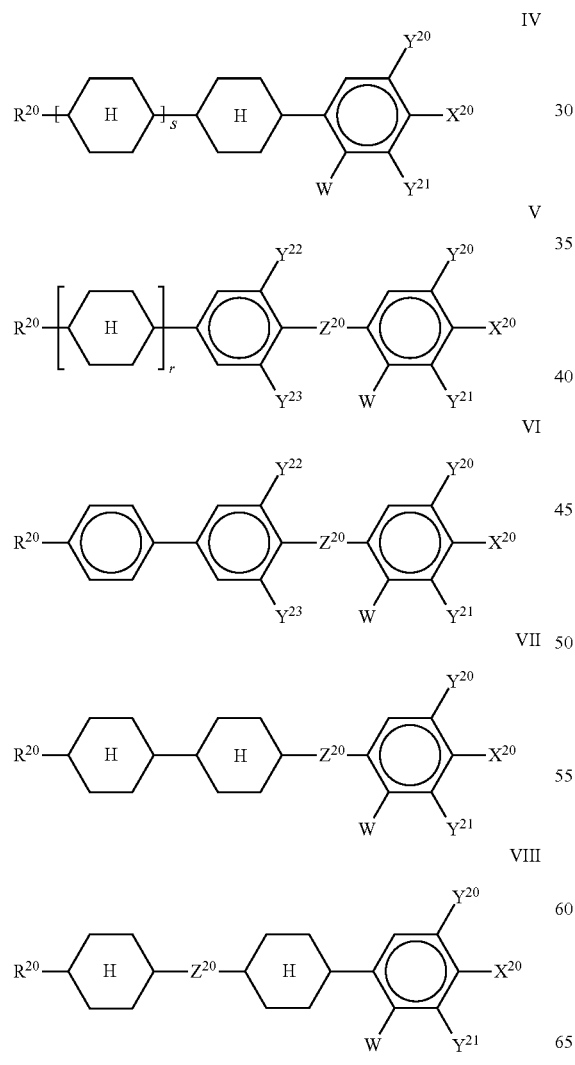

IV

V

VI

VII

VIII wherein $R^{20}$, $X^{20}$, W and $Y^{20-23}$ have the meanings indicated above under formula II, and $Z^{20}$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_{20}$—, r denotes 0 or 1, and s denotes 0 or 1;

The compounds of the formula IV are preferably selected from the following formulae:

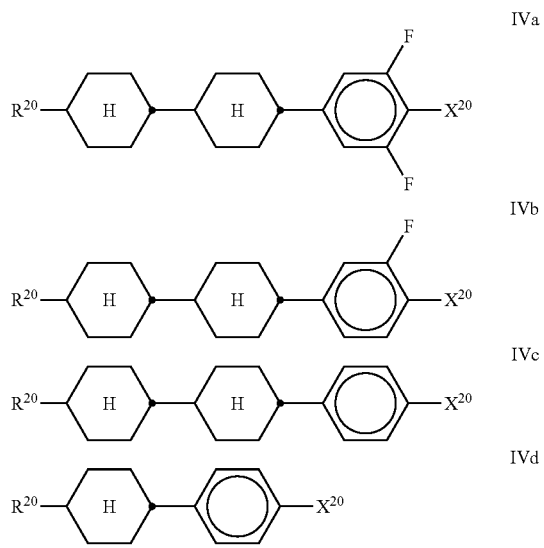

IVa

IVb

IVc

IVd wherein $R^{20}$ and $X^{20}$ have the meanings indicated above. $R^{20}$ preferably denotes alkyl having 1 to 6 C atoms. $X^{20}$ preferably denotes F or $OCF_3$, furthermore OCF=$CF_2$ or Cl;

The compounds of the formula V are preferably selected from the following formulae:

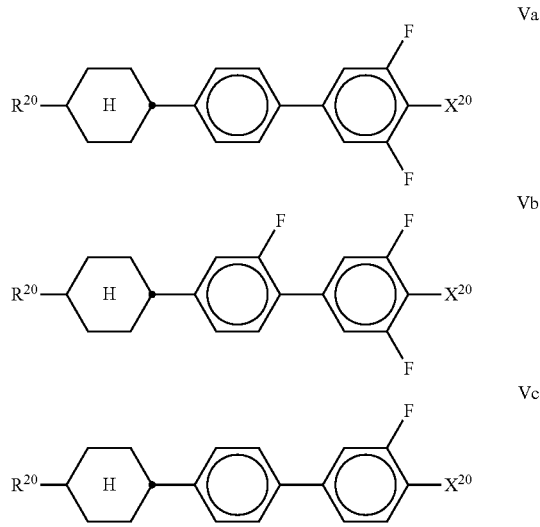

Va

Vb

Vc

Vd
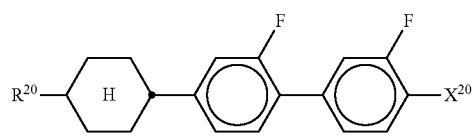

Ve
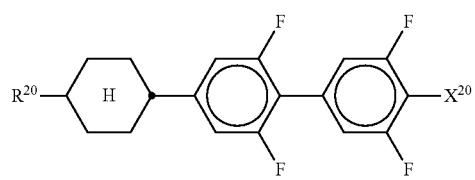

Vf
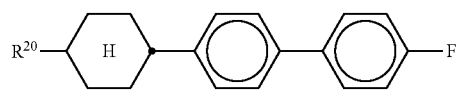

Vg
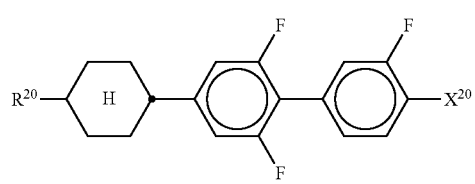

Vh
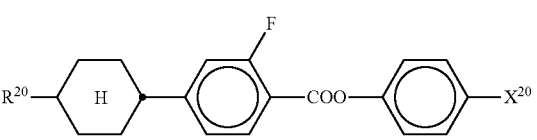

wherein $R^{20}$ and $X^{20}$ have the meanings indicated above.

$R^{20}$ preferably denotes alkyl having 1 to 6 C atoms. $X^{20}$ preferably denotes F and $OCF_3$, furthermore $OCHF_2$, $CF_3$, $OCF=CF_2$ and $OCH=CF_2$;

The compounds of the formula VI are preferably selected from the following formulae:

VIa
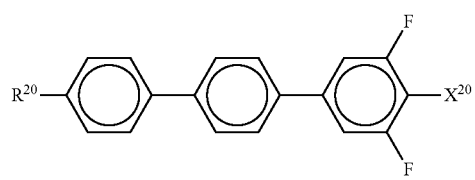

VIb
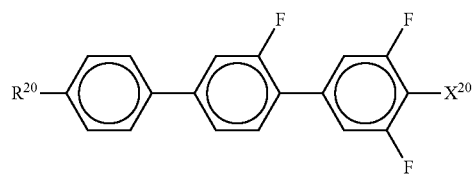

VIc
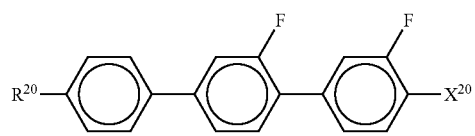

VId
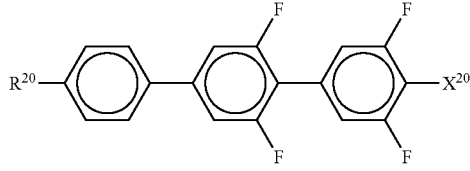

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $CF_3$, $CF=CF_2$, $OCHF_2$ and $OCH=CF_2$;

The compounds of the formula VII are preferably selected from the following formulae:

VIIa
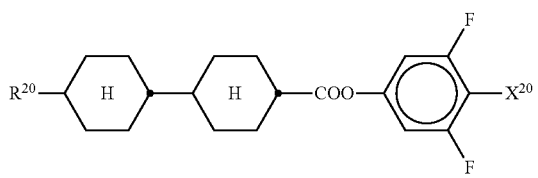

VIIb
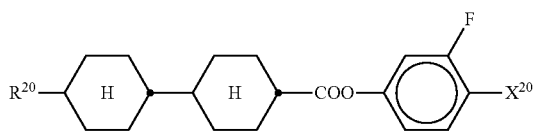

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $OCHF_2$ and $OCH=CF_2$.

cc) The medium additionally comprises one or more compounds selected from the formulae ZK1 to ZK10 given above. Especially preferred are compounds of formula ZK1 and ZK3. Particularly preferred compounds of formula ZK are selected from the sub-formulae ZK1a, ZK1b, ZK1c, ZK3a, ZK3b, ZK3c and ZK3d.

dd) The medium additionally comprises one or more compounds selected from the formulae DK1 to DK12 given above. Especially preferred compounds are DK3.

ee) The medium additionally comprises one or more compounds selected from the following formulae:

IX
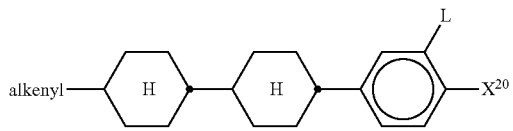

wherein $X^{20}$ has the meanings indicated above under formula II, and

L denotes H or F,

"alkenyl" denotes $C_{2-6}$-alkenyl.

ff) The compounds of the formulae DK3 and IX are preferably selected from the following formulae:

DK3a
 —alkyl

IXa
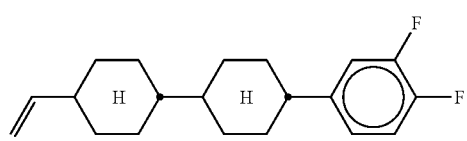

wherein "alkyl" denotes $C_{1-6}$-alkyl, preferably n-$C_3H_7$, n-$C_4H_9$ or n-$C_5H_{11}$, in particular n-$C_3H_7$.

gg) The medium additionally comprises one or more compounds selected from the formulae B1, B2 and B3 given above, preferably from the formula B2. The compounds of the formulae B1 to B3 are particularly preferably selected from the formulae B1a, B2a, B2b and B2c.

hh) The medium additionally comprises one or more compounds selected from the following formula:

X

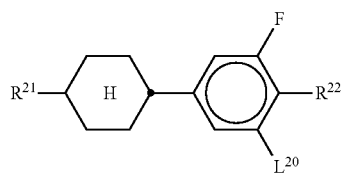

wherein $L^{20}$ denotes H or F, and $R^{21}$ and $R^{22}$ each, identically or differently, denote n-alkyl, alkoxy, oxaalkyl, fluoroalkyl or alkenyl, each having up to 6 C atoms, and preferably each, identically or differently, denote alkyl having 1 to 6 C atoms.

ii) The medium comprises one or more compounds of the following formulae:

XI

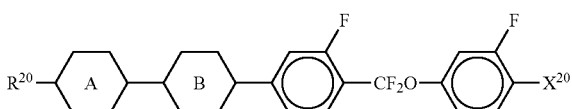

XII

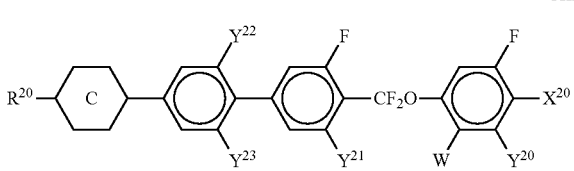

wherein W, $R^{20}$, $X^{20}$ and $Y^{20-23}$ have the meanings indicated in formula III, and

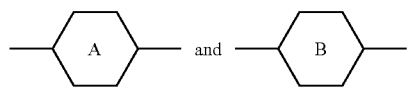 each, independently of one another, denote

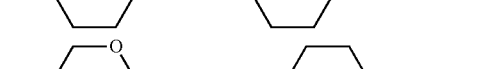

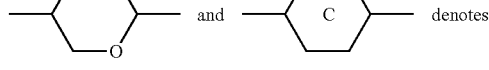

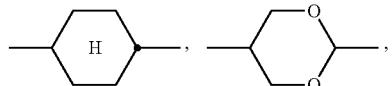

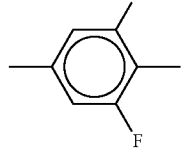

The compounds of the formulae XI and XII are preferably selected from the following formulae:

XIa
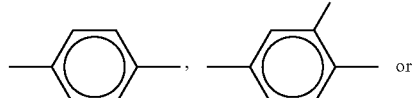

XIb

XIc
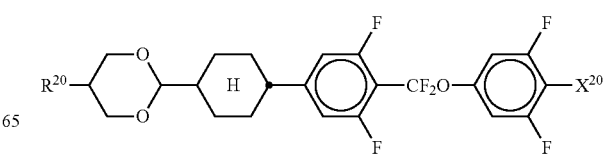

XId

XIe

-continued

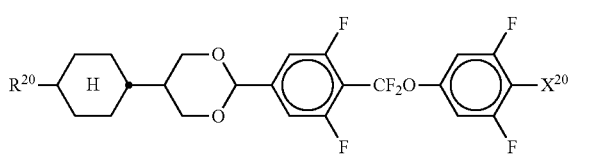
XIf

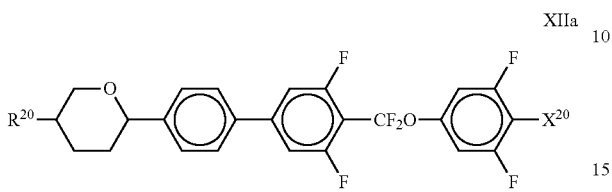
XIIa

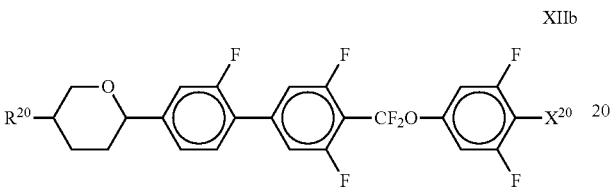
XIIb

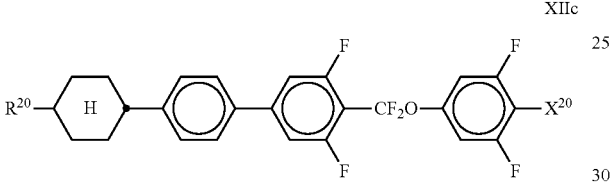
XIIc

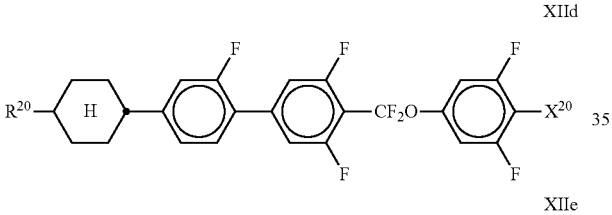
XIId

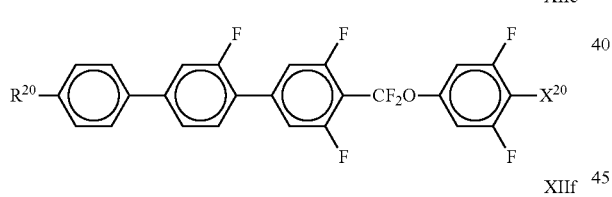
XIIe

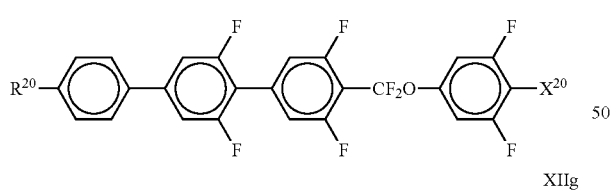
XIIf

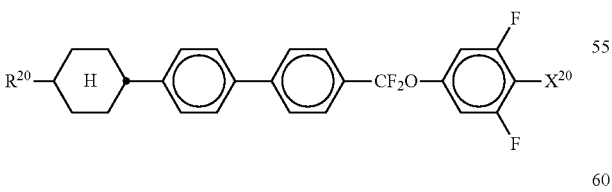
XIIg

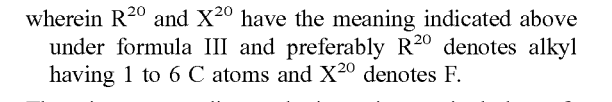

wherein $R^{20}$ and $X^{20}$ have the meaning indicated above under formula III and preferably $R^{20}$ denotes alkyl having 1 to 6 C atoms and $X^{20}$ denotes F.

The mixture according to the invention particularly preferably comprises at least one compound of the formula XIIa and/or XIIe.

jj) The medium comprises one or more compounds of formula T given above, preferably selected from the group of compounds of the formulae T21 to T23 and T25 to T27.

Particular preference is given to the compounds of the formulae T21 to T23. Very particular preference is given to the compounds of the formulae

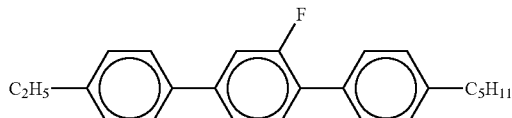

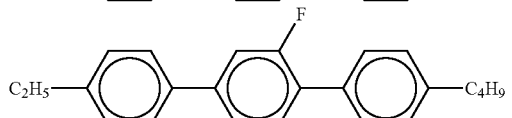

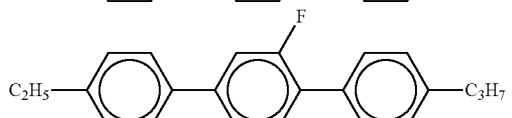

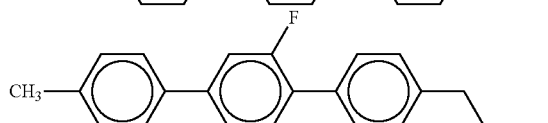

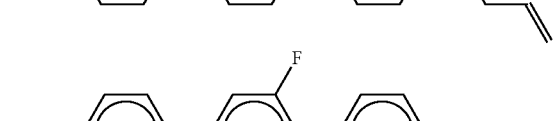

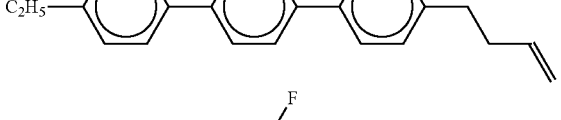

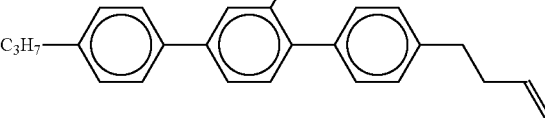

kk) The medium comprises one or more compounds selected from the group of formulae DK9, DK10 and DK11 given above.

ll) The medium additionally comprises one or more compounds selected from the following formulae:

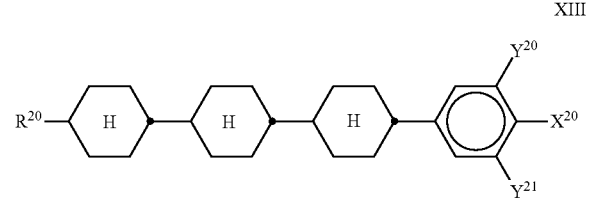
XIII

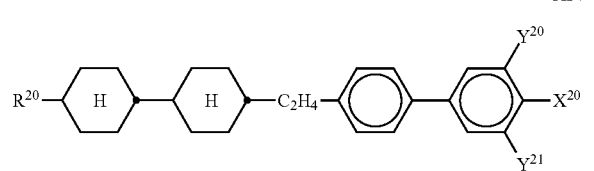
XIV

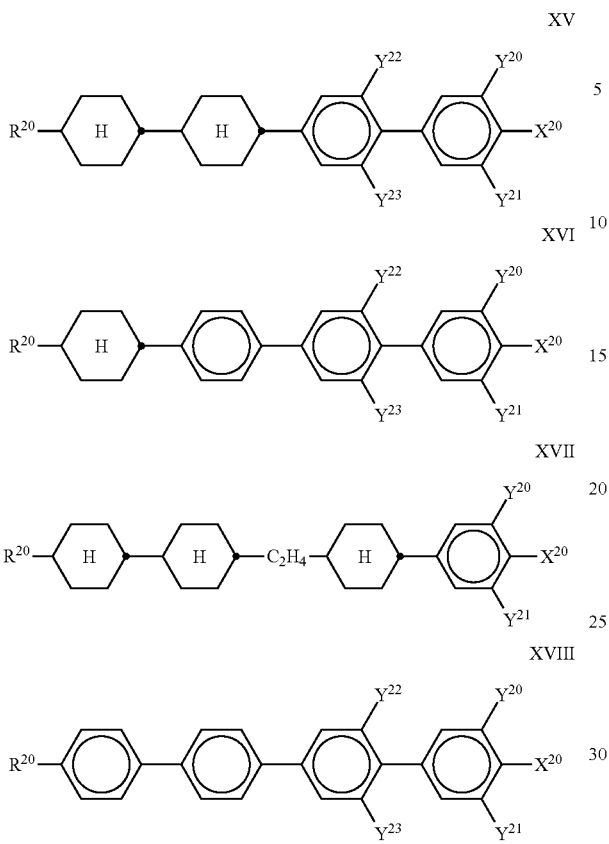

XV

XVI

XVII

XVIII

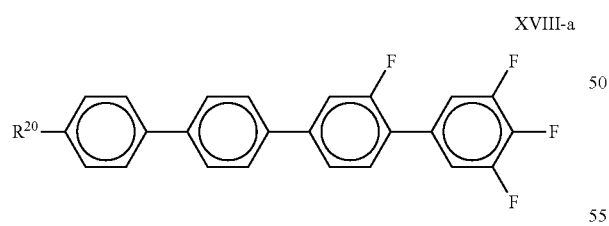

wherein $R^{20}$ and $X^{20}$ each, independently of one another, have one of the meanings indicated above under formula II, and $Y^{20-23}$ each, independently of one another, denote H or F. $X^{20}$ is preferably F, Cl, $CF_3$, $OCF_3$ or $OCHF_2$. $R^{20}$ preferably denotes alkyl, alkoxy, oxaalkyl, fluoroalkyl or alkenyl, each having up to 6 C atoms.

The mixture according to the invention particularly preferably comprises one or more compounds of the formula XVIII-a, XVIII-a wherein $R^{20}$ has the meanings indicated above. $R^{20}$ preferably denotes straight-chain alkyl, in particular ethyl, n-propyl, n-butyl and n-pentyl and very particularly preferably n-propyl. The compound(s) of the formula XVIII, in particular of the formula XVIII-a, is (are) preferably employed in the mixtures according to the invention in amounts of 0.5-20% by weight, particularly preferably 1-15% by weight.

mm) The medium additionally comprises one or more compounds of the formula XIX,

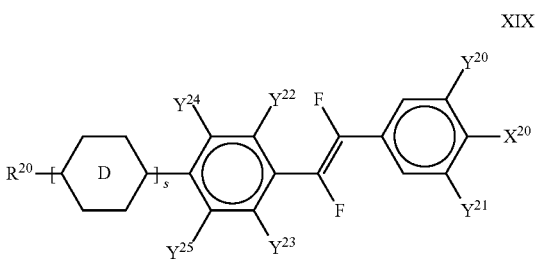

XIX wherein $R^{20}$ and $X^{20}$ have the meanings indicated in formula II, $Y^{20-25}$ have the meanings indicated for $Y^{20}$ in formula II, s denotes 0 or 1, and

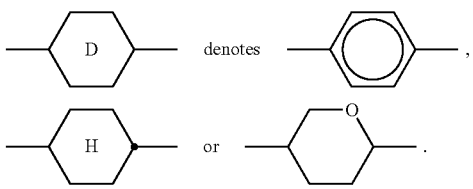

In the formula XIX, $X^{20}$ may also denote an alkyl radical having 1-6 C atoms or an alkoxy radical having 1-6 C atoms. The alkyl or alkoxy radical is preferably straight-chain.

$R^{20}$ preferably denotes alkyl having 1 to 6 C atoms. $X^{20}$ preferably denotes F;

The compounds of the formula XIX are preferably selected from the following formulae:

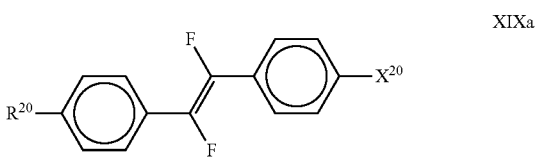

XIXa

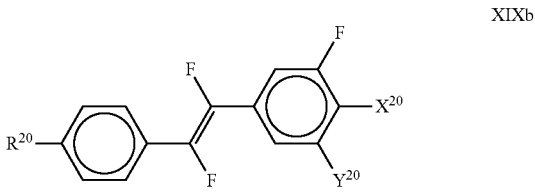

XIXb

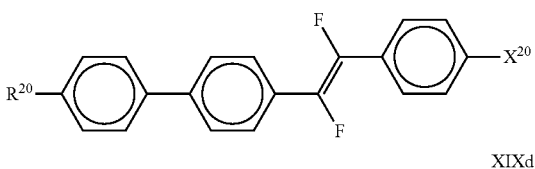

XIXc

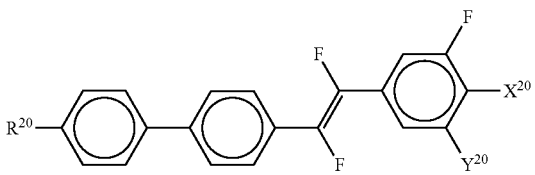

XIXd

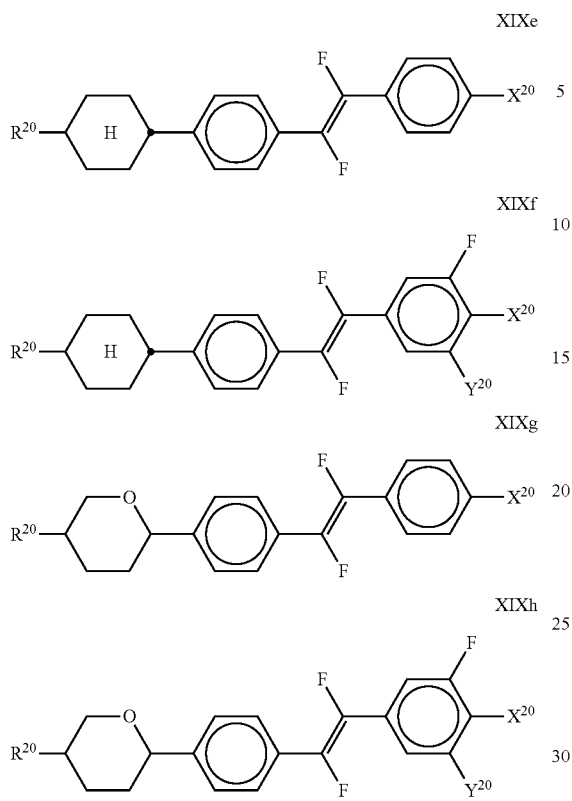

wherein $R^{20}$, $X^{20}$ and $Y^{20}$ have the meanings indicated above. $R^{20}$ preferably denotes alkyl having 1 to 6 C atoms. $X^{20}$ preferably denotes F, and $Y^{20}$ is preferably F;

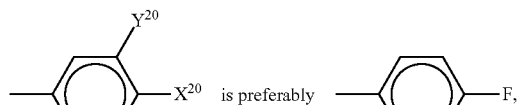

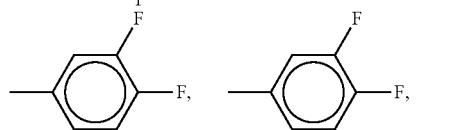

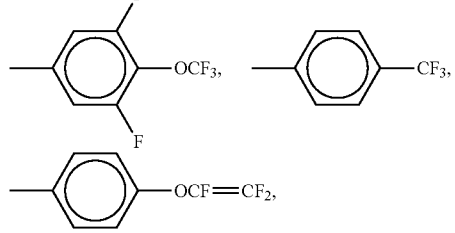

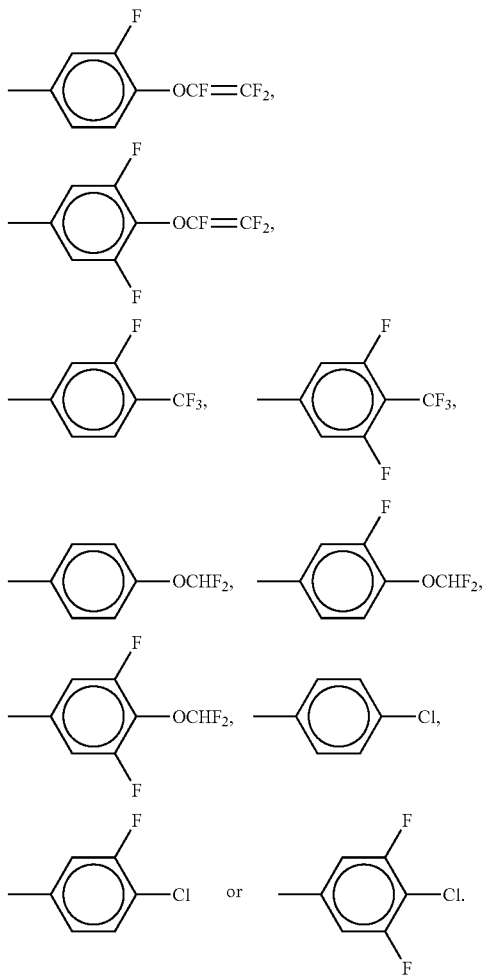

$R^{20}$ is straight-chain alkyl or alkenyl having 2 to 6 C atoms;

nn) The medium comprises one or more compounds of the formulae G1 to G4 given above, preferably selected from G1 and G2 wherein alkyl denotes $C_{1-6}$-alkyl, $L^x$ denotes H and X denotes F or Cl. In G2, X particularly preferably denotes Cl.

oo) The medium comprises one or more compounds of the following formulae:

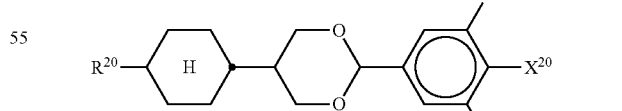

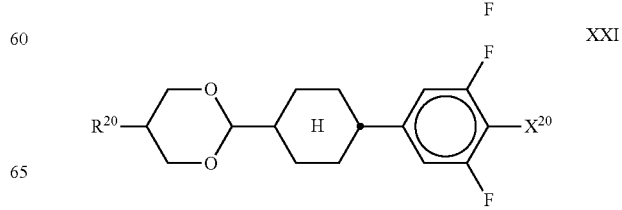

-continued

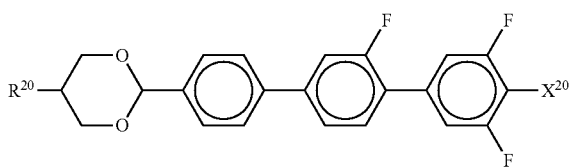
XXII wherein $R^{20}$ and $X^{20}$ have the meanings indicated above in formula II. $R^{20}$ preferably denotes alkyl having 1 to 6 C atoms. $X^{20}$ preferably denotes F. The medium according to the invention particularly preferably comprises one or more compounds of the formula XXII wherein $X^{20}$ preferably denotes F. The compound(s) of the formulae XX-XXII is (are) preferably employed in the mixtures according to the invention in amounts of 1-20% by weight, particularly preferably 1-15% by weight. Particularly preferred mixtures comprise at least one compound of the formula XXII.

pp) The medium comprises one or more compounds of the following pyrimidine or pyridine compounds of the formulae

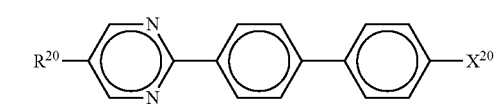
M-1

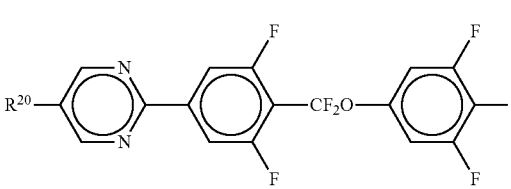
M-2

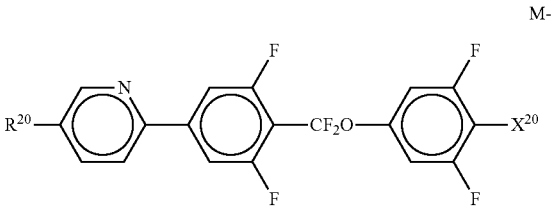
M-3 wherein $R^{20}$ and $X^{20}$ have the meanings indicated above in formula II. $R^{20}$ preferably denotes alkyl having 1 to 6 C atoms. $X^{20}$ preferably denotes F. The medium according to the invention particularly preferably comprises one or more compounds of the formula M-1, wherein $X^{20}$ preferably denotes F. The compound(s) of the formulae M-1 to M-3 is (are) preferably employed in the mixtures according to the invention in amounts of 1-20% by weight, particularly preferably 1-15% by weight.

Further preferred embodiments are indicated below:

qq) The medium comprises two or more compounds of the formula XII, in particular of the formula XIIe;
rr) The medium comprises 2-30% by weight, preferably 3-20% by weight, particularly preferably 3-15% by weight, of compounds of the formula XII;
ss) Besides the compounds of the formulae XII, the medium comprises further compounds selected from the group of the compounds of the formulae II, III, IX-XIII, XVII and XVIII;
tt) The proportion of compounds of the formulae II, III, IX-XI, XIII, XVII and XVIII in the mixture as a whole is 40 to 95% by weight;
uu) The medium comprises 10-50% by weight, particularly preferably 12-40% by weight, of compounds of the formulae and/or Ill;
vv) The medium comprises 20-70% by weight, particularly preferably 25-65% by weight, of compounds of the formulae IX-XIII;
ww) The medium comprises 4-30% by weight, particularly preferably 5-20% by weight, of compounds of the formula XVII;
xx) The medium comprises 1-20% by weight, particularly preferably 2-15% by weight, of compounds of the formula XVIII;
yy) The medium comprises at least two compounds of the formulae

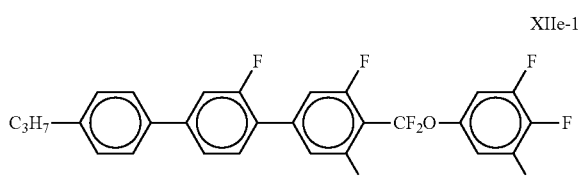
XIIe-1

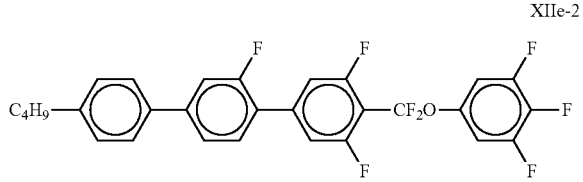
XIIe-2

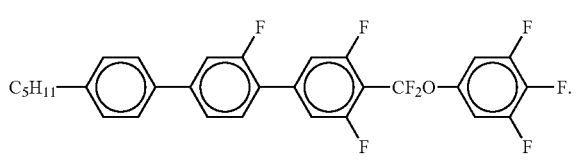
XIIe-3 zz) The medium comprises at least two compounds of the formulae

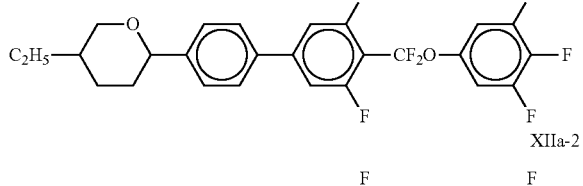
XIIa-1

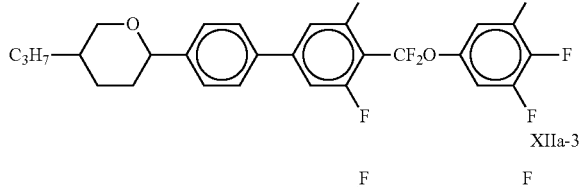
XIIa-2

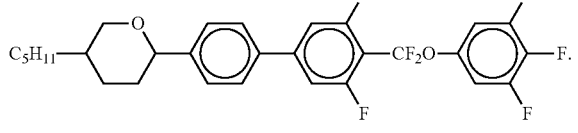
XIIa-3 aaa) The medium comprises at least two compounds of the formula XIIa and at least two compounds of the formula XIIe.
bbb) The medium comprises at least one compound of the formula XIIa and at least one compound of the formula XIe and at least one compound of the formula IIIa.
ccc) The medium comprises at least two compounds of the formula XIIa and at least two compounds of the formula XIe and at least one compound of the formula IIIa.
ddd) The medium comprises in total 25% by weight, preferably 30% by weight, of one or more compounds of the formula XII.
eee) The medium comprises 20% by weight, preferably 24% by weight, preferably 25-60% by weight, of compounds of the formula ZK3, in particular the compound of the formula ZK3a,

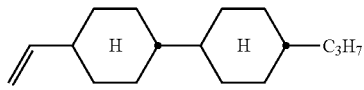

ZK3a fff) The medium comprises at least one compound selected from the group of compounds ZK3a, ZK3b and ZK3c, preferably ZK3a, in combination with compound ZK3d

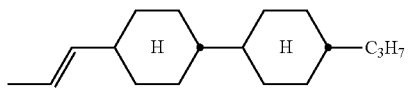

ZK3d ggg) The medium comprises at least one compound of the formula DPGU-n-F.
hhh) The medium comprises at least one compound of the formula CDUQU-n-F.
iii) The medium comprises at least one compound of the formula CPU-n-OXF.
jjj) The medium comprises at least one compound of the formula CPGU-3-OT.
kkk) The medium comprises at least one compound of the formula PPGU-n-F.
lll) The medium comprises at least one compound of the formula PGP-n-m, preferably two or three compounds.
mmm) The medium comprises at least one compound of the formula PGP-2-2V having the structure

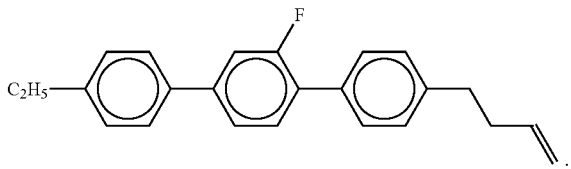

In a preferred embodiment, the liquid crystal mixture according to the present invention further comprises one or more further polymerizable compounds. The further polymerizable compounds can be selected from isotropic or mesogenic polymerizable compounds known to the skilled person in the art and preferably chosen from one or more polymerizable compounds of formula P, $P^a\text{—}Sp^a\text{-}(A^p)_{n2}\text{-}Sp^b\text{-}P^b$  P wherein the individual radicals have the following meanings:

$P^a$, $P^b$ each, independently of one another, denote a polymerizable group, preferably each and independently selected from the group consisting of acrylate, methacrylate, ethacrylate, fluoroacrylate, vinyloxy, chloroacrylate, oxetane, or epoxide groups $Sp^a$, $Sp^b$ on each occurrence, identically or differently, denote a spacer group or a single bond, $A^p$ each and independently from another, in each occurrence, a group selected from 5, 6 or 7-membered alicyclic groups wherein, in addition, one or more non-adjacent $CH_2$ groups may each be replaced by —NH—, —O— or —S—, wherein one or more non-adjacent —$CH_2$—$CH_2$— groups may each be replaced by —CH=CH—, and wherein one or more H atoms may each be replaced by F, preferably 5-membered groups such as cyclopentane, cyclopentane, tetrahydrofuran, tetrahydrothiofuran, pyrroli-dine, or 6-membered groups, such as cyclohexane, silinane, cyclohexene, tetrahydropyran, tetrahydrothiopyran, 1,3-dioxane, 1,3-dithiane, piperidine, or 7-membered groups, such as cycloheptane, trans-1,4-cyclohexylene, more preferably 1,4-cyclohexylene or 1,4-cyclohexenylene, n2 denotes 0, 1, 2 or 3, preferably 1 or 2.

Preferred spacer groups $Sp^{a,b}$ are selected from the formula Sp"-X", so that the radicals $P^{a/b}$-$Sp^{a/b}$- conform to the formulae $P^{a/b}$-Sp"-X"—, respectively, wherein Sp" denotes alkylene having 1 to 20, preferably 1 to 12, C atoms, which is optionally mono- or polysubstituted by F, Cl, Br, I or CN and wherein, in addition, one or more non-adjacent $CH_2$ groups may each be replaced, independently of one another, by —O—, —S—, —NH—, —N($R^0$)—, —Si($R^{00}R^{000}$)— —CO—, —CO—O—, —O—CO—, —O—CO—O—, —S—CO—, —CO—S—, —N($R^0$)—CO—O—, —O—CO—N($R^{00}$)—, —N($R^{00}$)—CO—N($R^{00}$)—, —CH=CH— or —C≡C— in such a way that O and/or S atoms are not linked directly to one another, or a single bond, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_{20}$—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^3$=CY$^4$—, —C≡C—, —CH=CH—CO—O—, —O—CO—CH=CH— or a single bond, preferably a single bond, R, $R^{00}$ and $R^{000}$ each, independently of one another, denote H or alkyl having 1 to 12 C atoms, and $Y^3$ and $Y^4$ each, identically or differently, denote H, F, Cl or CN.

X" is preferably —O—, —S—, —CO—, —C(O)O—, —OC(O)—, —O—C(O)O—, —CO—NR$^0$—, —NR$^0$—CO—, —NR$^0$—CO—NR$^0$— or a single bond.

Typical spacer groups $Sp^{11}$ are, for example, a single bon, —(CH$_2$)$_{p1}$—, —(CH$_2$CH$_2$)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, wherein p1 is an integer from 1 to 12, q1 is an integer from 1 to 3, and $R^{00}$ and $R^{000}$ have the meanings indicated above.

Particularly preferred groups -Sp"-X"— are a single bond, —(CH$_2$)$_{p1}$—, —(CH$_2$)$_{p1}$—O—, —(CH$_2$)$_{p1}$—O—CO—, —(CH$_2$)$_{p1}$—O—CO—O—, wherein p1 and q1 have the meanings indicated above.

Particularly preferred groups Sp$^{11}$ are, for example, in each case straight-chain methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred monomers of formula P are the following:

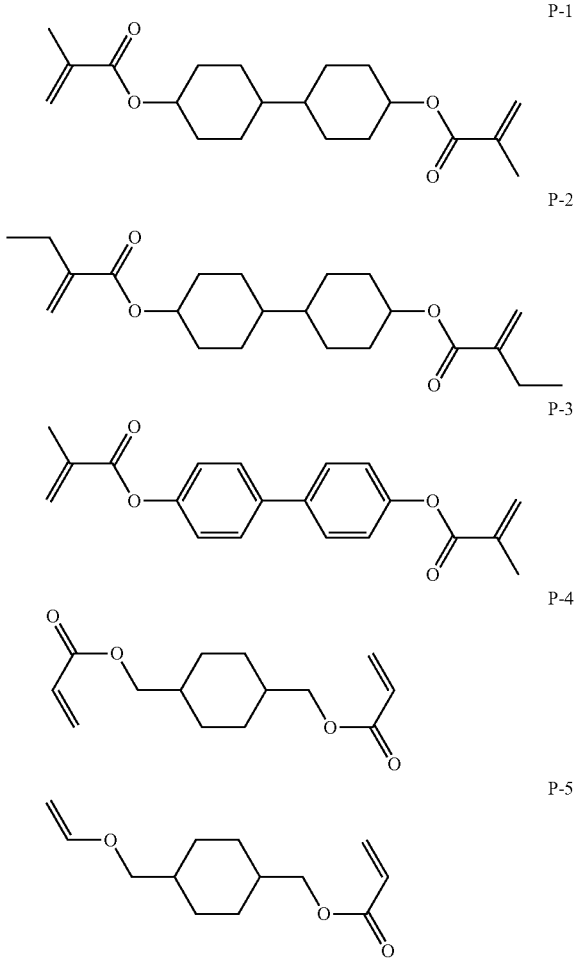

P-1

P-2

P-3

P-4

P-5

The amount of the polymerizable component in the LC mixture as a whole is preferably ranging from 0.1 to 5%, more preferably ranging from 0.3 to 3%, especially ranging from 0.5 to 2%.

The amount of one or more compounds of formula P in the polymerizable component as a whole is preferably ranging from 50 to 100%, more preferably ranging from 75 to 100%, especially ranging from 90 to 100%, in particular the polymerizable component C consists of one, two, three or more compounds of formula P.

The polymerizable compounds of formulae I and P are also suitable for polymerization without an initiator, which is associated with considerable advantages, such as, for example, lower material costs and, in particular, reduced contamination of the LC medium by possible residual amounts of the initiator or degradation products thereof. The polymerization can thus also be carried out without addition of an initiator. The LC medium thus, in a preferred embodiment, comprises no polymerization initiator.

The LC medium of the layers may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (BASF SE), such as, for example, Irganox®1076. If stabilizers are employed, their proportion, based on the total amount of the RMs or the polymerizable component, is preferably 10-10,000 ppm, particularly preferably 50-1000 ppm.

The media according to the invention preferably comprise from 0.01 to 10%, particularly preferably from 0.05 to 7.5% and most preferably from 0.1 to 5% of the compounds of formula P. The media preferably comprise one, two or three, more preferably one or two and most preferably one compound of the formula P.

By means of suitable additives, the liquid-crystalline phases of the present invention can be modified in such a way that they can be used in all types of liquid-crystal display elements that have been disclosed hitherto.

Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the production of colored guest-host systems or substances can be added in order to modify the dielectric anisotropy, the viscosity and/or the alignment of the nematic phases.

The media according to the invention are prepared in a manner conventional per se. In general, the components are dissolved in one another, preferably at elevated temperature.

The invention preferably relates to a device produced by the process according to the invention in which none or only one of the top and bottom substrates contains a polyimide layer.

In one embodiment of the present invention the liquid crystal composition is injected between the first and second substrate or it is filled into the cell by capillary force after combining the first and second substrate. In an alternative embodiment, the liquid crystal composition may be interposed between the first and second substrates by combining the second substrate to the first substrate after loading the liquid crystal composition on the first substrate. Preferably, the liquid crystal is dispensed dropwise onto a first substrate in a process known as "one drop filling" (ODF) process, as disclosed in for example JPS63-179323 and JPH10-239694, or using the Ink Jet Printing (IJP) method.

In a preferred embodiment, the process according to the invention contains a process step where the liquid crystal inside the device is allowed to rest for a period of time in order to evenly redistribute the liquid crystal medium inside the panel (herein referred to as "annealing").

However it is likewise preferred that the annealing step is combined with a previous step, such as edge sealant precuring. In which case a 'separate' annealing step may not be necessary at all.

For the production of the device according to the present invention, the photoreactive mesogen of formula I is preferably allowed to redistribute in the panel. After filling and assembly, the display panel is annealed for a time between 1 min and 3 h, preferably between 2 min and 1 h and most preferably between 5 min and 30 min. The annealing is preferably performed at room temperature.

In an alternative embodiment, the annealing is performed at elevated temperature, preferably at above 20° C. and below 140° C., more preferably above 40° C. and below 100° C. and most preferably above 50° C. and below 80° C.

In a preferred embodiment, one or more of the process steps of filling the display, annealing, photoalignment and curing of the polymerizable compound is performed at a temperature above the clearing point of the liquid crystal host mixture.

During the photoalignment of the liquid crystal inside the liquid crystal panel, anisotropy is induced by exposing the display or the liquid crystal layer to linearly polarized light.

In a preferred embodiment of the present invention the photoreactive component comprising one or more compounds of formula I, is photoaligned in a first step using linearly polarized UV light and in a second step further cured using linearly polarized or unpolarized UV light.

In the second step any other polymerizable compounds are also further cured.

In another preferred embodiment, the linearly polarized light applied according to the inventive process is ultraviolet light which enables simultaneous photoalignment and photocuring of the photoreactive component comprising one or more compounds of formula I, and, if present, photocuring of the other polymerizable components.

Photoalignment of the photoreactive compounds of formula I and curing of the polymerizable groups of compounds of formula I and the curing of the optional polymerizable compounds of formula P can be performed simultaneously or stepwise. In case the process is split into different steps, the individual steps can be performed at the same temperature or at different temperatures.

After the photoalignment and curing step(s) a so-called "post-curing" step can optionally be performed by irradiation with UV-light and/or visible light (both either linearly or unpolarized) at reduced temperature in order to remove unreacted polymerizable compounds. The post-curing is preferably performed at above 0° C. and below the clearing point of the utilized LC mixture, preferably 20° C. and below 60° C.° C., and most preferably above 20° C. and below 40° C.

The polymerizable compounds are optionally polymerized or crosslinked (if a polymerizable compound contains two or more polymerizable groups) with the application of an electrical field. The polymerization can be carried out in one or more steps.

Suitable and preferred polymerization methods for the polymerizable component are, for example, thermal or photopolymerization, preferably photopolymerization, in particular UV photopolymerization. One or more initiators can optionally also be added here. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (BASF SE). If an initiator is employed, its proportion is preferably 0.001 to 5% by weight, particularly preferably 0.001 to 1% by weight.

Further combinations of the embodiments and variants of the invention in accordance with the description arise from the claims.

The invention is explained in greater detail below with reference to working examples, but without intending to be restricted thereby. The person skilled in the art will be able to glean from the examples working details that are not given in detail in the general description, generalize them in accordance with general expert knowledge and apply them to a specific problem.

All percentages of compositions throughout this disclosure are "% by weight". The sum of all percentages in a composition should give 100%.

Besides the usual and well-known abbreviations, the following abbreviations are used:

C: crystalline phase; N: nematic phase; Sm: smectic phase; I: isotropic phase. The numbers between these symbols show the transition temperatures of the substance concerned.

Temperature data are in ° C., unless indicated otherwise.

Physical, physicochemical or electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

Above and below, $\Delta n$ denotes the optical anisotropy (589 nm, 20° C.) and $\Delta \varepsilon$ denotes the dielectric anisotropy (1 kHz, 20° C.). The dielectric anisotropy $\Delta \varepsilon$ is determined at 20° C. and 1 kHz. The optical anisotropy $\Delta n$ is determined at 20° C. and a wavelength of 589.3 nm.

The $\Delta \varepsilon$ and $\Delta n$ values and the rotational viscosity ($\gamma_1$) of the compounds according to the invention are obtained by linear extrapolation from liquid-crystalline mixtures consisting of 5 to 10% of the respective compound according to the invention and 90-95% of the commercially available liquid-crystal mixture ZLI-2857 (for $\Delta \varepsilon$) or ZLI-4792 (for $\Delta n$, $\gamma_1$) (mixtures, Merck KGaA, Darmstadt).

The compounds used in the present invention are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

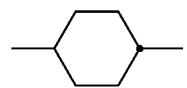

C

TABLE A-continued
Ring elements
| | |
|---|---|
|  | P |
| 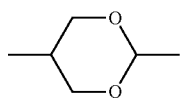 | D |
| 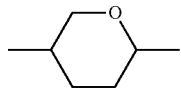 | A |
| 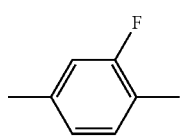 | G |
| 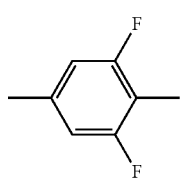 | U |
| 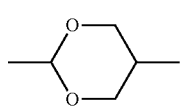 | Dl |
| 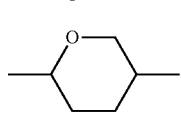 | Al |
| 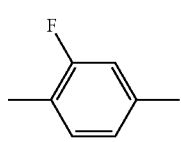 | Gl |
| 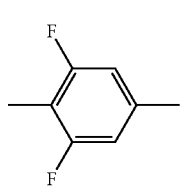 | Ul |
| 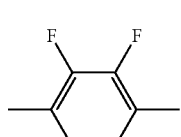 | Y |
| 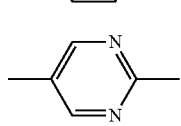 | M |
| 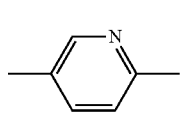 | N |
TABLE A-continued
Ring elements
| | |
|---|---|
| 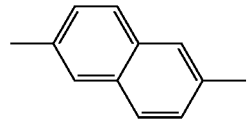 | Np |
| | N3f |
| | tH |
| | tH2f |
| | K |
| | Ml |
| | Nl |
| | dH |
| | N3fl |
| | tHl |

TABLE A-continued

Ring elements

| Structure | Code |
|---|---|
| (tetrahydronaphthalene with two F substituents, methyl groups) | tH2fl |
| (fluorinated indane structure) | Kl |
| (cyclohexene, dimethyl) | L |
| (fluoro cyclohexene, dimethyl) | F |
| (fluoro pyridine, dimethyl) | Nf |
| (cyclohexene, dimethyl) | Ll |
| (fluoro cyclohexene, dimethyl) | Fl |
| (fluoro pyridine, dimethyl) | Nfl |

TABLE B

Linking groups

| | | | |
|---|---|---|---|
| E | —CH$_2$CH$_2$— | Z | —CO—O— |
| V | —CH═CH— | ZI | —O—CO— |
| X | —CF═CH— | O | —CH$_2$—O— |
| XI | —CH═CF— | OI | —O—CH$_2$— |
| B | —CF═CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -On | —O—C$_n$H$_{2n+1}$ |
| -V- | CH$_2$═CH— | -V | —CH═CH$_2$ |
| -nV- | C$_n$H$_{2n+1}$—CH═CH— | -nV | —C$_n$H$_{2n}$—CH═CH$_2$ |
| -Vn- | CH$_2$═CH—C$_n$H$_{2n+1}$— | -Vn | —CH═CH—C$_n$H$_{2n+1}$ |
| -nVm- | C$_n$H$_{2n+1}$—CH═CH—C$_m$H$_{2m}$— | -nVm | —C$_n$H$_{2n}$—CH═CH—C$_m$H$_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -FXO- | CF$_2$═CH—O— | -OXF | —O—CH═CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with one another and with others | | | |
| -...A...- | —C≡— | -...A... | —C≡— |
| -...V...- | —CH═CH— | -...V... | —CH═CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF═CF— | -...W... | —CF═CF— | wherein n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

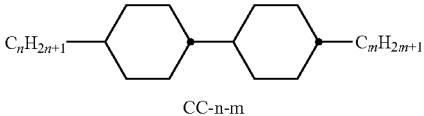

CC-n-m

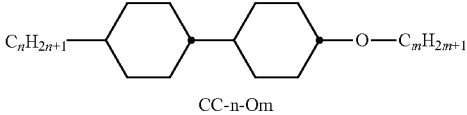

CC-n-Om

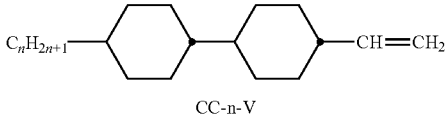

CC-n-V

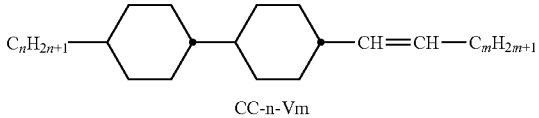

CC-n-Vm

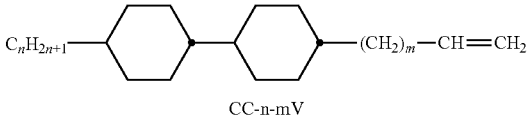

CC-n-mV

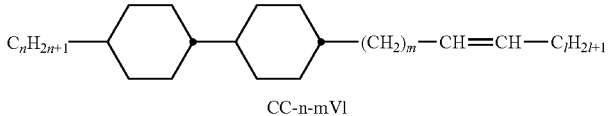

CC-n-mVl

CC-V-V

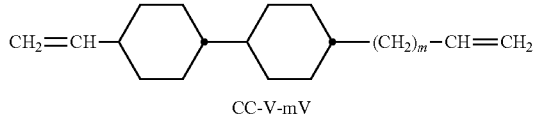

CC-V-mV

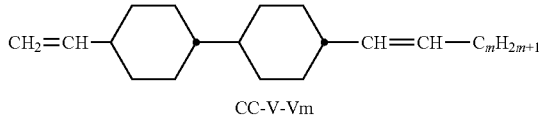

CC-V-Vm

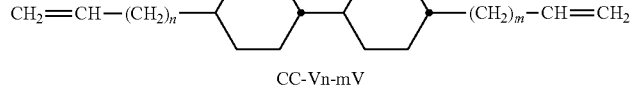

CC-Vn-mV

TABLE D-continued

Illustrative structures $C_nH_{2n+1}$—CH=CH—[Cy]—[Cy]—$(CH_2)_m$—CH=$CH_2$
CC-nV-mV $C_nH_{2n+1}$—CH=CH—[Cy]—[Cy]—CH=CH—$C_mH_{2m+1}$
CC-nV-Vm $C_nH_{2n+1}$—[Cy]—[Ph]—$C_mH_{2m+1}$
CP-n-m $C_nH_{2n+1}$O—[Cy]—[Ph]—$C_mH_{2m+1}$
CP-nO-m $C_nH_{2n+1}$—[Cy]—[Ph]—O$C_mH_{2m+1}$
CP-n-Om $CH_2$=CH—[Cy]—[Ph]—$C_mH_{2m+1}$
CP-V-m $CH_2$=CH—$(CH_2)_n$—[Cy]—[Ph]—$C_mH_{2m+1}$
CP-Vn-m $C_nH_{2n+1}$—CH=CH—[Cy]—[Ph]—$C_mH_{2m+1}$
CP-nV-m $H_2C$=CH—[Cy]—[Ph]—CH=$CH_2$
CP-V-V $CH_2$=CH—[Cy]—[Ph]—$(CH_2)_m$—CH=$CH_2$
CP-V-mV $CH_2$=CH—[Cy]—[Ph]—CH=CH—$C_mH_{2m+1}$
CP-V-Vm TABLE D-continued
Illustrative structures
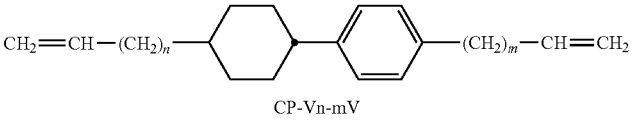
CP-Vn-mV
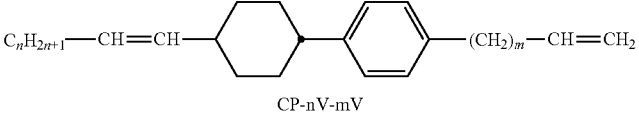
CP-nV-mV
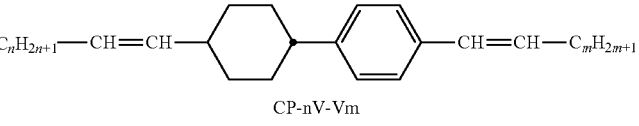
CP-nV-Vm
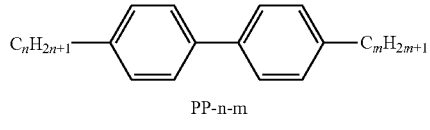
PP-n-m
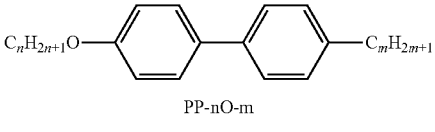
PP-nO-m
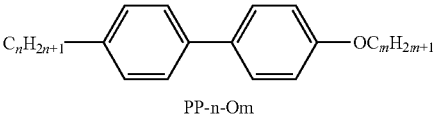
PP-n-Om
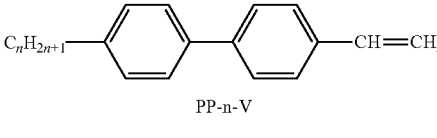
PP-n-V
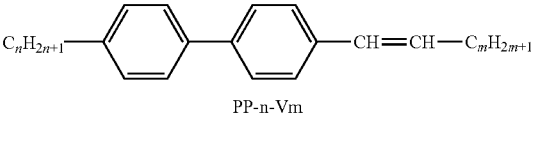
PP-n-Vm
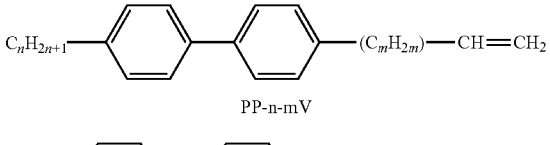
PP-n-mV
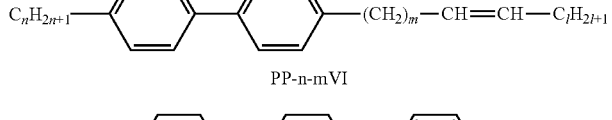
PP-n-mVl
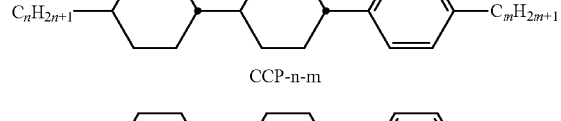
CCP-n-m
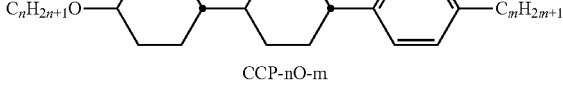
CCP-nO-m TABLE D-continued Illustrative structures $C_nH_{2n+1}$—⬡—⬡—⬢—$OC_mH_{2m+1}$ CCP-n-Om $C_nH_{2n+1}$—⬡—⬡—⬢—$CH=CH_2$ CCP-n-V $C_nH_{2n+1}$—⬡—⬡—⬢—$CH=CH-C_mH_{2m+1}$ CCP-n-Vm $C_nH_{2n+1}$—⬡—⬡—⬢—$(C_mH_{2m})-CH=CH_2$ CCP-n-mV $C_nH_{2n+1}$—⬡—⬡—⬢—$(C_mH_{2m})-CH=CH-C_lH_{2l+1}$ CCP-n-mVl $H_2C=CH$—⬡—⬡—⬢—$C_mH_{2m+1}$ CCP-V-m $C_nH_{2n+1}-CH=CH$—⬡—⬡—⬢—$C_mH_{2m+1}$ CCP-nV-m $CH_2=CH-(CH_2)_n$—⬡—⬡—⬢—$C_mH_{2m+1}$ CCP-Vn-m $C_nH_{2n+1}-CH=CH-(CH_2)_m$—⬡—⬡—⬢—$C_lH_{2l+1}$ CCP-nVm-l $C_nH_{2n+1}$—⬡—⬢—⬢—$C_mH_{2m+1}$ CPP-n-m $C_nH_{2n+1}$—⬡—⬢—⬢(F)—$C_mH_{2m+1}$ CPG-n-m TABLE D-continued
Illustrative structures
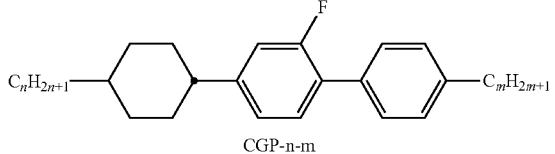
CGP-n-m
CPP-nO-m
CPP-n-Om
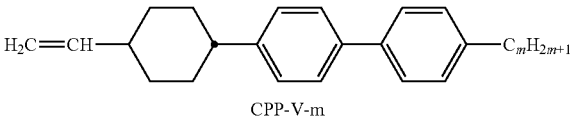
CPP-V-m
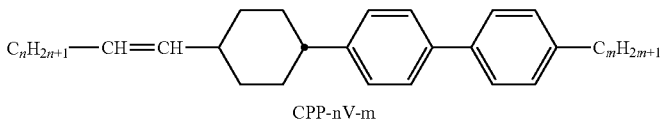
CPP-nV-m
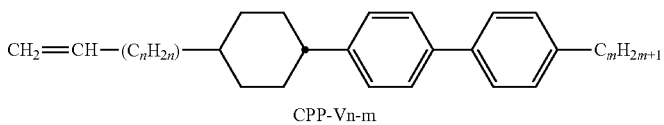
CPP-Vn-m
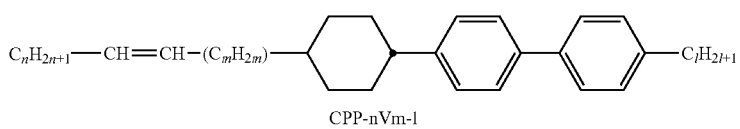
CPP-nVm-l
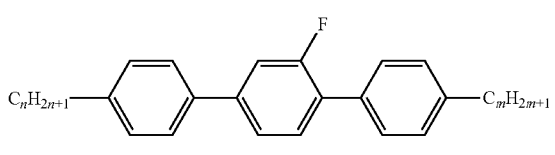
PGP-n-m
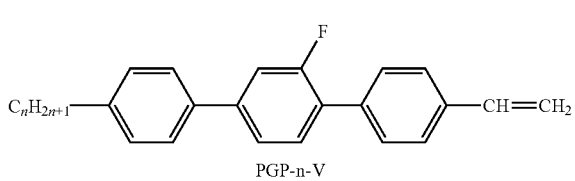
PGP-n-V
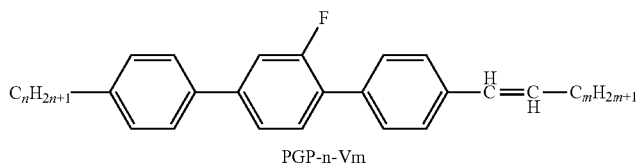
PGP-n-Vm TABLE D-continued
| Illustrative structures |
|---|
| 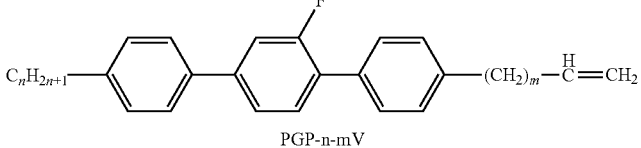 PGP-n-mV |
| 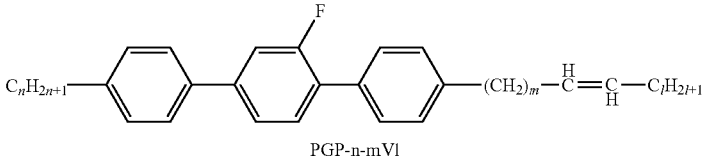 PGP-n-mVl |
| 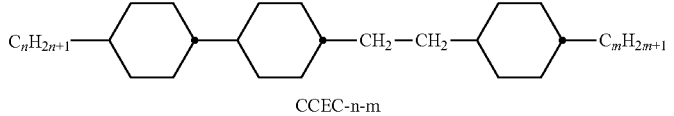 CCEC-n-m |
| 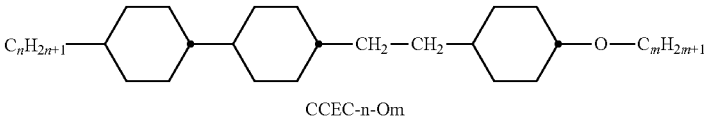 CCEC-n-Om |
| 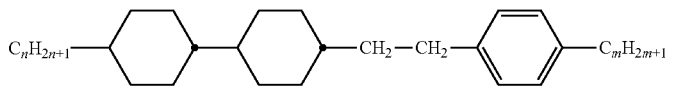 CCEP-n-m |
| 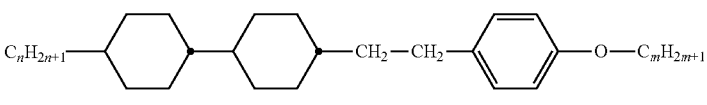 CCEP-n-Om |
| 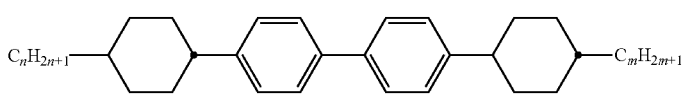 CPPC-n-m |
| 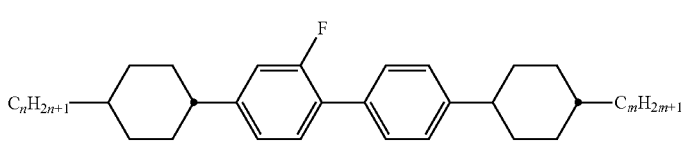 CGPC-n-m |
| 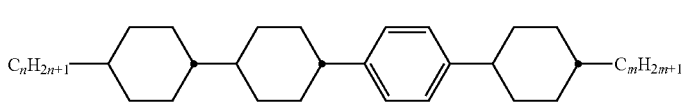 CCPC-n-m |
| 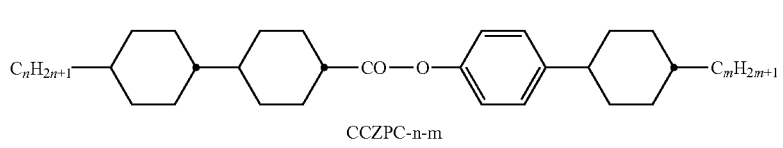 CCZPC-n-m |

TABLE D-continued
Illustrative structures
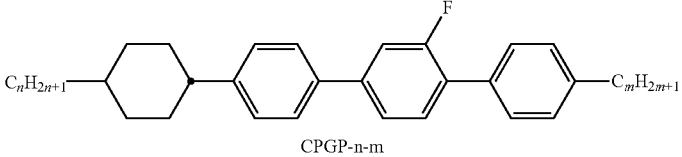
CPGP-n-m
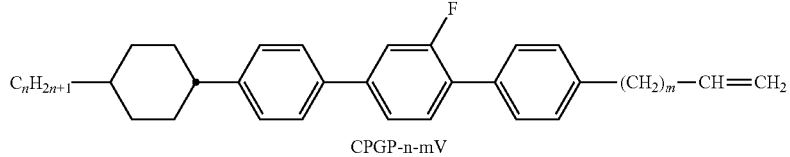
CPGP-n-mV
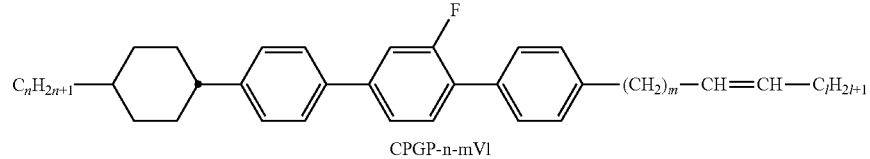
CPGP-n-mVl
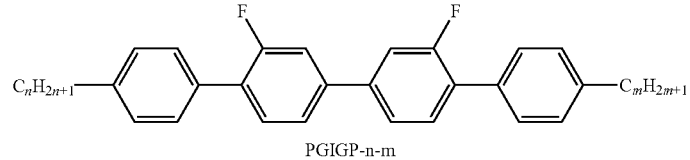
PGIGP-n-m
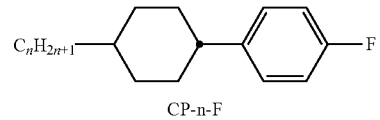
CP-n-F
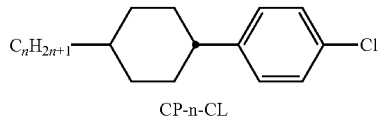
CP-n-CL
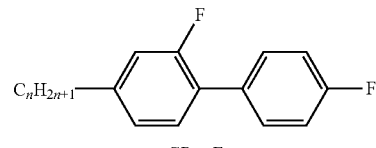
GP-n-F
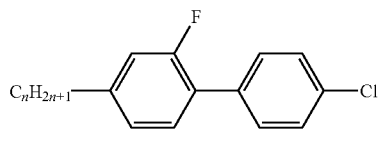
GP-n-CL
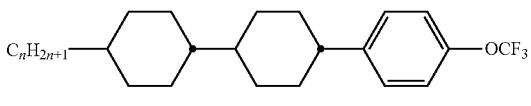
CCP-n-OT
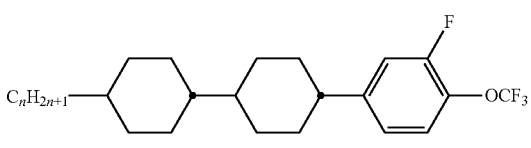
CCG-n-OT TABLE D-continued
Illustrative structures
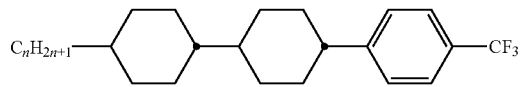
CCP-n-T
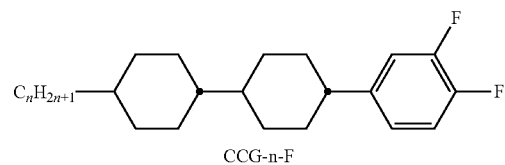
CCG-n-F
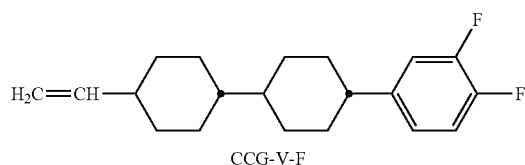
CCG-V-F
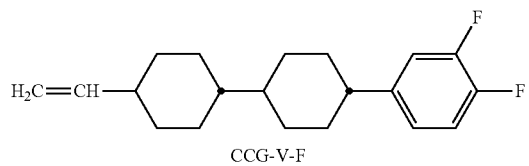
CCG-V-F
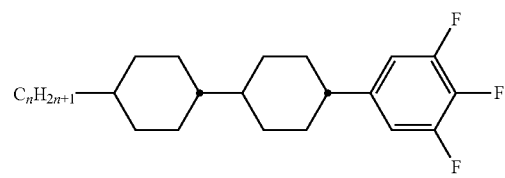
CCU-n-F
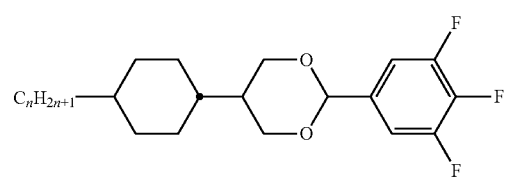
CDU-n-F
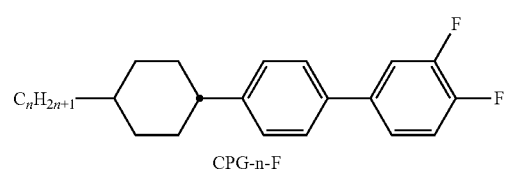
CPG-n-F
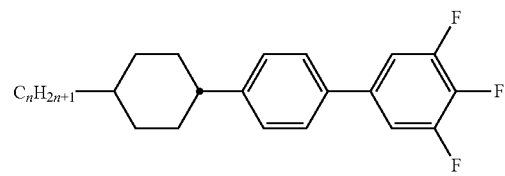
CPU-n-F TABLE D-continued
Illustrative structures
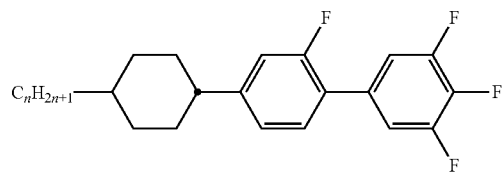
CGU-n-F
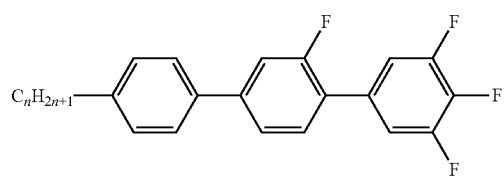
PGU-n-F
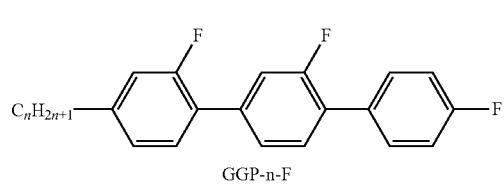
GGP-n-F
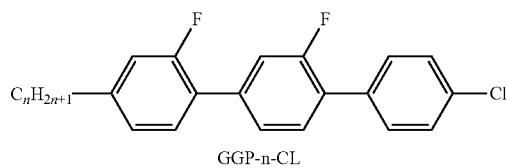
GGP-n-CL
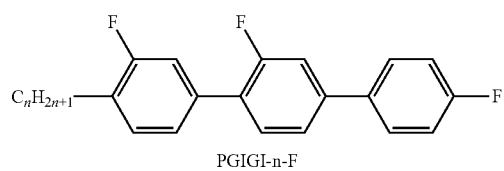
PGIGI-n-F
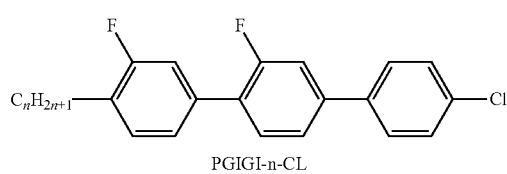
PGIGI-n-CL
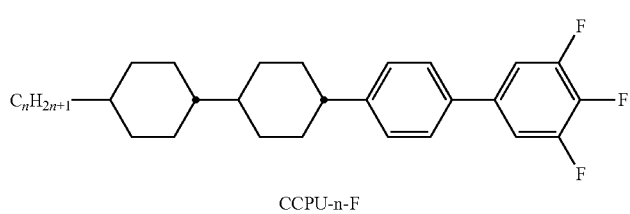
CCPU-n-F
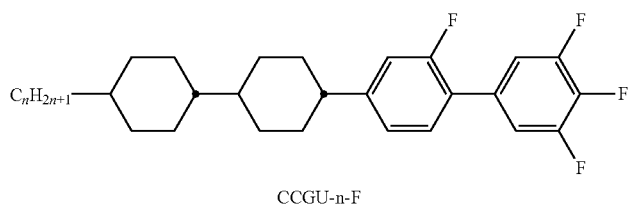
CCGU-n-F TABLE D-continued
Illustrative structures
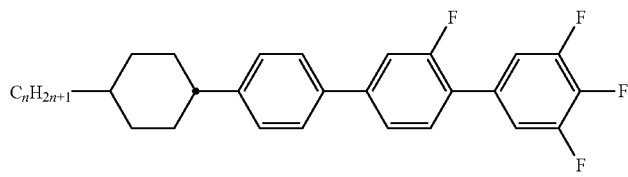
CPGU-n-F
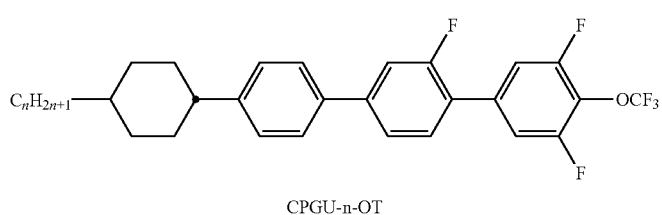
CPGU-n-OT
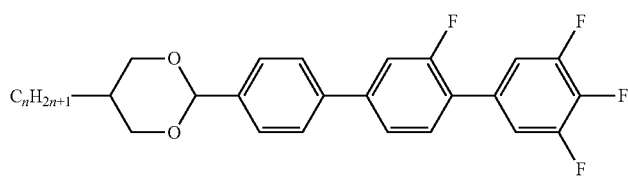
DPGU-n-F
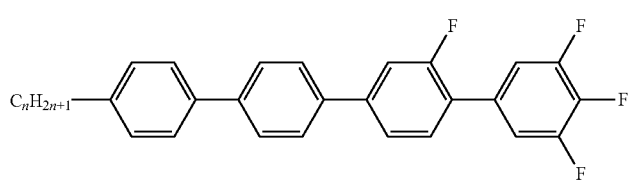
PPGU-n-F
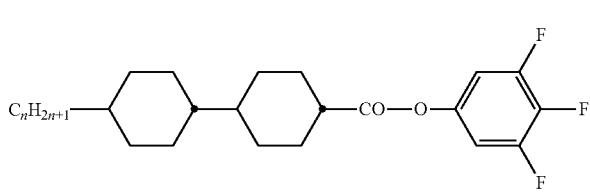
CCZU-n-F
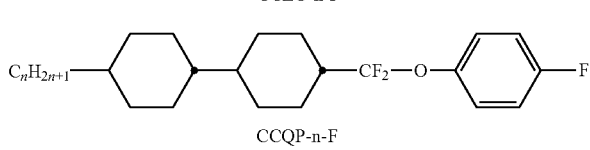
CCQP-n-F
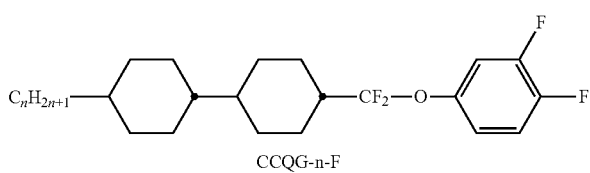
CCQG-n-F
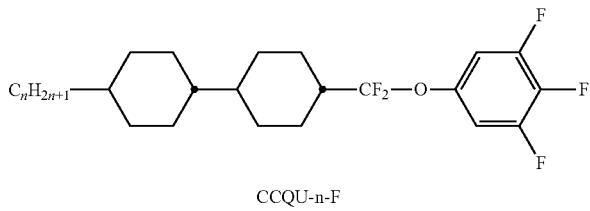
CCQU-n-F TABLE D-continued
Illustrative structures
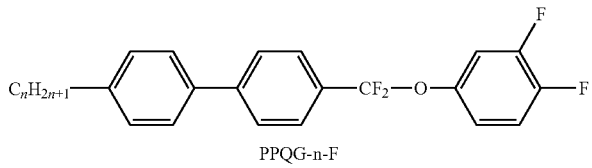
PPQG-n-F
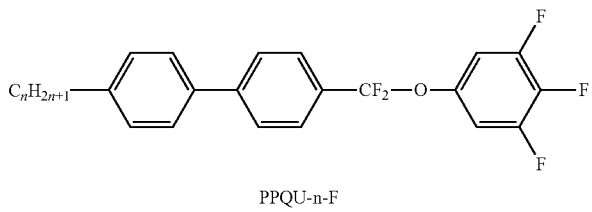
PPQU-n-F
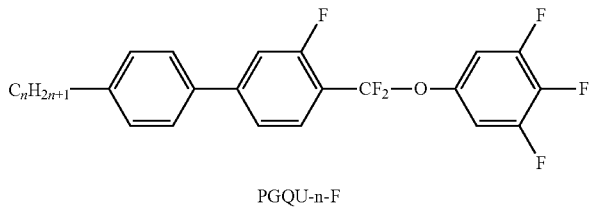
PGQU-n-F
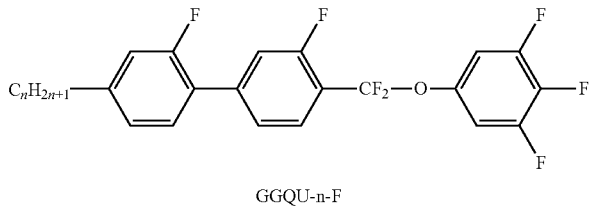
GGQU-n-F
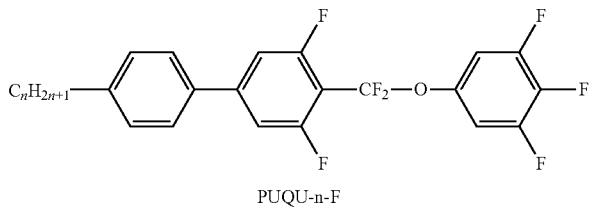
PUQU-n-F
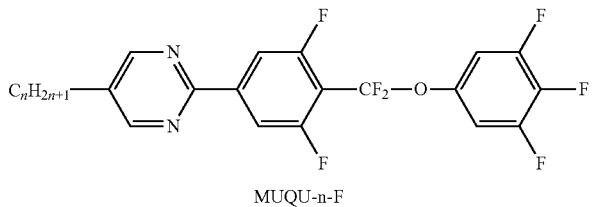
MUQU-n-F
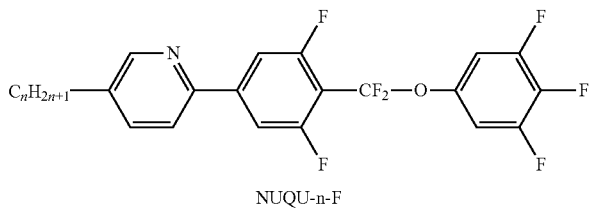
NUQU-n-F TABLE D-continued
Illustrative structures
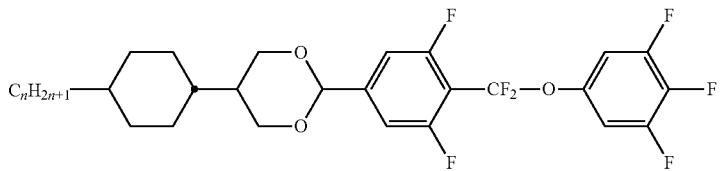
CDUQU-n-F
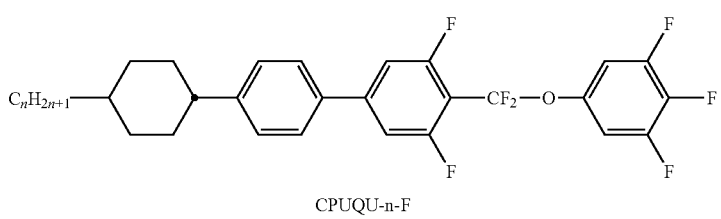
CPUQU-n-F
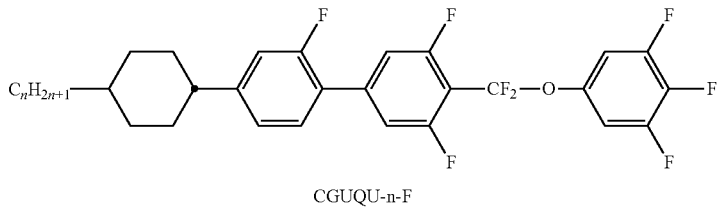
CGUQU-n-F
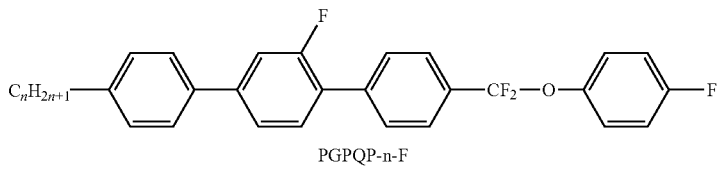
PGPQP-n-F
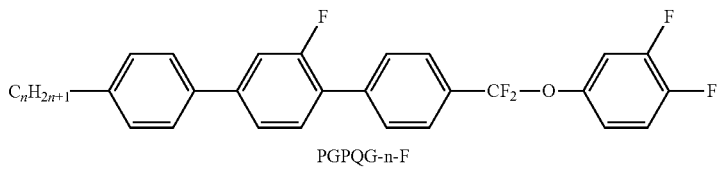
PGPQG-n-F
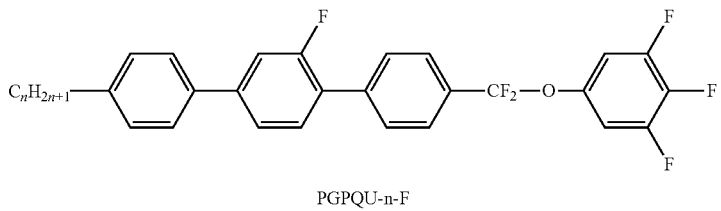
PGPQU-n-F
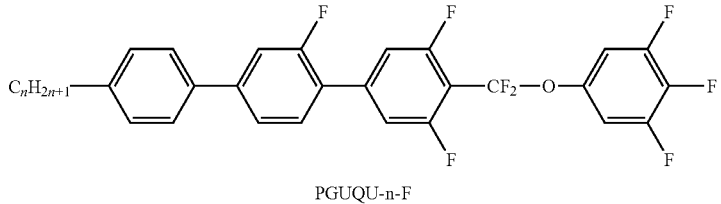
PGUQU-n-F TABLE D-continued
Illustrative structures
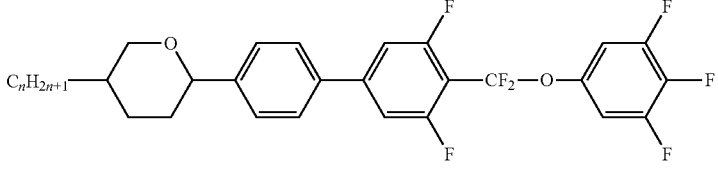
APUQU-n-F
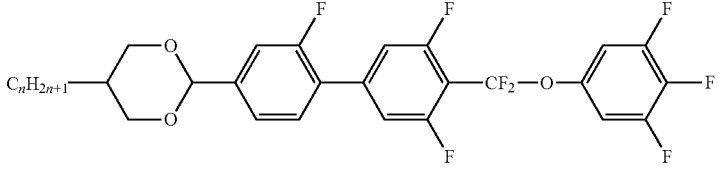
DGUQU-n-F
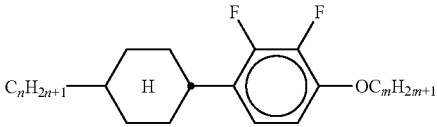
CY-n-Om
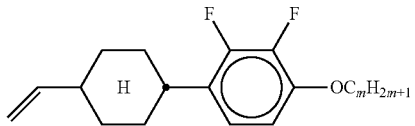
CY-V-Om
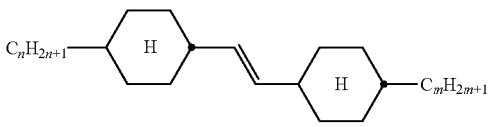
CVC-n-m
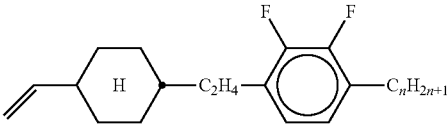
CEY-V-m
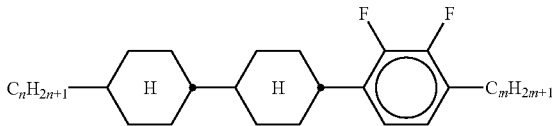
CCY-n-m
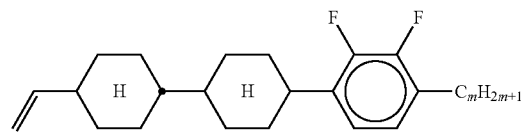
CCY-V-m TABLE D-continued
Illustrative structures
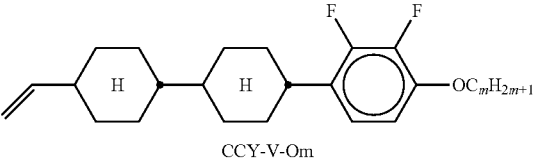
CCY-V-Om
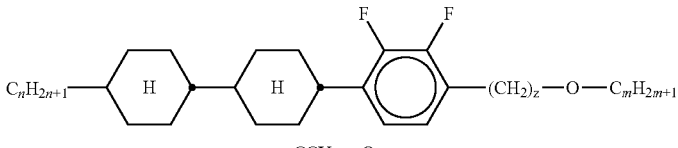
CCY-n-zOm
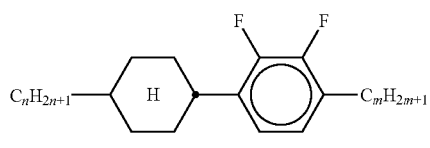
CY-n-m
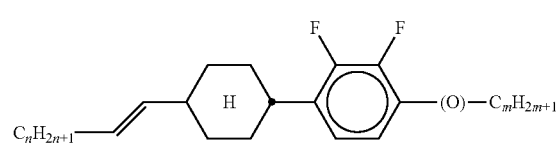
CY-nV-(O)m
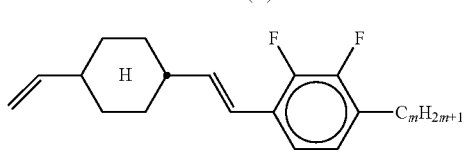
CVY-V-m
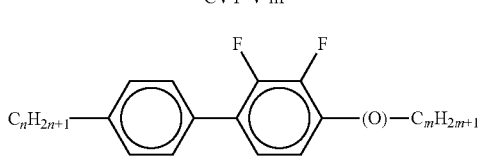
PY-n-(O)m
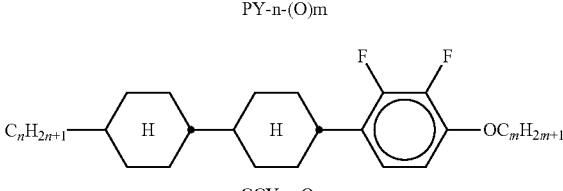
CCY-n-Om
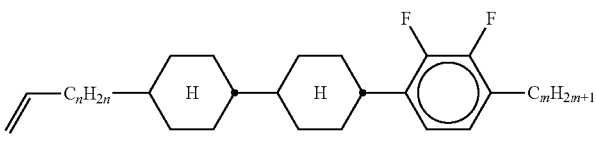
CCY-Vn-m
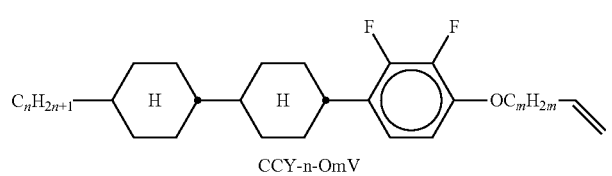
CCY-n-OmV TABLE D-continued
Illustrative structures
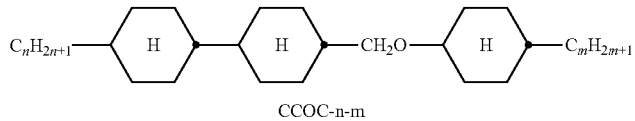
CCOC-n-m
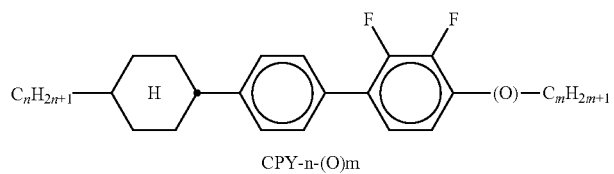
CPY-n-(O)m
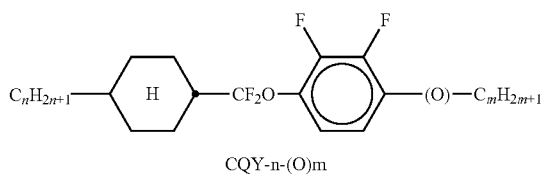
CQY-n-(O)m
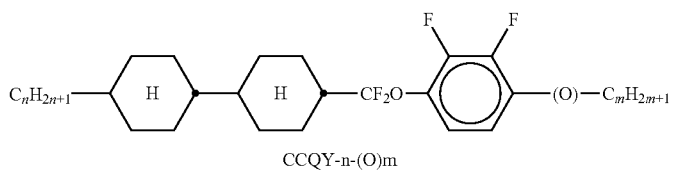
CCQY-n-(O)m
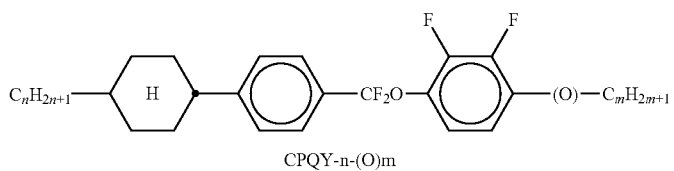
CPQY-n-(O)m
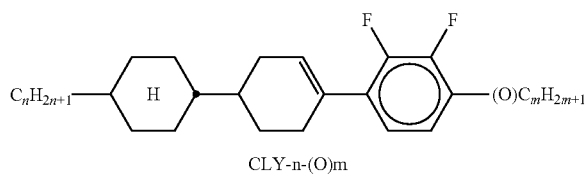
CLY-n-(O)m
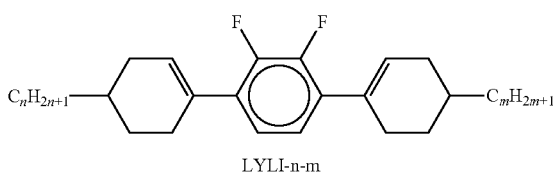
LYLI-n-m
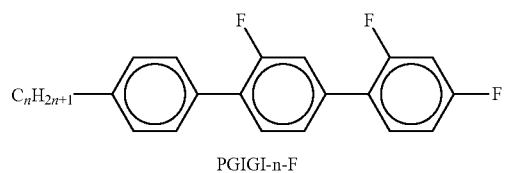
PGIGI-n-F
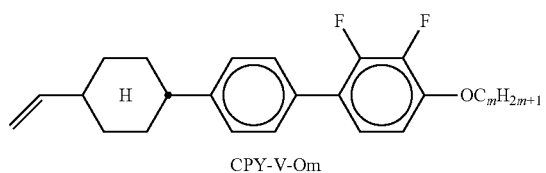
CPY-V-Om TABLE D-continued
Illustrative structures
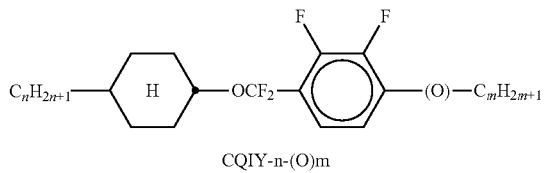
CQIY-n-(O)m
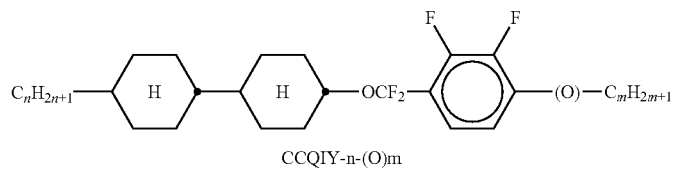
CCQIY-n-(O)m
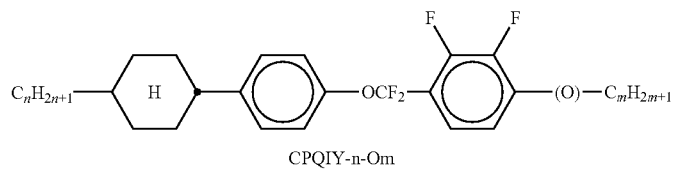
CPQIY-n-Om
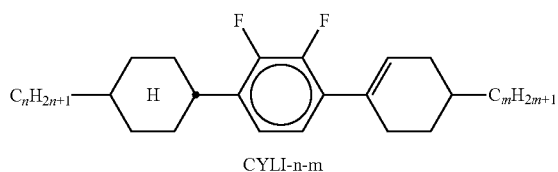
CYLI-n-m
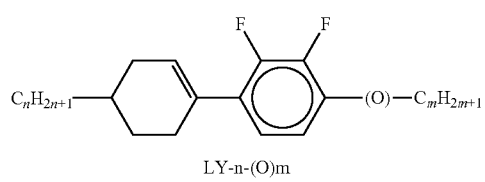
LY-n-(O)m
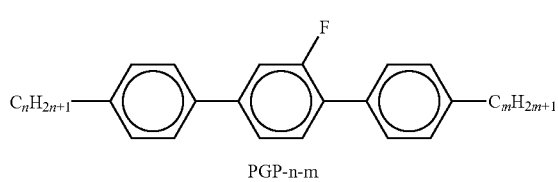
PGP-n-m
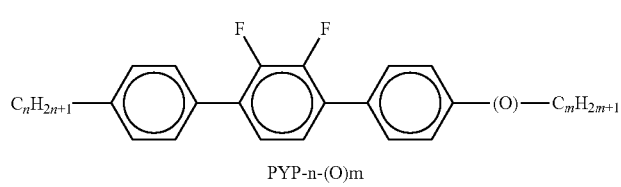
PYP-n-(O)m
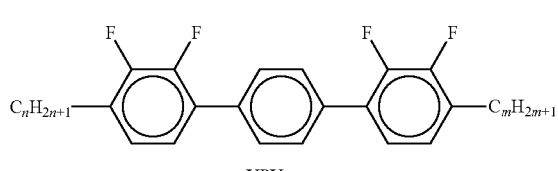
YPY-n-m
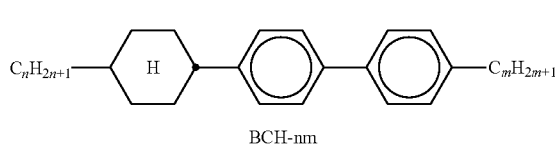
BCH-nm TABLE D-continued
Illustrative structures
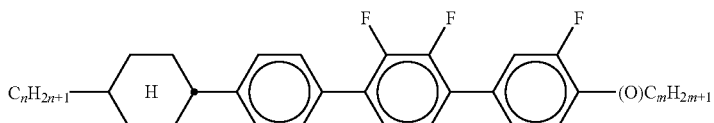
CPYP-n-(O)m
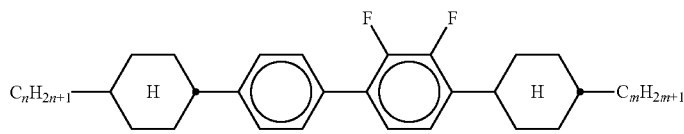
CPYC-n-m
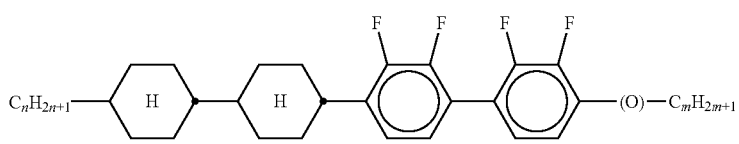
CCYY-n-m
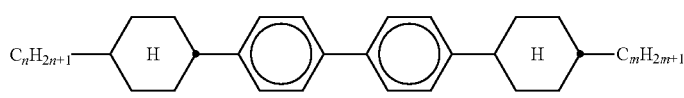
CBC-nm
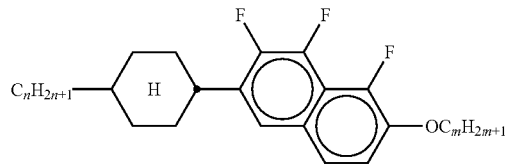
CNap-n-Om
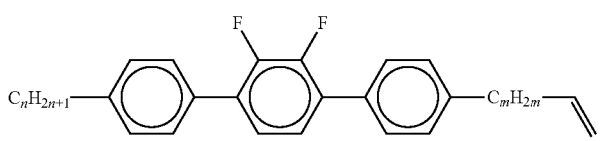
PYP-n-mV
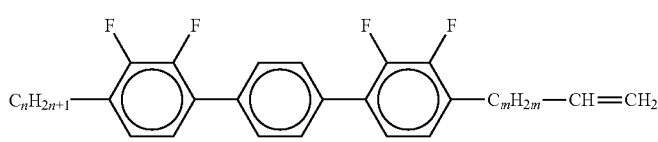
YPY-n-mV
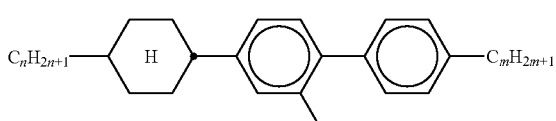
BCH-nmF TABLE D-continued
Illustrative structures
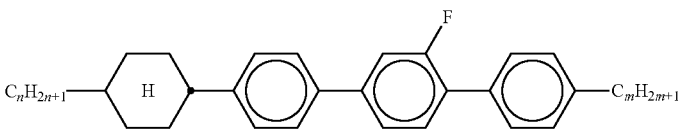
CPGP-n-m
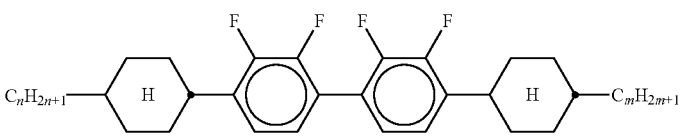
CYYC-n-m
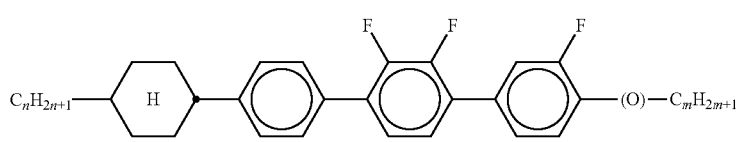
CPYG-n-(O)m
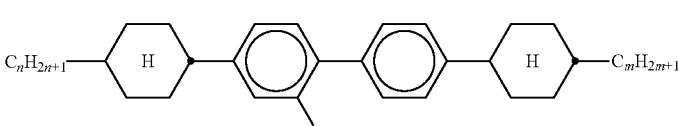
CBC-nmF
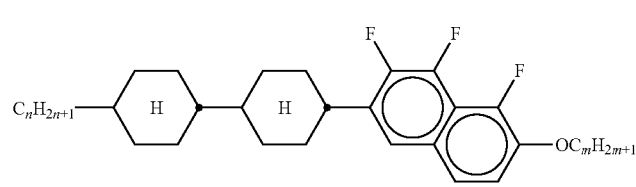
CCNap-n-Om
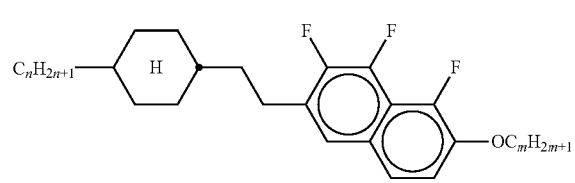
CENap-n-Om
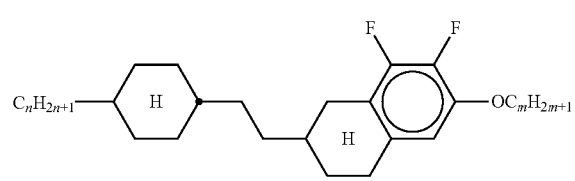
CETNap-n-Om
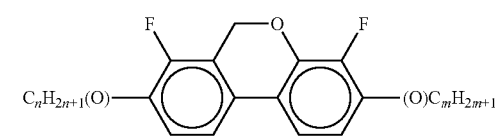
DFDBC-n(O)-(O)m

TABLE D-continued

Illustrative structures

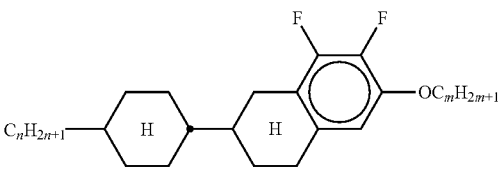

CTNap-n-Om

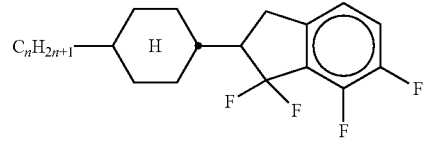

CK-n-F

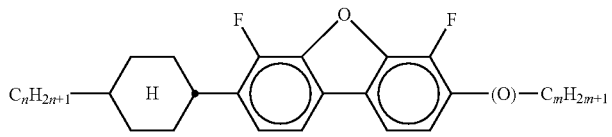

C-DFDBF-n-(O)m wherein n, m and l preferably, independently of one another, denote 1 to 7.

The following table, Table E, shows illustrative compounds which can be used as stabilizers in the mesogenic media according to the present invention.

TABLE E

Table E shows possible stabilizers which can be added to the LC media according to the invention. (n here denotes an integer from 1 to 12, preferably 1, 2, 3, 4, 5, 6, 7 or 8, terminal methyl groups are not shown).

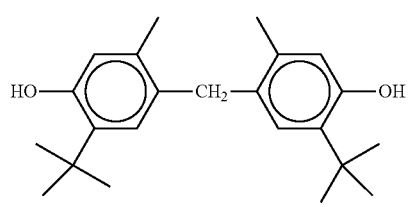

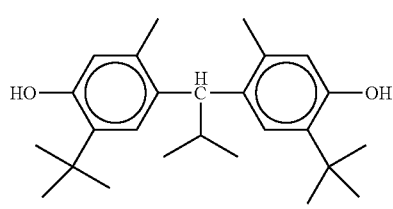

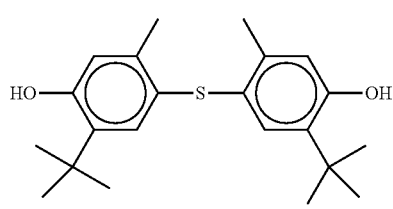

TABLE E-continued

Table E shows possible stabilizers which can be added to the LC media according to the invention. (n here denotes an integer from 1 to 12, preferably 1, 2, 3, 4, 5, 6, 7 or 8, terminal methyl groups are not shown).

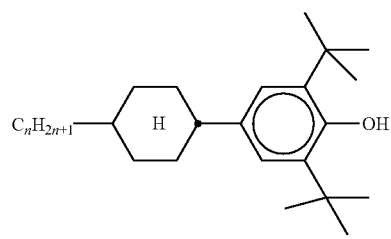

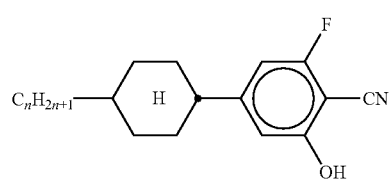

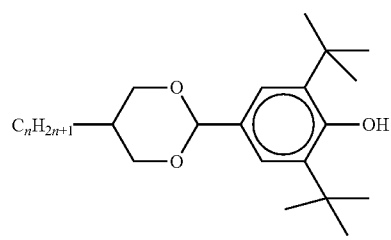

TABLE E-continued
Table E shows possible stabilizers which can be added to the LC media according to the invention. (n here denotes an integer from 1 to 12, preferably 1, 2, 3, 4, 5, 6, 7 or 8, terminal methyl groups are not shown).
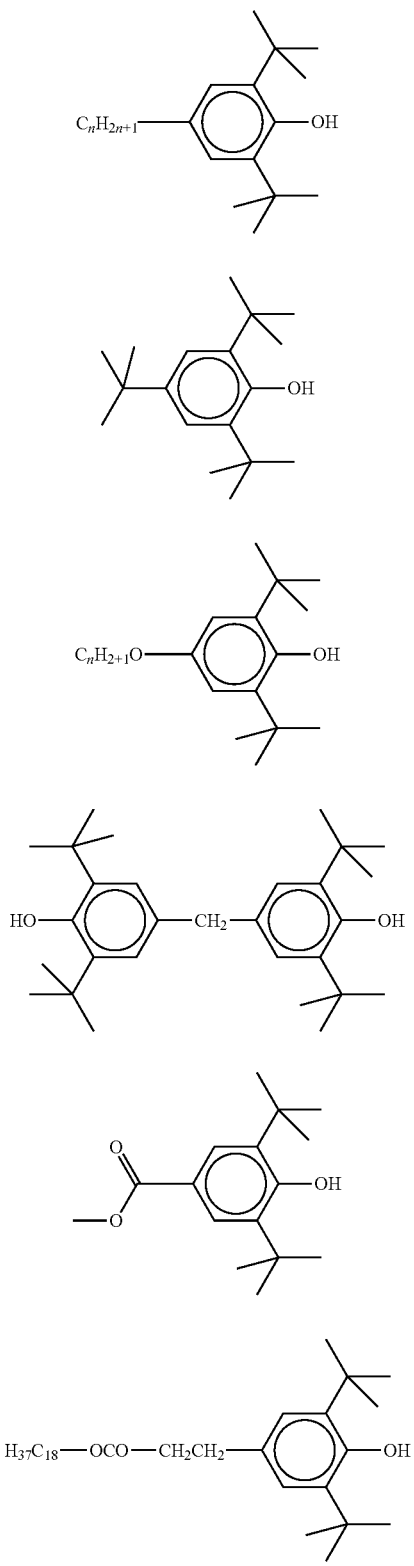
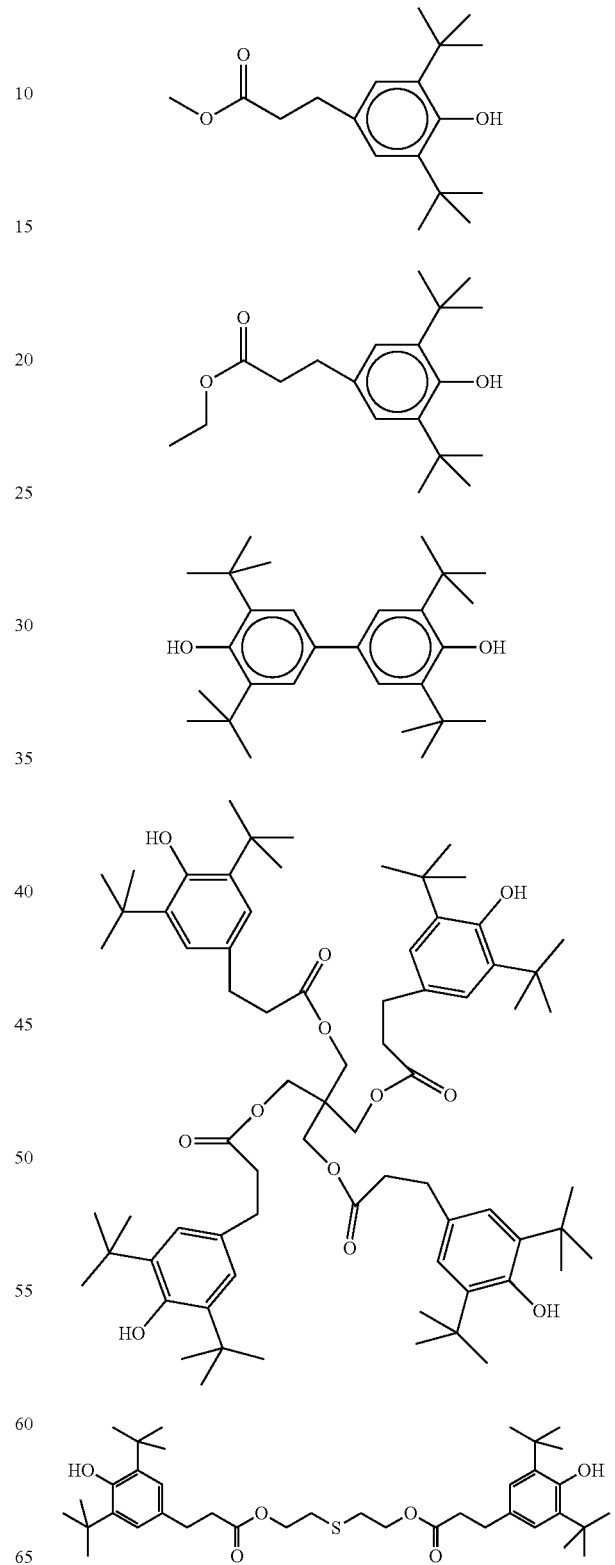

TABLE E-continued
Table E shows possible stabilizers which can be added to the LC media according to the invention. (n here denotes an integer from 1 to 12, preferably 1, 2, 3, 4, 5, 6, 7 or 8, terminal methyl groups are not shown).
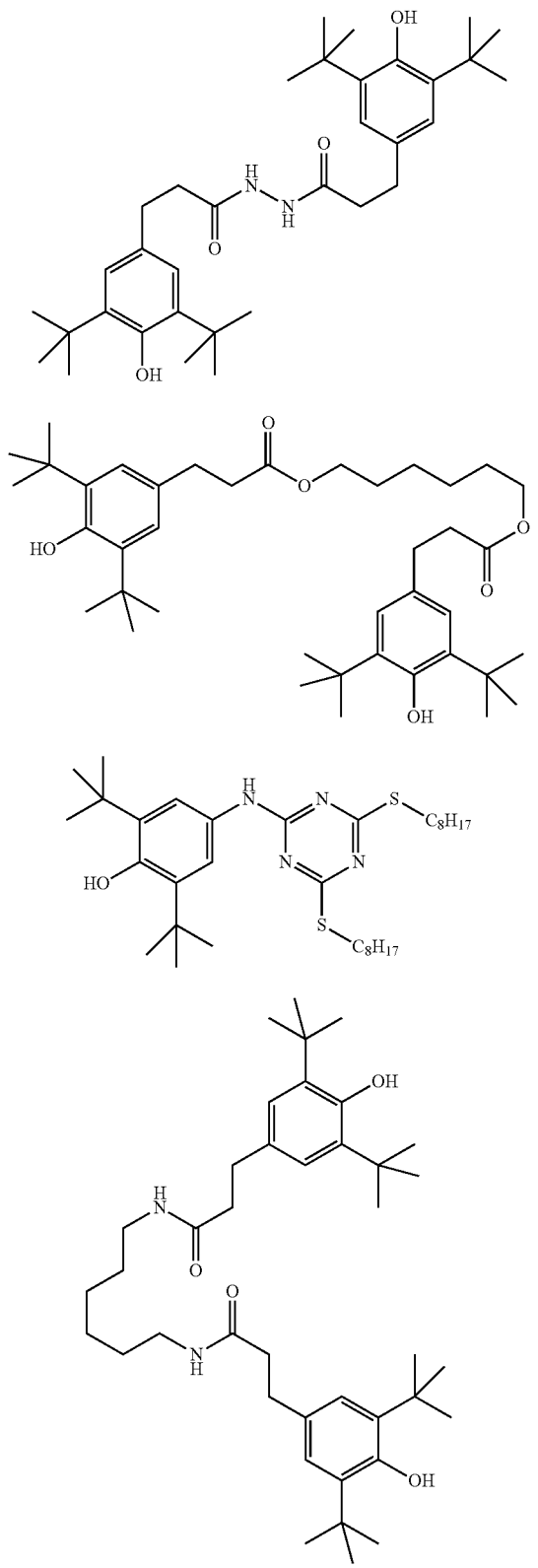
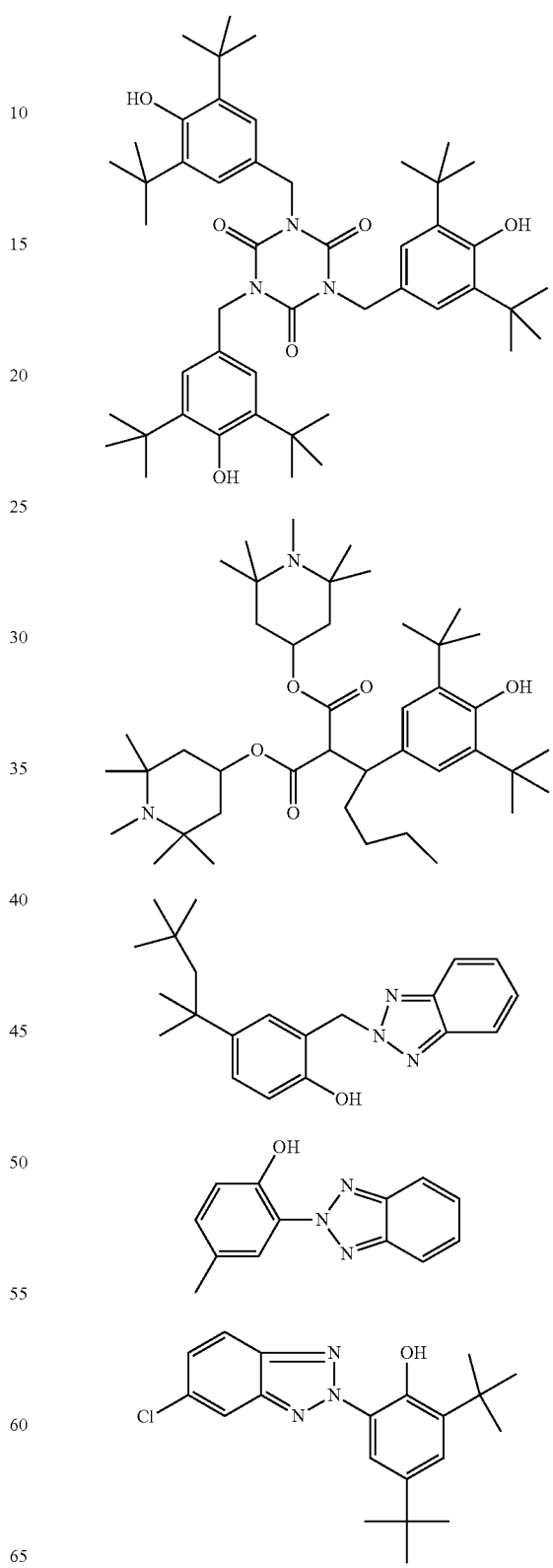

TABLE E-continued

Table E shows possible stabilizers which can be added to the LC media according to the invention. (n here denotes an integer from 1 to 12, preferably 1, 2, 3, 4, 5, 6, 7 or 8, terminal methyl groups are not shown).

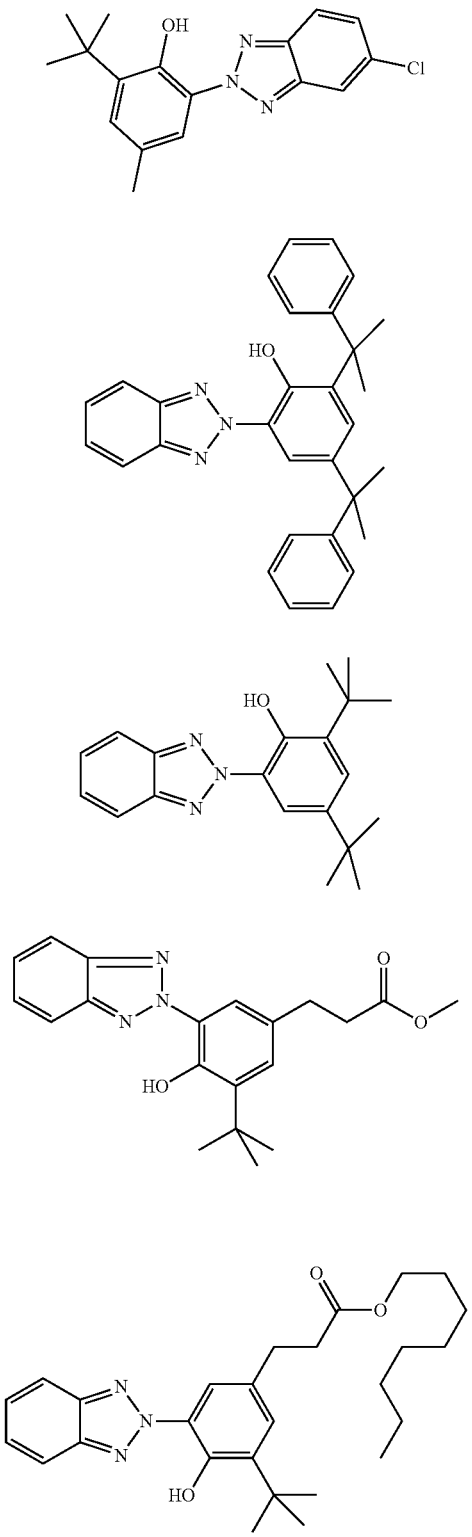

TABLE E-continued

Table E shows possible stabilizers which can be added to the LC media according to the invention. (n here denotes an integer from 1 to 12, preferably 1, 2, 3, 4, 5, 6, 7 or 8, terminal methyl groups are not shown).

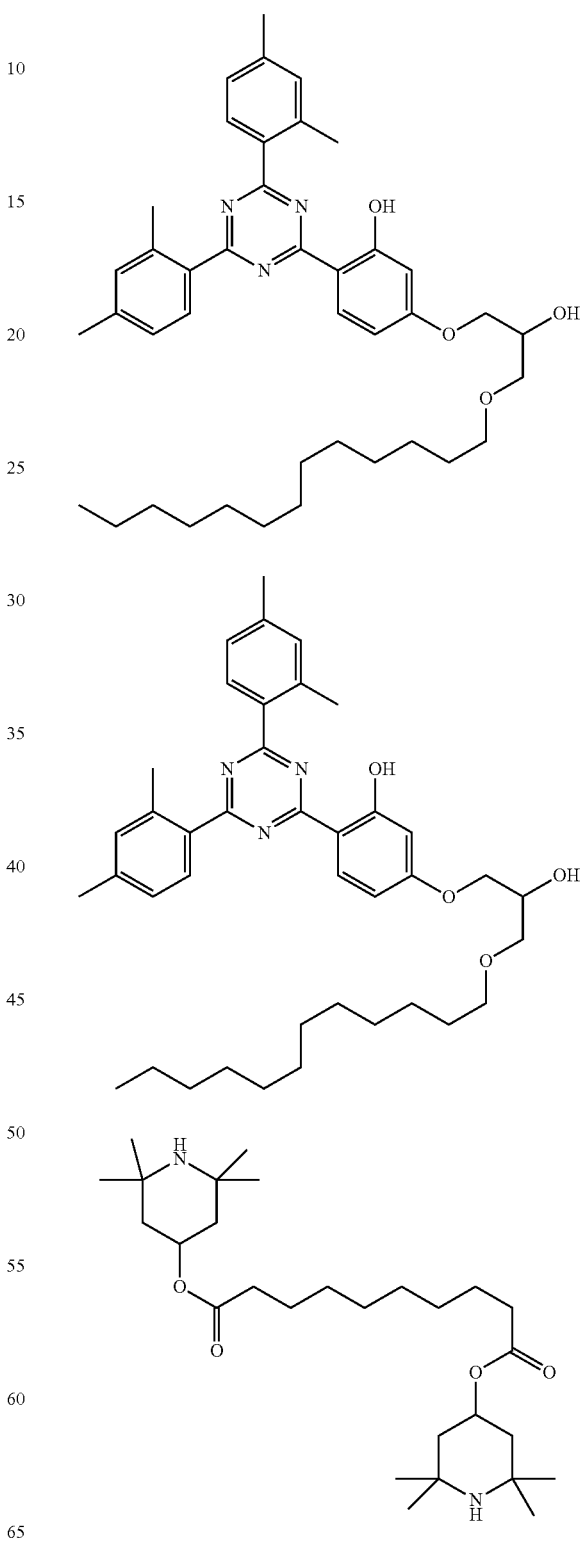

TABLE E-continued
Table E shows possible stabilizers which can be added to the LC media according to the invention. (n here denotes an integer from 1 to 12, preferably 1, 2, 3, 4, 5, 6, 7 or 8, terminal methyl groups are not shown).
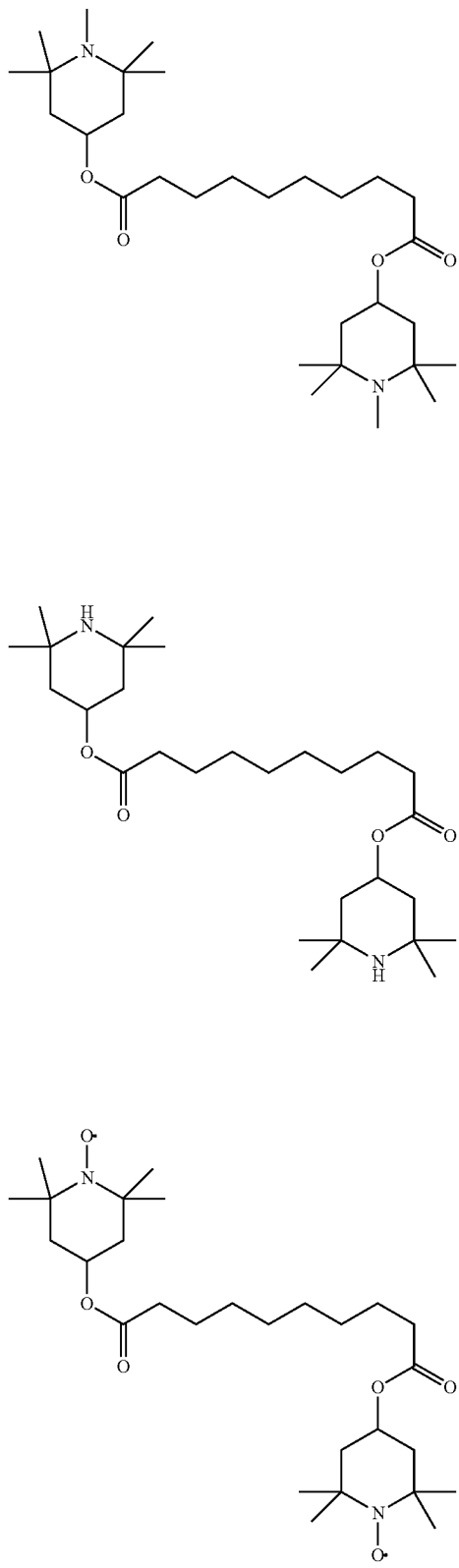
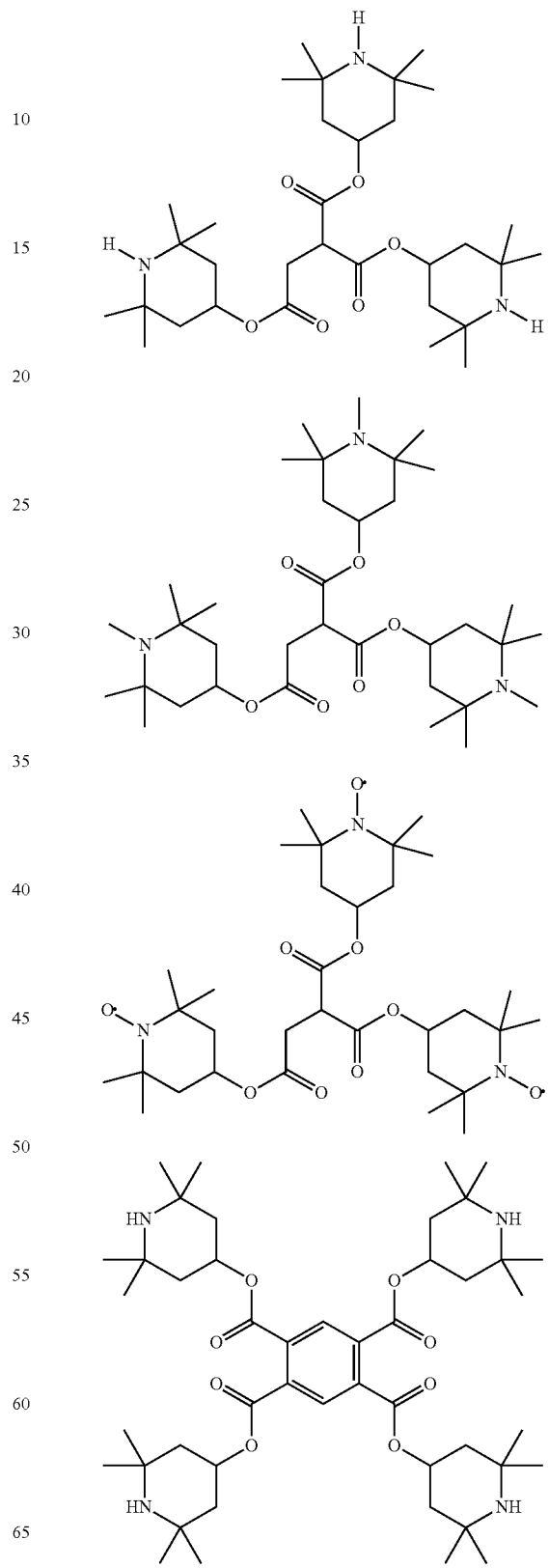

TABLE E-continued

Table E shows possible stabilizers which can be added to the LC media according to the invention. (n here denotes an integer from 1 to 12, preferably 1, 2, 3, 4, 5, 6, 7 or 8, terminal methyl groups are not shown).

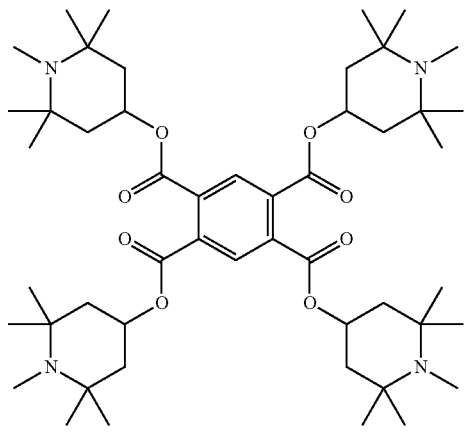

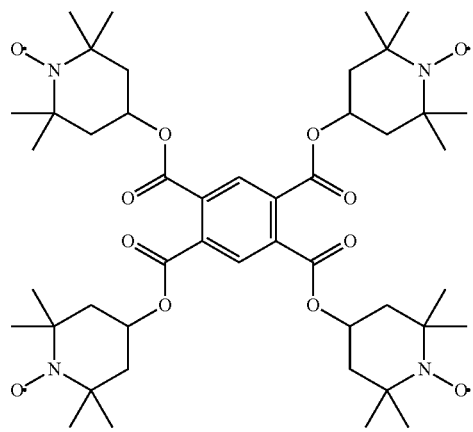

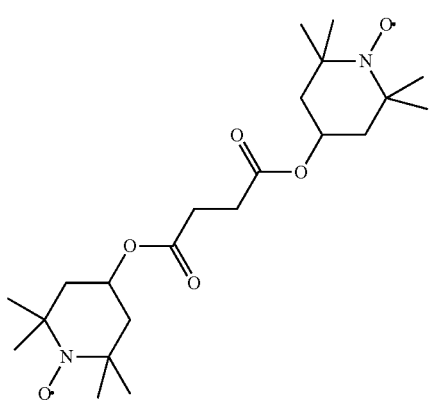

TABLE E-continued

Table E shows possible stabilizers which can be added to the LC media according to the invention. (n here denotes an integer from 1 to 12, preferably 1, 2, 3, 4, 5, 6, 7 or 8, terminal methyl groups are not shown).

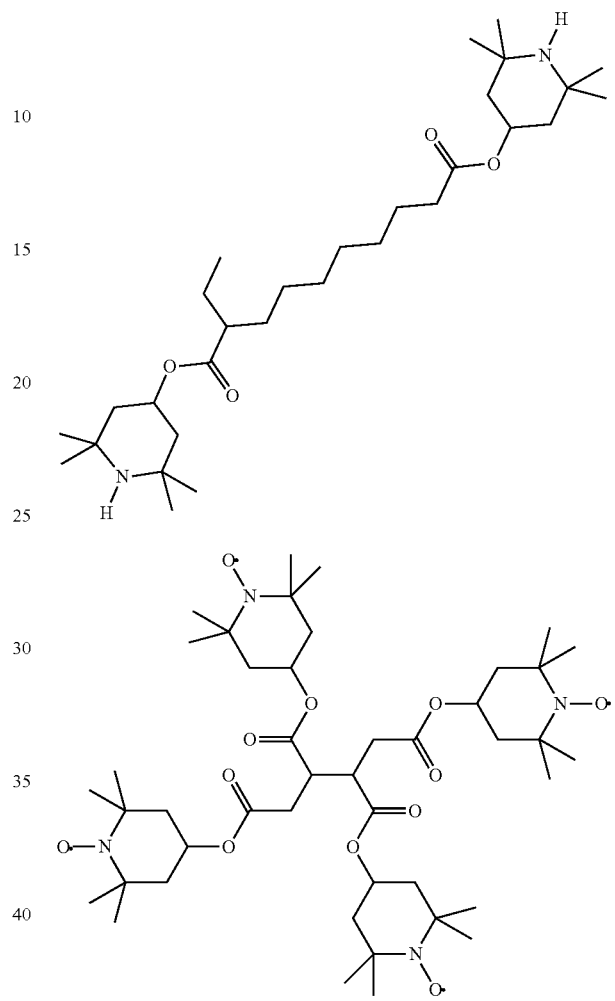

The LC media preferably comprise 0 to 10% by weight, in particular 1 ppm to 5% by weight, particularly preferably 1 ppm to 1% by weight, of 30 stabilizers.

Table F below shows illustrative compounds which can preferably be used as chiral dopants in the mesogenic media according to the present invention.

TABLE F

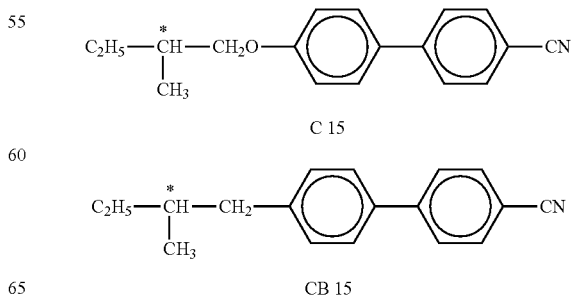

TABLE F-continued

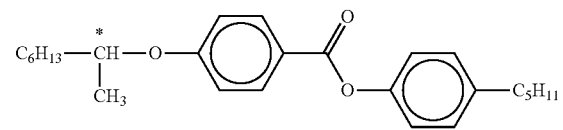
CM 21

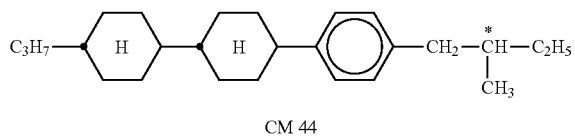
CM 44

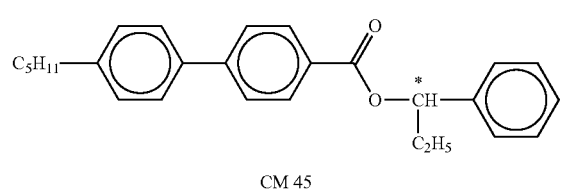
CM 45

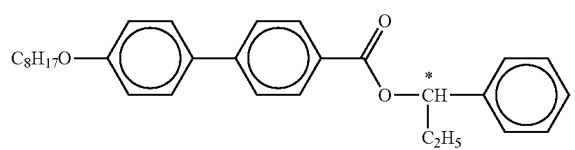
CM 47

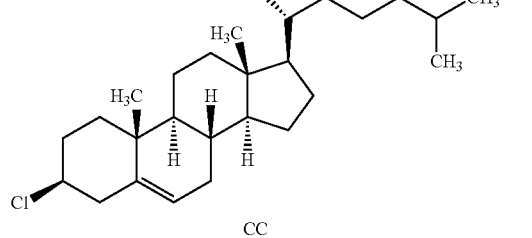
CC

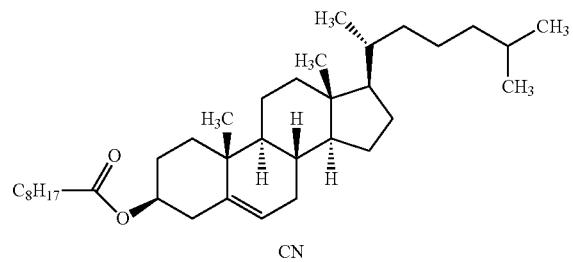
CN

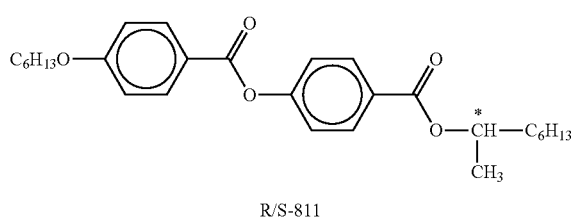
R/S-811

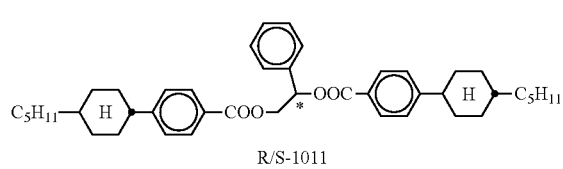
R/S-1011

TABLE F-continued

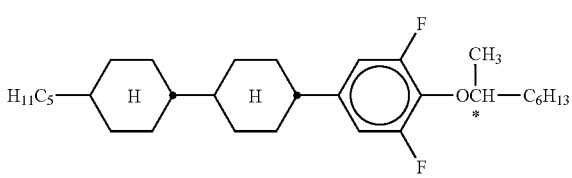
R/S-2011

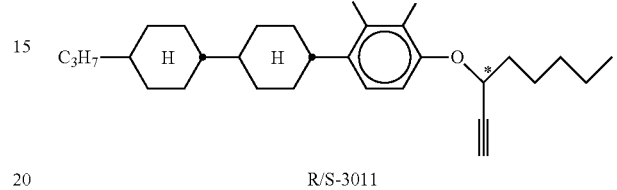
R/S-3011

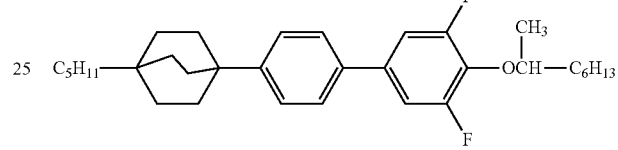
R/S-4011

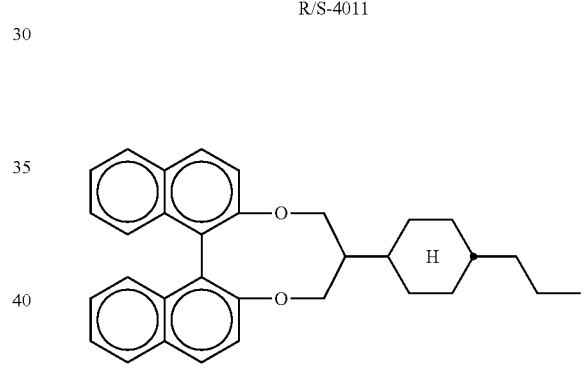
R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, individual compounds, preferably of three or more, particularly preferably of four or more, different formulae, selected from the group of the compounds from Table D.

Hereinafter, the present invention is described in more detail and specifically with reference to the Examples, which however are not intended to limit the present invention.

Further combinations of the embodiments of the current invention and variants of the invention are also disclosed by the claims.

EXAMPLES
Utilized Photoreactive Compounds of Formula I:
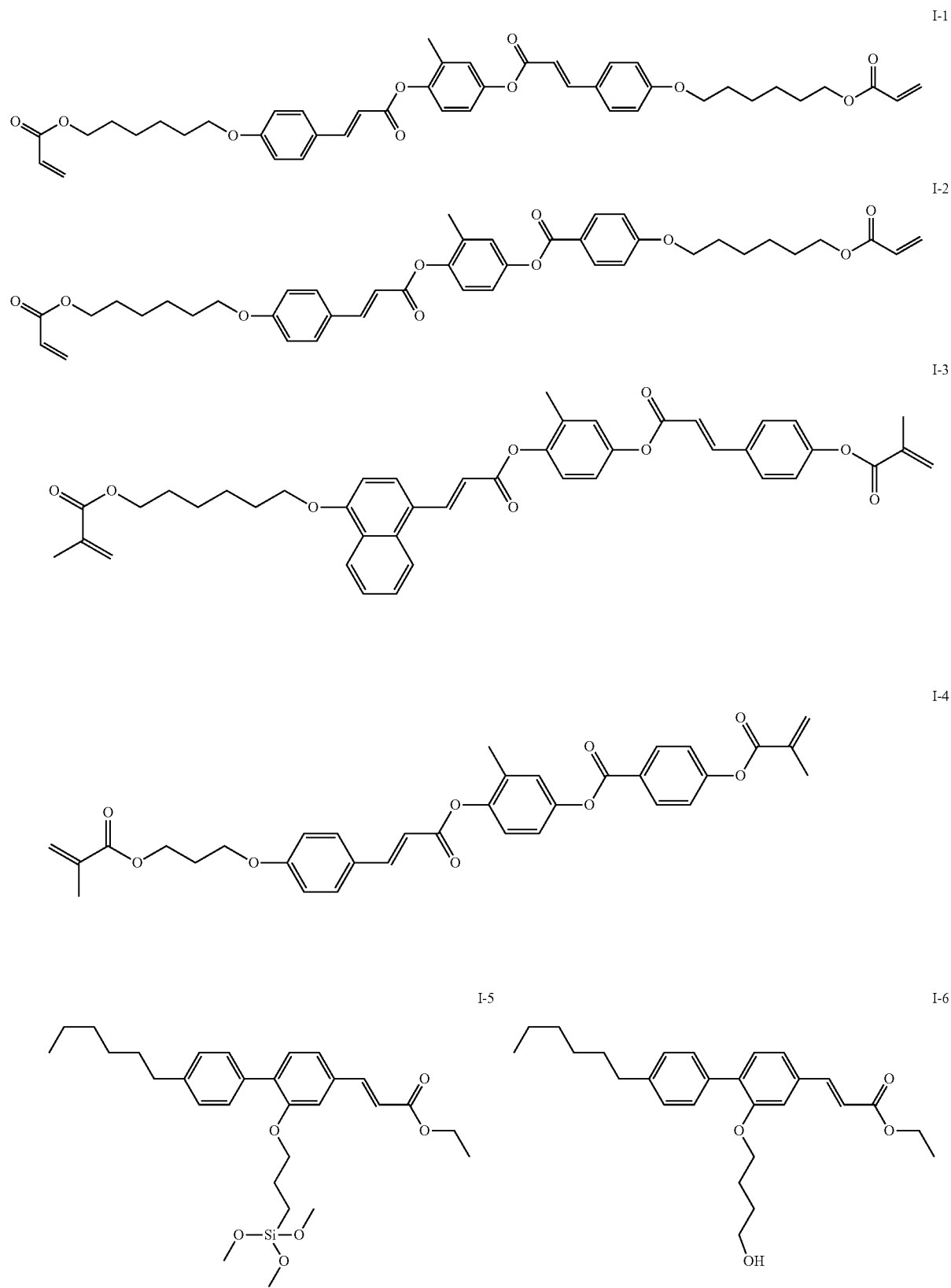

Self-Alignment Additives for Vertical Orientation
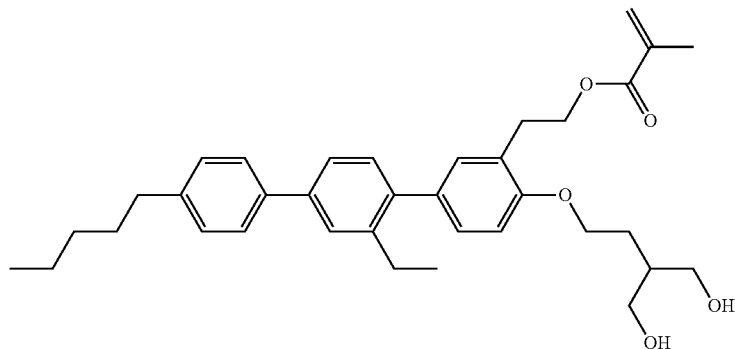
SA-1
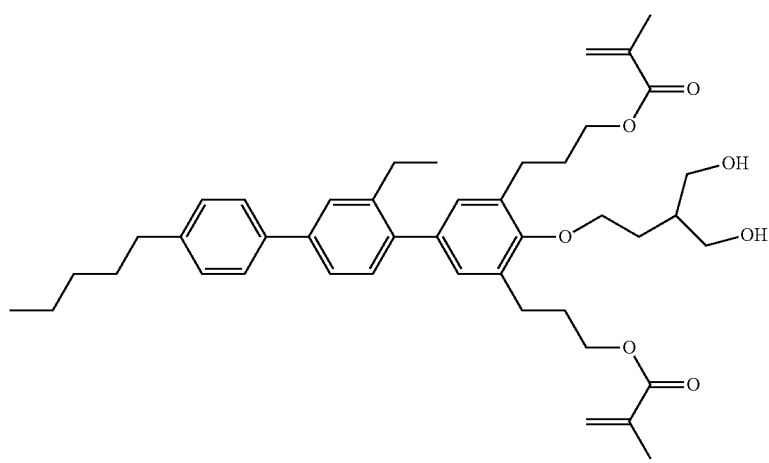
SA-2
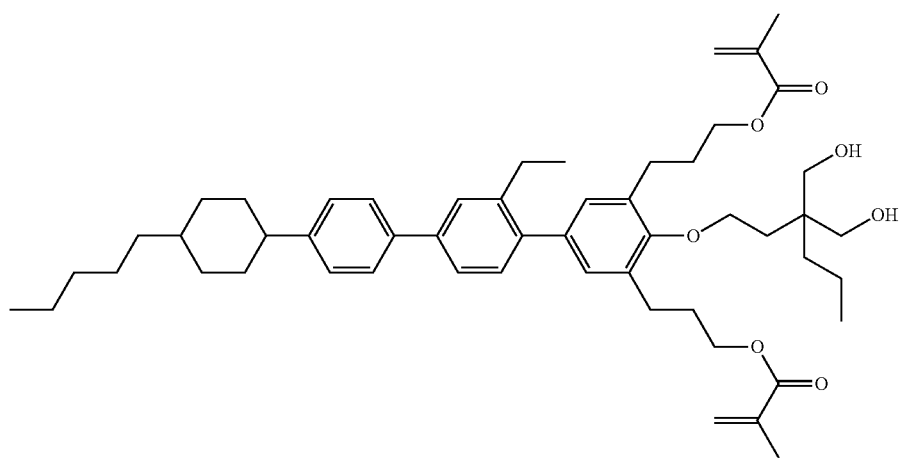
SA-3

-continued
SA-4
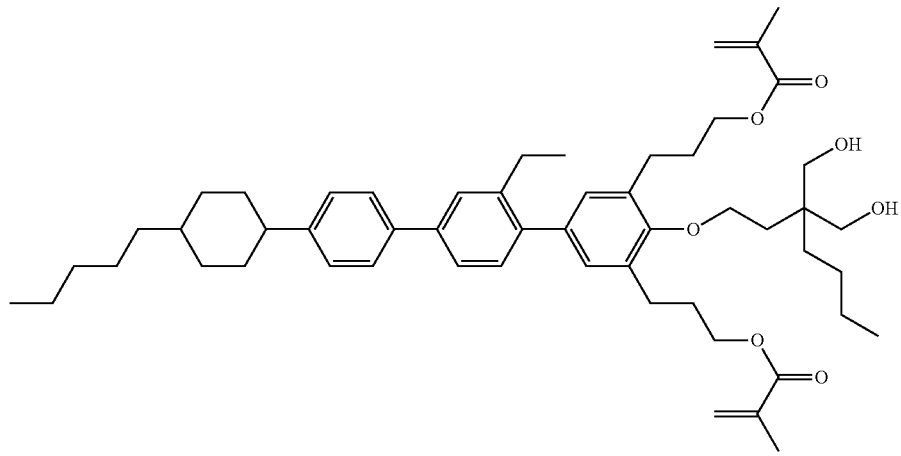
SA-5
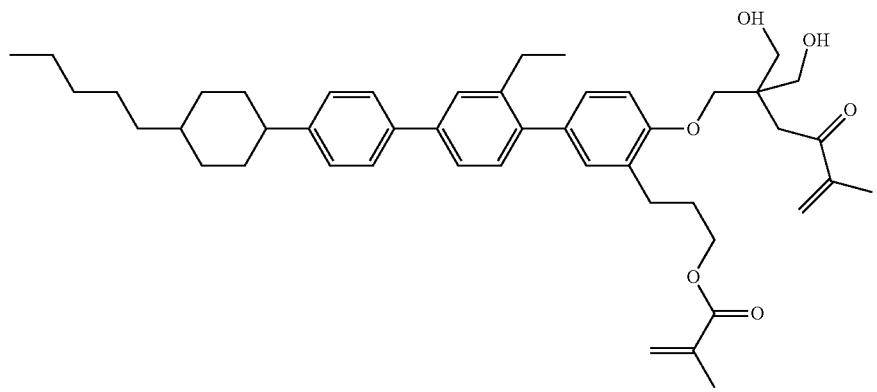
SA-6
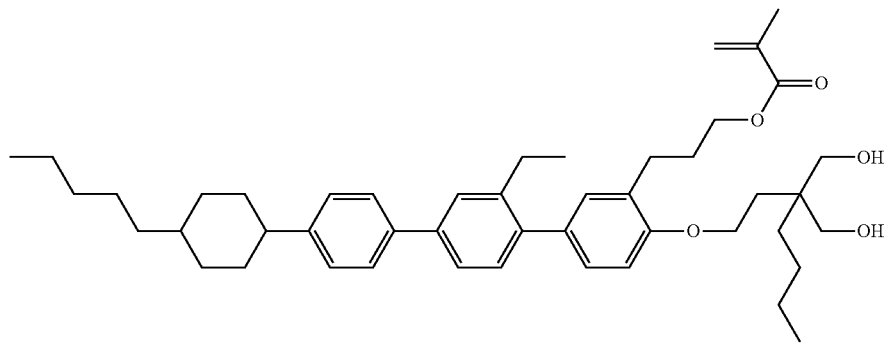
SA-7
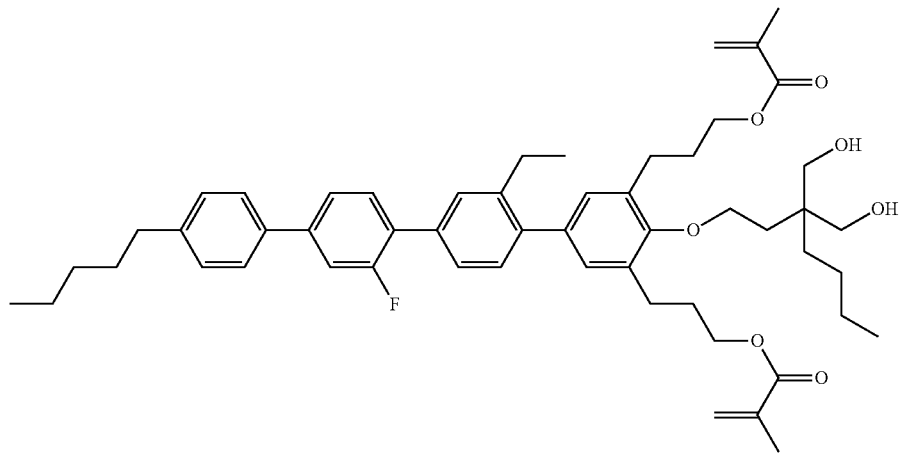

SA-8

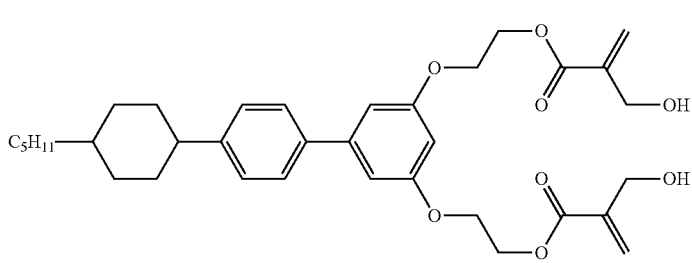

Optionally added polymerizable compounds of formula P:

P-1
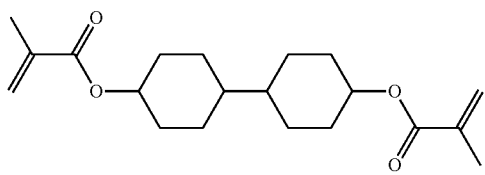

P-2
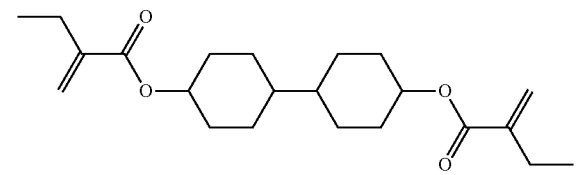

P-3
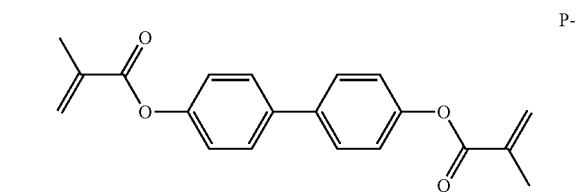

P-4
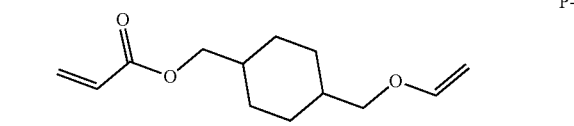

P-5
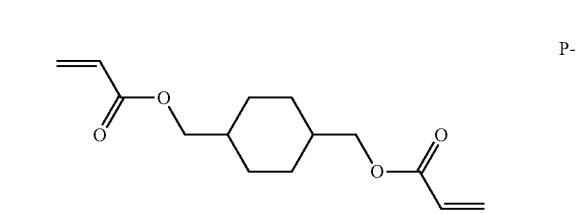

P-6
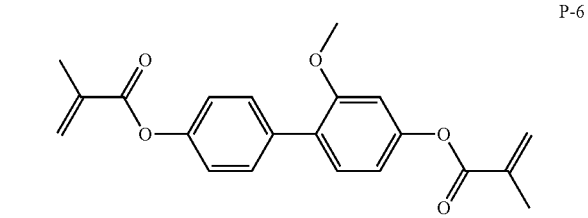

P-7
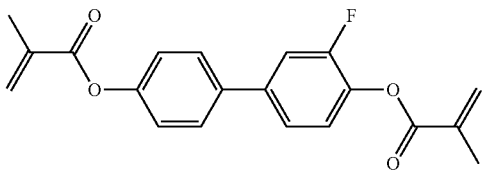

Nematic Host Mixtures

The nematic LC host mixture N-1 is prepared as indicated in the following tables:

| H1: Nematic host mixture ($\Delta\epsilon < 0$) | | | |
|---|---|---|---|
| CC-3-V1 | 37.0% | Clearing point [° C.]: | 73.5 |
| CCY-3-O1 | 5.00% | $\Delta n$ (589 nm, 20° C.): | 0.1005 |
| CCY-3-O2 | 9.50% | $\Delta\epsilon$ (1 kHz, 20° C.): | −3.7 |
| CCY-4-O2 | 5.00% | | |
| CPY-2-O2 | 10.0% | | |
| CPY-3-O2 | 10.0% | | |
| CY-3-O2 | 11.5% | | |
| PY-3-O2 | 12.0% | | |

| H2: Nematic host mixture ($\Delta\epsilon > 0$) | | | |
|---|---|---|---|
| GGP-3-CL | 10.50% | Clearing point [° C.]: | 103.5 |
| GGP-5-CL | 27.00% | $\Delta n$ (589 nm, 20° C.): | 0.232 |
| CPGP-4-3 | 3.00% | $\Delta\epsilon$ (1 kHz, 20° C.): | 21.1 |
| CPGP-5-2 | 3.00% | | |
| CPGP-5-3 | 3.00% | | |
| CCGU-3-F | 9.00% | | |
| PUQU-2-F | 7.00% | | |
| PUQU-3-F | 8.00% | | |
| PGU-2-F | 8.00% | | |
| PGU-3-F | 8.00% | | |
| PGU-5-F | 8.00% | | |
| PGIGI-3-F | 6.00% | | |

| H3: Nematic host mixture ($\Delta\epsilon > 0$) | | | |
|---|---|---|---|
| CC-3-V | 36.00% | Clearing point [° C.]: | 78 |
| CC-3-V1 | 5.00% | $\Delta n$ (589 nm, 20° C.): | 0.110 |
| CCP-V-1 | 8.00% | $\Delta\epsilon$ (1 kHz, 20° C.): | 12.9 |
| PGP-2-2V | 3.00% | | |
| CCQU-3-F | 9.50% | | |
| PUQU-3-F | 8.50% | | |
| APUQU-2-F | 5.00% | | |
| APUQU-3-F | 8.00% | | |
| PGUQU-3-F | 4.00% | | |
| PGUQU-4-F | 8.00% | | |
| PGUQU-5-F | 5.00% | | |

Example 1

Cell Fabrication

Two cells were fabricated each using two 1"×1" ITO glass substrates. The ITO substrates were sonicated for 10 minutes each in acetone, isopropyl alcohol and de-ionized water. ITO substrates were air dried and dried in the oven at 50° C. for an hour to get rid of any remaining water from the substrates. Each cell was fabricated by hand using the two washed and cleaned ITO substrates. 5 μm spacer beads uniformly mixed in UV glue (Norland NOA 65) were put at the periphery of the substrates to impart a defined thickness to the cell. Two sides (opposite) were not sealed for the liquid crystal to be capillary filled later. Assembled cells were exposed to 250-450 nm UV power for 120 seconds to cure the UV glue and imparting thickness to the cell and also to seal two sides of the cell. Thickness of the cells was measured on an interferometer set up. Thickness of the fabricated cells is: 3.9 μm and 3.8 μm for cell #1.up and cell #1.down respectively.

Cell Filling and Curing

The fabricated cells were capillary filled at 100° C. on the hot plate using the mixtures as in Table 1.a below. The cells were held at 100° C. for 30 minutes before exposing to polarized UV. The cells were stacked onto each other with the bottom cell containing I-1 additive in a host mixture and the top cell containing the I-2 additive in the host mixture. The top and bottom cell stacked together were simultaneously exposed to polarized UV (50 mW/cm$^2$, 60 s). The cells were slowly cooled to below isotropic to nematic transition (approx. 20° C. below $T_{NI}$). In order to carry out slow cooling, the hot plate was switched off with cells left on the hot plate.

TABLE 1.a

Mixture composition of Example 1

| Component | % composition | |
|---|---|---|
| | Bottom cell 1 | Top cell 1 |
| I-1 | 2% | — |
| I-5 | — | 1% |
| Host mixture H1 | 98% | 99% |
| Total | 100% | 100% |

Results:

Both the cells give uniform planar alignment when observed under a light pad and under a microscope.

Alignment Orientation

The alignment orientation of the two cells were measured using a spectroscopic variable angle transmission ellipsometer. The cells were mounted and rotated about an axis perpendicular to the direction of polarized UV used in the alignment step. The following orientation of the optic axis (slow axis) of the two LC layers is observed.

TABLE 1.b

Resulting alignment after polarized UV

| Bottom cell 1 | Top cell 1 |
|---|---|
| Optic axis perpendicular to direction of polarized UV light | Optic axis parallel to direction of polarized UV light |

Double Layer Stack:

When the two cells which had been exposed together are placed on top of each other in the same orientation as they were exposed, a dark state between crossed polarizers can be observed. Their optic axis are orthogonal and the combined retardation is approximately zero. The retardation (550 nm) as a function of angle of the incident light for each of the cells and for the double layer stack is shown in FIG. 1. The combined retardation (triangles) is almost zero for any angle.

Example 2

Here Example 1 is repeated, but a host mixture with positive dielectric anisotropy (H2) is used and the amount of additive I-1 is changed to 1%.

TABLE 2.a

Mixture composition of Example 2

| Component | % composition | |
|---|---|---|
| | Cell 2.bottom | Top cell 2 |
| I-1 | 1% | — |
| I-5 | — | 1% |
| Host mixture H2 | 99% | 99% |
| Total | 100% | 100% |

Results:

Both the cells give uniform planar alignment when observed under a light pad and under a microscope.

Alignment Orientation

The alignment orientation of the two cells were measured using a spectroscopic variable angle transmission ellipsometer. The cells were mounted and rotated about an axis perpendicular to the direction of polarized UV used in the alignment step. The following orientation of the optic axis (slow axis) of the two LC layers is observed.

TABLE 2.b

Resulting alignment after polarized UV

| Cell 2.bottom | Top cell 2 |
|---|---|
| Optic axis perpendicular to direction of polarized UV light | Optic axis parallel to direction of polarized UV light |

Double Layer Stack:

When the two cells which had been exposed together are placed on top of each other in the same orientation as they were exposed, a dark state between crossed polarizers can be observed.

Example 3

In this example a host mixture (H$_2$) with positive dielectric anisotropy is used.

TABLE 3.a

Mixture composition of Example 3

| Component | % composition | |
|---|---|---|
| | Cell 3.bottom | Top cell 3 |
| I-1 | 1% | — |
| I-5 | — | 1% |
| Host mixture H2 | 99% | 99% |
| Total | 100% | 100% |

Cell Filling and Curing:

Polyimide free cells (CT19082 VHR PI less 5.0 μm) are capillary filled at 125° C. on the hot plate using the formulations as in Table 3.a. The cells are held at 125° C. for 30 minutes before exposing to polarized UV. The cells are stacked onto each other with the cell containing I-1 additive at the bottom (cell 3.bottom) and I-3 additive at the top (cell 3.top). Both stacked cells were simultaneously exposed to polarized UV (50 mW/cm², 60 seconds). The cells were slowly cooled to below isotropic to nematic transition (approx. 20° C. below $T_{NI}$). In order to carry out slow cooling, the hot plate was switched off with cells left on the hot plate.

TABLE 3.b

| Resulting alignment after polarized UV | |
|---|---|
| Bottom cell 3 | Top cell 3 |
| Optic axis perpendicular to direction of polarized UV light | Optic axis parallel to direction of polarized UV light |

When the two cells which had been exposed together are placed on top of each other in the same orientation as they were exposed, a dark state between crossed polarizers can be observed. Their optic axis are orthogonal and the combined retardation is approximately zero.

Example 4

In this example a host mixture ($H_2$) with positive dielectric anisotropy is used.

TABLE 4.a

| Mixture composition of Example 4 | | |
|---|---|---|
| | % composition | |
| Component | Bottom cell 4 | Top cell 4 |
| 1-2 | 1% | — |
| 1-5 | — | 1% |
| Host mixture H2 | 99% | 99% |
| Total | 100% | 100% |

Cell Filling and Curing:

Polyimide free cells (CT19082 VHR PI less 5.0 μm) are capillary filled at 125° C. on the hot plate using the formulations as in Table 4.a. The cells are held at 125° C. for 30 minutes before exposing to polarized UV. The cells are stacked onto each other with the cell containing I-2 additive at the bottom (cell 4.bottom) and I-5 additive at the top (cell 4.top). Both stacked cells were simultaneously exposed to polarized UV (50 mW/cm², 60 seconds). The cells were slowly cooled to below isotropic to nematic transition (approx. 20° C. below $T_{NI}$). In order to carry out slow cooling, the hot plate was switched off with cells left on the hot plate.

TABLE 4.b

| Resulting alignment after polarized UV | |
|---|---|
| Bottom cell 4 | Top cell 4 |
| Optic axis perpendicular to direction of polarized UV light | Optic axis parallel to direction of polarized UV light |

Double Layer Stack

When the two cells which had been exposed together are placed on top of each other in the same orientation as they were exposed, a dark state between crossed polarizers can be observed. Their optic axis are orthogonal and the combined retardation is approximately zero.

Example 5

In this example a host mixture ($H_2$) with positive dielectric anisotropy is used. The alignment is modified in a two-step UV procedure.

TABLE 5.a

| Mixture composition of Example 5 | | |
|---|---|---|
| | % composition | |
| Component | Bottom cell 5 | Top cell 5 |
| I-1 | 1% | — |
| I-2 | — | 1% |
| Host mixture H2 | 99% | 99% |
| Total | 100% | 100% |

Step 1: Cell Filling and First UV Curing:

Polyimide free cells (CT19082 VHR PI less 5.0 μm) are capillary filled at 125° C. on the hot plate using the formulations as in Table 5. The cells are held at 125° C. for 30 minutes before exposing to polarized UV. The cells are stacked onto each other with the cell containing I-1 additive at the bottom (cell 5.bottom) and I-2 additive at the top (cell 5.top). Both stacked cells were simultaneously exposed to polarized UV (50 mW/cm², 60 seconds). The cells were slowly cooled to below isotropic to nematic transition (approx. 20° C. below $T_{NI}$). In order to carry out slow cooling, the hot plate was switched off with cells left on the hot plate. Measurements of the alignment are carried out before the second polarized UV exposure (see results Table 5.b below).

Step 2: Second UV Curing:

The cells were stacked onto each other as in the first step. Both stacked cells were left to stand at 125° C. for 15 minutes. With the wire grid polarizer rotated by 90° to its earlier exposure setting, both stacked cells were simultaneously exposed to polarized UV (50 mW/cm², 90 seconds) for the step 2 UV exposure. The cell containing I-1 gets realigned with the $2^{nd}$ step UV exposure as it is rewritable. The other cell containing 1-2 does not realign with the $2^{nd}$ exposure of polarized UV as it is not rewritable. The cells were again slowly cooled down to below isotropic to nematic transition (approx. 20° C. below $T_{NI}$).

TABLE 5.b

| Resulting alignment after polarized UV | | |
|---|---|---|
| | Bottom cell 5 | Top cell 5 |
| Step 1 | Optic axis perpendicular to direction of polarized UV light | Optic axis perpendicular to direction of polarized UV light |
| Step 2 | Optic axis perpendicular to direction of polarized UV light | Optic axis stays as in step 1 (now parallel to direction of polarized UV light) |

Double Layer Stack

When the two cells which had been exposed together are placed on top of each other in the same orientation as they were exposed, a dark state between crossed polarizers can be observed. Their optic axis are orthogonal and the combined retardation is approximately zero.

Example 6

Here a positive host mixture (H3) is used. The alignment is modified in a two-step UV procedure.

TABLE 6.a

Mixture composition of Example 6

| | % composition | |
|---|---|---|
| Component | Cell 6.bottom | Cell 6.top |
| I-3 | 0.5% | — |
| I-4 | — | 0.5% |
| Host mixture H3 | 99.5% | 99.5% |
| Total | 100% | 100% |

Two FFS-cells are filled with one of the mixtures each and placed into a double layer stack of two cells. The stack is irradiated with polarized UV according to the following two-step scheme.
Step 1: UV range 320-280 nm (lamp with integrated 320 nm cut-off filter, 35 mW/cm$^2$), wire grid polarizer at 0°, 60 s
Step 2: UV range 360-380 nm (lamp as above with 360 nm cut-off filter added, effectively 20 mW/cm$^2$), wire grid polarizer at 90°, 60-120 s
Step 3: End-cure at low intensity at room temperature with broadband UV.

The resulting layers are examined using an AxoScan™ polarization measurement tool equipment with regard to cell parameters and electro-optic response.

Results show that the orientation of the bottom and top layer are rotated 90° to each other. Switching of the FFS cells was possible in the range of 0-3.5 V provided the alignment was made in the suitable direction relative to the comb electrode. The alignment of each layer is uniform and of high quality.

Example 7

In this example a host mixture (H1) with negative dielectric anisotropy and a host mixture (H2) with positive dielectric anisotropy is used in separate layers. The alignment of the first negative layer is self-aligning vertically, the second positive dielectric host is modified in a one-step UV procedure.

TABLE 7.a

Mixture composition of Example 7

| | % composition | |
|---|---|---|
| Component | Cell 7.bottom | Cell 7.top |
| I-3 | — | 0.5% |
| SA-2 | 0.3% | — |
| P-3 | 0.3% | — |
| Host mixture | H1, 99.1% | H2, 99.5% |
| Total | 100% | 100% |

One VA cell and one FFS-cell (both without alignment layer) are filled with each one of the mixtures H1 and H2 and placed into a double layer stack of two cells. The stack is irradiated with polarized UV with the following conditions.

Broadband Mercury UV lamp source with 360 nm cut filter (wavelengths shorter than 360 nm are cut, 35 mW/cm$^2$) wire grid polarizer at 0°. 3 min irradiation with the cells heated to 100° C. (above $T_{NI}$). A second UV step is then performed at room temperature for end-curing with low intensity broadband UV as it is typical for PS-VA or SA-VA.

TABLE 7.b

Resulting alignment after UV curing

| Bottom cell 7 | Top cell 7 |
|---|---|
| Vertical alignment | Optic axis perpendicular to direction of polarized UV light |

The resulting stack allows for active control of light intensity (bottom layer) and polarization orientation (top layer), thus giving a compact device that acts as a light modulator for both intensity and retardation modulation at the same time. There is an advantage to such a self-aligned device since the process steps required are relatively simple and a wide range of surfaces/materials can be used. The end-curing does not interfere with the alignment due to its low intensity.

The mixture in the bottom cell is repeated with any of the alignment additives SA-1 to SA-8.

The invention claimed is:
1. A double layer liquid crystal device comprising:
a first layer of liquid crystal medium and a second layer of liquid crystal medium,
the liquid crystal phase of the first layer of liquid crystal medium and the liquid crystal phase of the second layer of liquid crystal medium have orthogonal alignment with respect to each other or the liquid crystal phase of the first layer of liquid crystal medium and the liquid crystal phase of the second layer of liquid crystal medium have crossed alignment at an angle between 45 and 90° with respect to each other, in which the first layer comprises a first alignment aid, and the second layer comprises a second alignment aid, which alignment aids are polymerized or polymerizable molecular compounds,
wherein
the liquid crystal phases of the first layer and the second layer each have planar alignment at different angles with respect to each other by aid of the first alignment aid and the second alignment aid, respectively,
or
the liquid crystal phase of the first layer has planar alignment induced by the first alignment aid, and the liquid crystal phase of the second layer has vertical alignment induced by the second alignment aid, and
wherein the first and second alignment aids are selected to have a different induced direction of alignment under a given polarized UV light, where the first alignment aid induces an alignment vertical to the polarization direction of the used polarized UV light, and the second alignment aid induces an alignment parallel to the polarization direction of the used polarized UV light.
2. The double layer liquid crystal device according to claim 1, wherein the first and the second layer each have planar alignment at different angles with respect to each other by aid of the first alignment aid and the second alignment aid, respectively.

3. The double layer liquid crystal device according to claim 1, wherein the liquid crystal medium of the first or second layer comprises one or more compounds of the following formula:

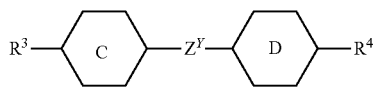

in which the individual radicals have the following meanings:

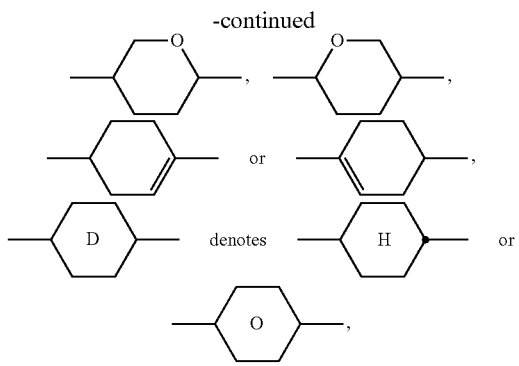

$R^3$ and $R^4$ each, independently of one another, denote alkyl having 1 to 12 C atoms, in which, in addition, one or two non-adjacent $CH_2$ groups may each be replaced by —O—, —CH=CH—, —CO—, —O—CO— or —CO—O— in such a way that O atoms are not linked directly to one another, and $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond.

4. A double layer liquid crystal device comprising:
a first layer of liquid crystal medium and a second layer of liquid crystal medium,
the liquid crystal phase of the first layer of liquid crystal medium and the liquid crystal phase of the second layer of liquid crystal medium have orthogonal alignment with respect to each other or the liquid crystal phase of the first layer of liquid crystal medium and the liquid crystal phase of the second layer of liquid crystal medium have crossed alignment at an angle between 45° and 90° with respect to each other, in which the first layer comprises a first alignment aid, and the second layer comprises a second alignment aid, which alignment aids are polymerized or polymerizable molecular compounds, wherein
the liquid crystal phases of the first layer and the second layer each have planar alignment at different angles with respect to each other by aid of the first alignment aid and the second alignment aid, respectively, or the liquid crystal phase of the first layer has planar alignment induced by the first alignment aid, and the liquid crystal phase of the second layer has vertical alignment induced by the second alignment aid, wherein the first and second alignment aids both independently comprise a polymerizable or polymerized compound of the structural formula I,

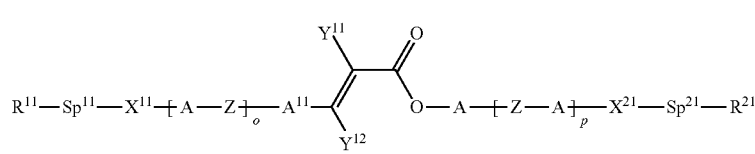

I wherein
$A^{11}$ denotes a radical selected from the following groups:
a) a group consisting of 1,4-phenylene and 1,3-phenylene, wherein, in addition, one or two CH groups may each be replaced by N and wherein, in addition, one or more H atoms may each be replaced by L,
b) a group selected from

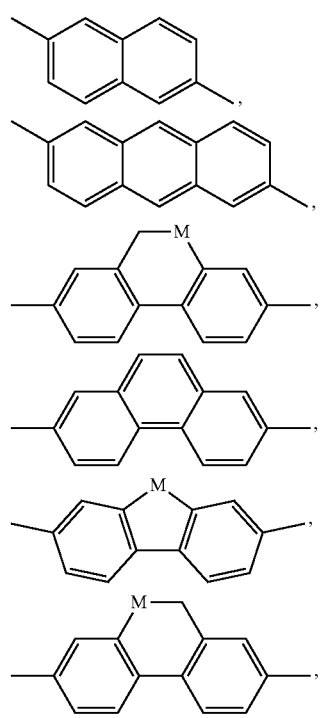

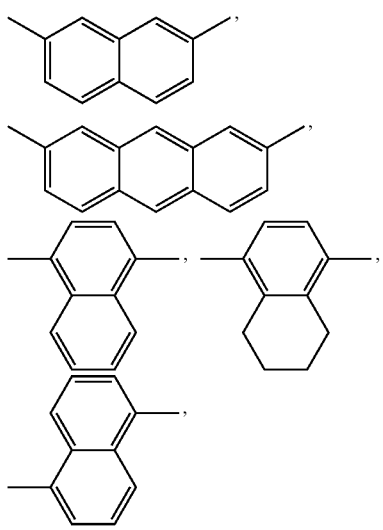

where, in addition, one or more H atoms in these radicals may each be replaced by L, and/or one or more double bonds may each be replaced by single bonds, and/or one or more CH groups may each be replaced by N, M denotes —O—, —S—, —CH$_2$—, —CHR$^z$— or —CR$^y$R$^z$—, R$^y$ and R$^z$ each, independently of one another, denote H, CN, F or alkyl having 1-12 C atoms, wherein one or more H atoms may each be replaced by F, A have each, independently of one another, in each occurence one of the meanings for A$^{11}$ or
a) a group consisting of trans-1,4-cyclohexylene, 1,4-cyclohexenylene, wherein, in addition, one ore more non-adjacent CH$_2$ groups may each be replaced by —O— or —S— and wherein, in addition, one or more H atoms may each be replaced by F, or
b) a group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl,
each of which may also be mono- or polysubstituted by L, L on each occurrence, identically or differently, denotes —OH, —F, —Cl, —Br, —I, —CN, —NO$_2$, SF$_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched or cyclic alkyl, alkoxy, alkylcarbonyl, alkoxycarbonyl, alkylcarbonyloxy or alkoxycarbonyloxy having 1 to 25 C atoms, or X$^{21}$-Sp$^{21}$-R$^{21}$, Y$^{11}$ and Y$^{12}$ each, independently of one another, denote H, F, phenyl or optionally fluorinated alkyl having 1-12 C atoms, Z denotes, independently of each other, in each occurrence, a single bond, —COO—, —OCO—, —O—CO—O—, —OCH$_2$—, —CH$_2$O—, —OCF$_2$—, —CF$_2$O—, —(CH$_2$)$_n$—, —CF$_2$CF$_2$—, —CH=CH—, —CF=CF—, —CH=CH—COO—, —OCO—CH=CH—, —CO—S—, —S—CO—, —CS—S—, —S—CS—, —S—CSS— or —C≡C—, n denotes an integer between 2 and 8,
o and p denote each and independently 0, 1 or 2, X$^{11}$ and X$^{21}$ denote independently from one another, in each occurrence a single bond, —CO—O—, —O—CO—, —O—COO—, —O—, —CH=CH—, —C≡C—, —CF$_2$—O—, —O—CF$_2$—, —CF$_2$—CF$_2$—, —CH$_2$—O—, —O—CH$_2$—, —CO—S—, —S—CO—, —CS—S—, —S—CS—, —S—CSS— or —S—, Sp$^{11}$ and Sp$^{21}$ denote each and independently, in each occurrence a single bond or a spacer group comprising 1 to 20 C atoms, wherein one or more non-adjacent and non-terminal CH$_2$ groups may also each be replaced by —O—, —S—, —NH—, —N(CH$_3$)—, —CO—, —O—CO—, —S—CO—, —O—COO—, —CO—S—, —CO—O—, —CF$_2$—, —CF$_2$O—, —OCF$_2$—, —C(OH)—, —CH(alkyl)-, —CH(alkenyl)-, —CH(alkoxyl)-, —CH(oxaalkyl)-, —CH=CH— or —C≡C—, however in such a way that no two O-atoms are adjacent to one another and no two groups selected from —O—CO—, —S—CO—, —O—COO—, —CO—S—, —CO—O— and —CH=CH— are adjacent to each other, R$^{11}$ denotes P, R$^{21}$ denotes P, halogen, CN, optionally fluorinated alkyl or alkenyl with up to 15 C atoms in which one ore more non-adjacent CH$_2$-groups may each be replaced by —O—, —S—, —CO—, —C(O)O—, —O—C(O)—, or O—C(O)—O—, and P each and independently from another in each occurrence a polymerizable group, and wherein the first and second alignment aids are selected to have a wavelength of maximum absorption differing by 30 nm or more.

5. The double layer liquid crystal device according to claim 4, wherein in the liquid crystal medium of the first layer the total concentration of compounds of formula I is in the range of from 0.01 to 10% by weight.

6. The double layer liquid crystal device according to claim 4, wherein P is selected from CH$_2$=CW$^1$—CO—O—, CH$_2$=CW$^1$—CO—,

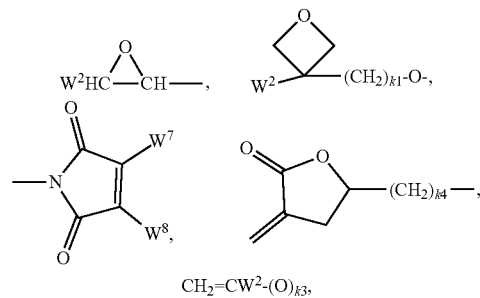

CH$_2$=CW$^2$-(O)$_{k3}$,

CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, wherein
- $W^1$ is H, F, Cl, CN, $CF_3$, phenyl or alkyl having 1 to 5 C atoms,
- $W^2$ and $W^3$ are each, independently of one another, H or alkyl having 1 to 5 C atoms,
- $W^4$, $W^5$ and $W^6$ are each, independently of one another, Cl, oxaalkyl or oxacarbonylalkyl having 1 to 5 C atoms,
- $W^7$ and $W^8$ are each, independently of one another, H, Cl or alkyl having 1 to 5 C atoms,
- Phe is 1,4-phenylene, which is optionally substituted by one or more groups L,
- $k_1$, $k_2$ and $k_3$ are each, independently of one another, 0 or 1, and
- $k_4$ is an integer from 1 to 10.

7. The double layer liquid crystal device according to claim 4, wherein the polymerizable or polymerized compounds of formula I is a compound selected from sub-formulae I-1 to I-9:

I-1
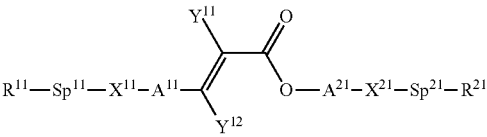

I-2
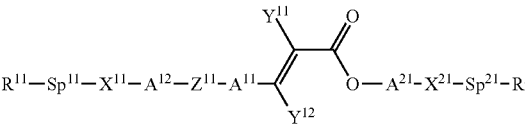

I-3
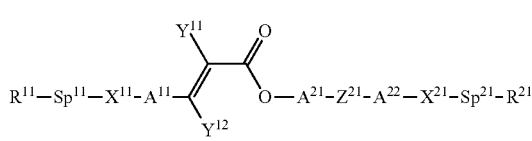

I-4
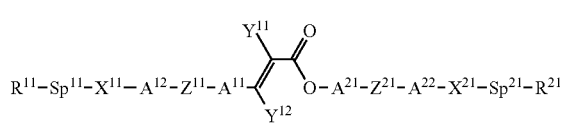

I-5
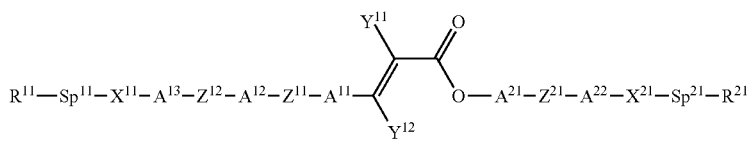

I-6
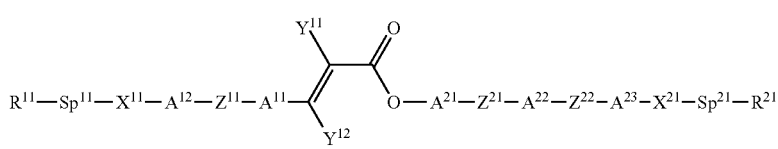

I-7
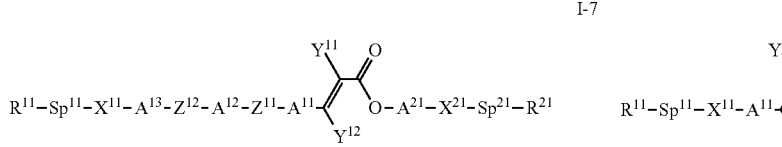

I-8

I-9
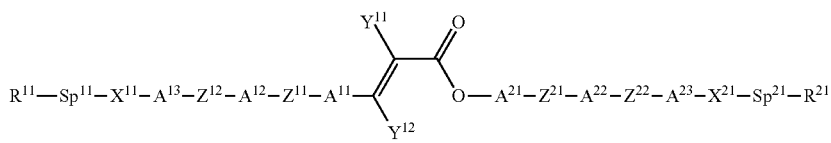

wherein $R^{11}$, $R^{21}$, $A^{11}$, $X^{11}$, $X^{21}$, $Y^{11}$, $Y^{12}$, $Sp^{11}$, and $Sp^{21}$ have one of the meanings as given in formula I, $A^{12}$ to $A^{23}$ have one of the meanings for A in formula I, and $Z^{11}$ to $Z^{22}$ have one of the meanings for Z as given under formula I.

8. The double layer liquid crystal device according to claim 4, wherein the polymerizable or polymerized compounds of formula I is a compound selected from formulae I-1-1 to I-1-3:

I-1-1
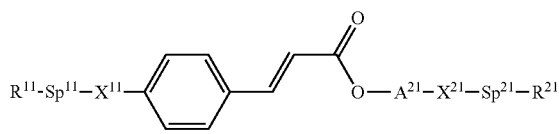

I-1-2
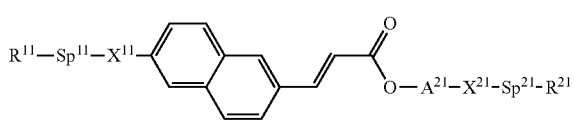

I-1-3
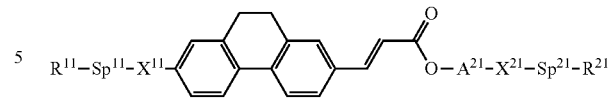

wherein $R^{11}$, $R^{21}$, $A^{11}$, $X^{11}$, $X^{21}$, $Sp^{11}$, and $Sp^{21}$ have one of the meanings as given in formula I, and $A^{21}$ has one of the meanings for A in formula I.

9. The double layer liquid crystal device according to claim 4, wherein the polymerizable or polymerized compounds of formula I is a compound selected from sub-formulae I-2-1 to I-2-3:

I-2-1
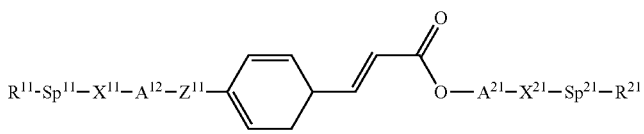

I-2-2
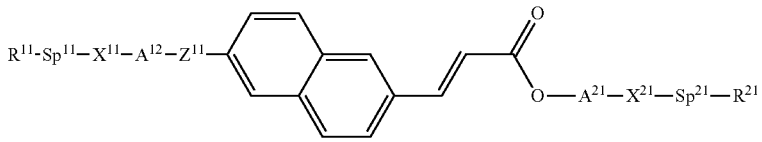

I-2-3
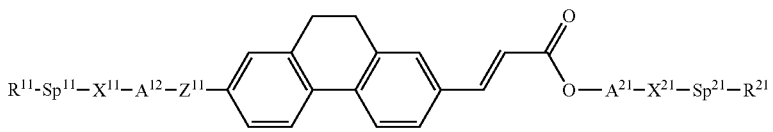

wherein $R^{11}$, $R^{21}$, $X^{11}$, $X^{21}$, $Sp^{11}$ and $Sp^{21}$ have one of the meanings as given above in formula I, and $Z^{11}$ has one of the meanings for Z as given under formula I, and $A^{12}$ and $A^{21}$ each have one of the meanings for A given under formula I.

10. The double layer liquid crystal device according to claim 4, wherein the polymerizable or polymerized compounds of formula I is a compound selected from sub-formulae I-3-1 to I-3-3:

I-3-1
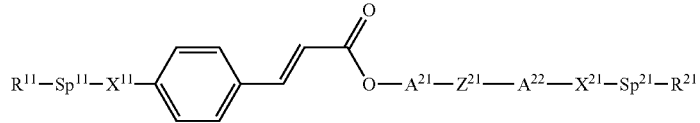

I-3-2
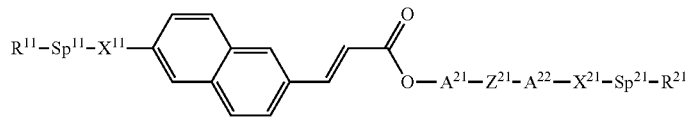

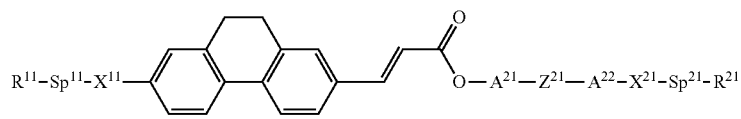

I-3-3

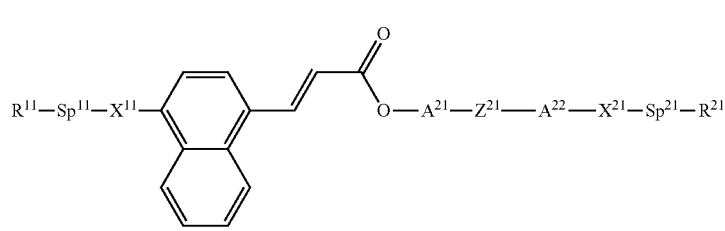

I-3-4 wherein $R^{11}$, $R^{21}$, $X^{11}$, $X^{21}$, $Sp^{11}$ and $Sp^{21}$ have one of the meanings as given above in formula I, $Z^{21}$ has one of the meanings for Z as given under formula I, and $A^{21}$ and $A^{22}$ have one of the meanings for A as given under formula I.

11. The double layer liquid crystal device according to claim 4, wherein the polymerizable or polymerized compounds of formula I is a compound selected from the following subformulae:

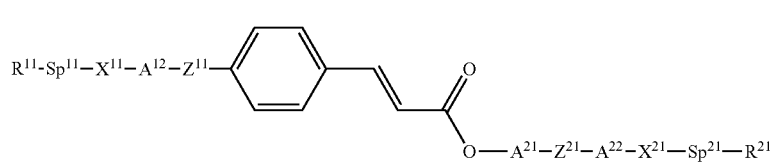

I-4-1

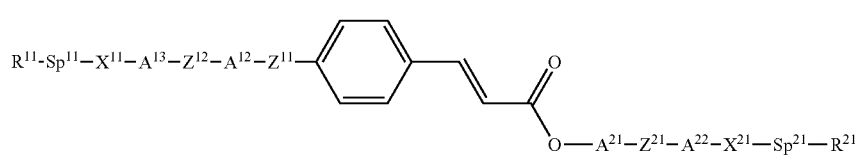

I-5-1 wherein $R^{11}$, $R^{21}$, $X^{11}$, $X^{21}$, $Sp^{11}$ and $Sp^{21}$ have one of the meanings as given in formula I, $Z^{11}$, $Z^{12}$ and $Z^{21}$ have one of the meanings for Z as given under formula I, and $A^{12}$, $A^{13}$, $A^{21}$ and $A^{22}$ have one of the meanings for A as given under formula I.

12. The double layer liquid crystal device according to claim 4, wherein the liquid crystal medium of the first or second layer comprises one or more compounds of the following formula:

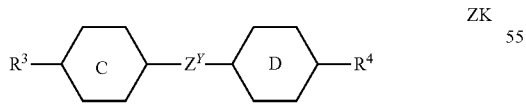

ZK in which the individual radicals have the following meanings:

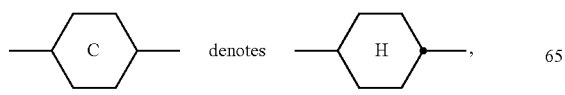

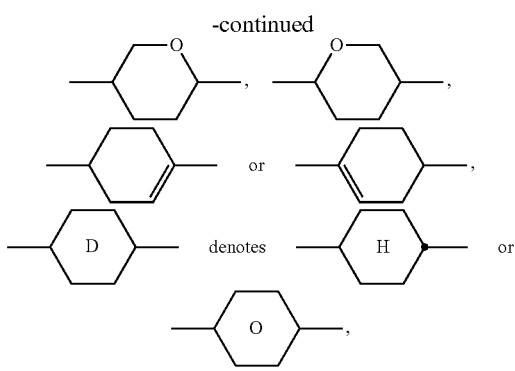

$R^3$ and $R^4$ each, independently of one another, denote alkyl having 1 to 12 C atoms, in which, in addition, one or two non-adjacent $CH_2$ groups may each be replaced by —O—, —CH=CH—, —CO—, —O—CO— or —CO—O— in such a way that O atoms are not linked directly to one another, and $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond.

13. A double layer liquid crystal device comprising:
a first layer of liquid crystal medium and a second layer of liquid crystal medium,
the liquid crystal phase of the first layer of liquid crystal medium and the liquid crystal phase of the second layer of liquid crystal medium have orthogonal alignment with respect to each other or the liquid crystal phase of the first layer of liquid crystal medium and the liquid crystal phase of the second layer of liquid crystal medium have crossed alignment at an angle between 45° and 90° with respect to each other, in which the first layer comprises a first alignment aid, and the second layer comprises a second alignment aid, which alignment aids are polymerized or polymerizable molecular compounds,
wherein
the liquid crystal phases of the first layer and the second layer each have planar alignment at different angles with respect to each other by aid of the first alignment aid and the second alignment aid, respectively,
or
the liquid crystal phase of the first layer has planar alignment induced by the first alignment aid, and the liquid crystal phase of the second layer has vertical alignment induced by the second alignment aid, and
wherein the second layer has vertical alignment, and the second alignment aid comprises one or more self-alignment additives for vertical alignment of formula (2)

MES-R$^a$             (2)

in which
MES is a calamitic mesogenic group comprising two or more rings, which are connected directly or indirectly to each other or which are condensed to each other, which are optionally substituted and which mesogenic group is optionally substituted additionally by one or more polymerizable groups P, which are connected to MES directly or via a spacer, and
R$^a$ is a polar anchor group, residing in a terminal position of the calamitic mesogenic group MES which comprises at least one carbon atom and at least one group selected from —OH, —SH, —COOH, —CHO or primary or secondary amine function and which optionally comprises one or two polymerizable groups P.

14. The double layer liquid crystal device according to claim 13, wherein the liquid crystal medium of the first or second layer comprises one or more compounds selected from the following formulae:

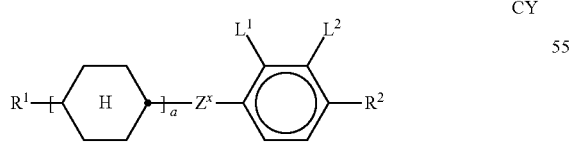
CY

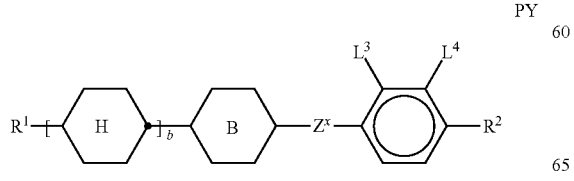
PY wherein
a is 1 or 2,
b is 0 or 1,

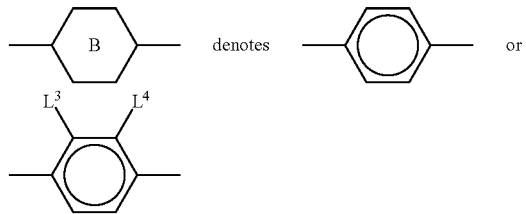

R$^1$ and R$^2$ each, independently of one another, denote alkyl having 1 to 12 C atoms, where, in addition, one or two non-adjacent CH$_2$ groups may each be replaced by —O—, —CH=CH—, —CO—, —O—CO— or —CO—O— in such a way that O atoms are not linked directly to one another,
Z$^x$ denotes —CH=CH—, —CH$_2$O—, —OCH$_2$—, —CF$_2$O—, —OCF$_2$—, —O—, —CH$_2$—, —CH$_2$CH$_2$— or a single bond, and
L$^{1-4}$ each, independently of one another, denote F, Cl, OCF$_3$, CF$_3$, CH$_3$, CH$_2$F, CHF$_2$.

15. The double layer liquid crystal device according to claim 13, wherein the liquid crystal medium of the first or second layer comprises one or more compounds of the following formula:

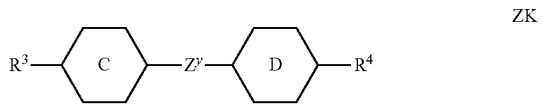
ZK in which the individual radicals have the following meanings:

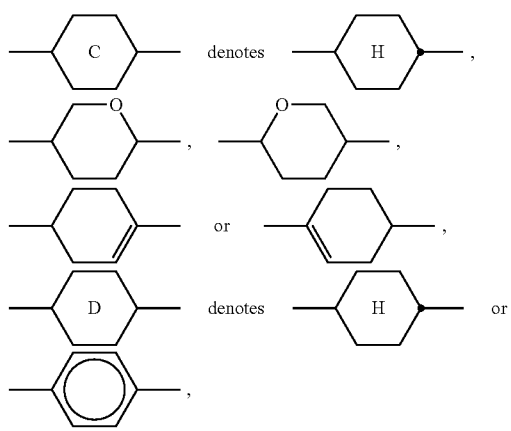

R$^3$ and R$^4$ each, independently of one another, denote alkyl having 1 to 12 C atoms, in which, in addition, one or two non-adjacent CH$_2$ groups may each be replaced by —O—, —CH=CH—, —CO—, —O—CO— or —CO—O— in such a way that O atoms are not linked directly to one another, and
Z$^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond.

16. The double layer liquid crystal device according to claim 13, wherein the liquid crystal medium of the first or second layer comprises one or more compounds of the following formula

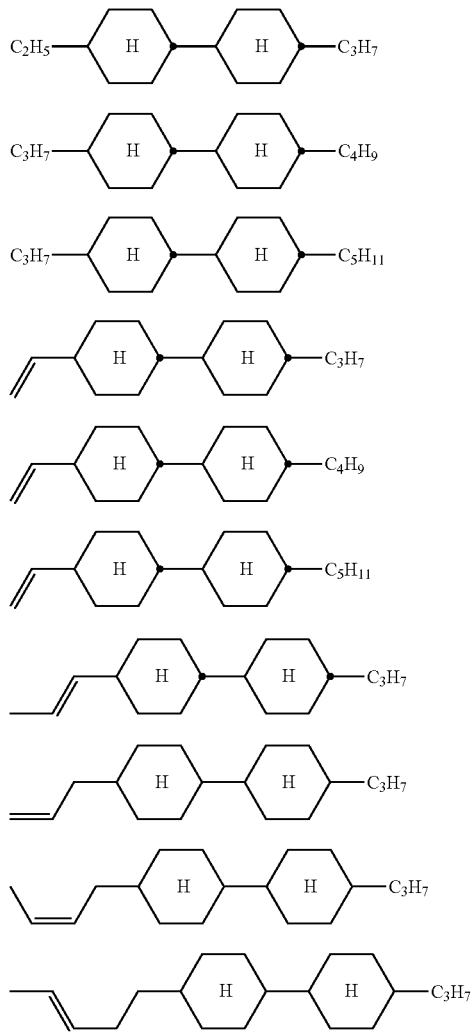

wherein the propyl, butyl and pentyl groups are straight-chain groups.

17. A double layer liquid crystal device comprising:
a first layer of liquid crystal medium and a second layer of liquid crystal medium,
the liquid crystal phase of the first layer of liquid crystal medium and the liquid crystal phase of the second layer of liquid crystal medium have orthogonal alignment with respect to each other or the liquid crystal phase of the first layer of liquid crystal medium and the liquid crystal phase of the second layer of liquid crystal medium have crossed alignment at an angle between 45 and 90° with respect to each other, in which the first layer comprises a first alignment aid, and the second layer comprises a second alignment aid, which alignment aids are polymerized or polymerizable molecular compounds, wherein
the liquid crystal phases of the first layer and the second layer each have planar alignment at different angles with respect to each other by aid of the first alignment aid and the second alignment aid, respectively,
or
the liquid crystal phase of the first layer has planar alignment induced by the first alignment aid, and the liquid crystal phase of the second layer has vertical alignment induced by the second alignment aid, and
wherein the liquid crystal medium of the second layer comprises a self-alignment additive for vertical alignment of formula (2a)

in which
A$^1$, A$^2$ each, independently of one another, denote an aromatic, heteroaromatic, alicyclic or heterocyclic group, which may also contain fused rings, and which may also be mono- or polysubstituted by a group L$^1$ or -Sp-P,
L$^1$ in each case, independently of one another, denotes F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkenyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl,
P denotes a polymerizable group,
Sp denotes a spacer group or a single bond,
Z$^2$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, —CH(-Sp-P)—, —CH$_2$CH(-Sp-P)—, or —CH(-Sp-P)CH(-Sp-P)—,
n1 denotes 1, 2, 3 or 4,
m denotes 1, 2, 3, 4 or 5,
R$^0$ in each case, independently of one another, denotes alkyl having 1 to 12 C atoms,
R$^{00}$ in each case, independently of one another, denotes H or alkyl having 1 to 12 C atoms,
R$^1$ independently of one another, denotes H, halogen, straight-chain, branched or cyclic alkyl having 1 to 25 C atoms, in which, in addition, one or more non-adjacent CH$_2$ groups may each be replaced by —O—, —S—, —CH=CH—, —C≡C—, —CO—, —CO—O—, —O—CO—, or —O—CO—O— in such a way that O and/or S atoms are not linked directly to one another and in which, in addition, one or more H atoms may each be replaced by F or Cl,
or a group -Sp-P,
and
R$^a$ a polar anchor group which comprises at least one carbon atom and defined further by having at least one additional group selected from —OH, —NH$_2$, NHR$^{11}$, —PO(OR$^{11}$)$_2$ or —SO$_2$R$^{11}$, where R$^{11}$ denotes alkyl having 1 to 12 C atoms.

18. A double layer liquid crystal device comprising:
a first layer of liquid crystal medium and a second layer of liquid crystal medium, the liquid crystal phase of the first layer of liquid crystal medium and the liquid crystal phase of the second layer of liquid crystal medium have orthogonal alignment with respect to each other or the liquid crystal phase of the first layer of liquid crystal medium and the liquid crystal phase of the second layer of liquid crystal medium have crossed alignment at an angle between 45 and 90° with respect to each other, in which the first layer comprises a first alignment aid, and the second layer comprises a second alignment aid, which alignment aids are polymerized or polymerizable molecular compounds, wherein
- the liquid crystal phases of the first layer and the second layer each have planar alignment at different angles with respect to each other by aid of the first alignment aid and the second alignment aid, respectively, or
- the liquid crystal phase of the first layer has planar alignment induced by the first alignment aid, and the liquid crystal phase of the second layer has vertical alignment induced by the second alignment aid, and wherein the first layer has planar alignment, and the second layer has vertical alignment.

19. A process for making a double layer liquid crystal device according to claim 1, wherein
the first and second layer have first and second alignment aids, and the alignment aids are selected to align the liquid crystal in a first and a second direction of alignment which are orthogonal or crossed at an angle between 45° and 90° to each other, whereby
the orthogonal direction is made by the two different, first and second alignment aids, which differ in the induced direction of alignment, under the same polarized UV light, or b) the two different, first and second alignment aids differ in at least the reaction speed or absorption spectrum, the process comprises a first and a second polarized UV irradiation step, and the orthogonal direction is made by two times polarized UV light at orthogonal or rotated orientation, in order to effect sequential reaction of the first and second alignment aid into orthogonal or crossed alignment directions, or c) the process comprises a first and a second polarized UV irradiation step, the first or second alignment aid is a rewritable one and the orthogonal or crossed direction is made by two times polarized UV light at orthogonal or otherwise rotated orientation, whereby the first wavelength is selected to effect alignment and/or polymerization of the alignment aid of the first and second layer, and the second shorter wavelength is selected to effect (photo)alignment by polarized UV irradiation of the alignment of only the second layer.

20. A process for making a double layer liquid crystal device according to claim 4, wherein the process comprises a first and a second polarized UV irradiation step, the first or second alignment aid is a rewritable one and the orthogonal or crossed direction is made by two times polarized UV light at orthogonal or otherwise rotated orientation, whereby the first wavelength is selected to effect alignment and/or polymerization of the alignment aid of the first and second layer, and the second shorter wavelength is selected to effect (photo)alignment by polarized UV irradiation of the alignment of only the second layer.

* * * * *